(12) United States Patent
Horishita

(10) Patent No.: US 11,336,896 B2
(45) Date of Patent: May 17, 2022

(54) IMAGE ENCODING APPARATUS AND IMAGE DECODING APPARATUS, METHODS OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Yusuke Horishita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/130,921

(22) Filed: Dec. 22, 2020

(65) Prior Publication Data

US 2021/0203949 A1   Jul. 1, 2021

(30) Foreign Application Priority Data

Dec. 25, 2019  (JP) .............................. JP2019-234651

(51) Int. Cl.
*H04N 19/91*      (2014.01)
*H04N 19/124*    (2014.01)
*H04N 19/146*    (2014.01)
*H04N 19/176*    (2014.01)
*H04N 19/182*    (2014.01)
*H04N 19/192*    (2014.01)

(52) U.S. Cl.
CPC ......... *H04N 19/146* (2014.11); *H04N 19/124* (2014.11); *H04N 19/176* (2014.11); *H04N 19/182* (2014.11); *H04N 19/192* (2014.11); *H04N 19/91* (2014.11)

(58) Field of Classification Search
None
See application file for complete search history.

(56) References Cited

U.S. PATENT DOCUMENTS

| | | | | | |
|---|---|---|---|---|---|
| 5,699,475 | A | * | 12/1997 | Oguro ..................... | H04N 19/18 386/328 |
| 5,784,110 | A | * | 7/1998 | Acampora ............. | H04N 19/00 375/240.23 |
| 6,668,015 | B1 | * | 12/2003 | Kranawetter .......... | H04N 19/40 375/240.12 |

(Continued)

FOREIGN PATENT DOCUMENTS

JP          2016-213528 A      12/2016

*Primary Examiner* — Mohammad J Rahman
(74) *Attorney, Agent, or Firm* — Cowan, Liebowitz & Latman, P.C.

(57) ABSTRACT

An encoding apparatus comprises an acquiring unit that acquires image, a divider that divides the image into blocks, and an encoding processor that encodes a block. The encoding processor includes a variable-length encoder that performs quantization on each of pixels in a block so that a code length is no greater than the fixed length, and performs variable-length encoding on quantized block; a determiner that, based on a difference between the code length and the fixed length, determines a size of a free region for filling the fixed length; an analyzer that analyzes each of the pixels and calculates an index value indicating an importance; and a multiplexer that, based on the index values, multiplexes the encoded block data and the bits lost due to the quantization to generate the fixed-length encoded block data.

21 Claims, 34 Drawing Sheets

(56) References Cited

U.S. PATENT DOCUMENTS

| | | | |
|---|---|---|---|
| 2004/0120594 A1* | 6/2004 | Vitali | H04N 19/60 |
| | | | 382/251 |
| 2005/0063472 A1* | 3/2005 | Vella | H04N 19/60 |
| | | | 375/240.22 |
| 2005/0190274 A1* | 9/2005 | Yoshikawa | H04N 5/343 |
| | | | 348/231.99 |
| 2007/0074266 A1* | 3/2007 | Raveendran | H04N 19/87 |
| | | | 725/135 |
| 2014/0079117 A1* | 3/2014 | Yang | H04N 19/149 |
| | | | 375/240.03 |
| 2016/0309153 A1* | 10/2016 | Merkle | H04N 19/91 |
| 2019/0334619 A1* | 10/2019 | Aoyama | G06F 3/04883 |
| 2020/0084467 A1* | 3/2020 | Chou | H04N 19/115 |
| 2020/0402218 A1* | 12/2020 | Okano | H04N 5/23267 |

\* cited by examiner

FIG. 5A

| PIXEL NUMBER | 0 | 1 | 2 | 3 | 4 | 5 | 6 | 7 | 8 | ... | 21 | 22 | 23 |
|---|---|---|---|---|---|---|---|---|---|---|---|---|---|
| IMAGE DATA | R0 | G0 | B0 | R1 | G1 | B1 | R2 | G2 | B2 | ... | R7 | G7 | B7 |

FIG. 5B

| PIXEL NUMBER | 0 | 1 | 2 | 3 | 4 | 5 | 6 | 7 | 8 | 9 | 10 | 11 | ... | 28 | 29 | 30 | 31 |
|---|---|---|---|---|---|---|---|---|---|---|---|---|---|---|---|---|---|
| IMAGE DATA | Cb0 | Y0 | Cr0 | Y1 | Cb1 | Y2 | Cr1 | Y3 | Cb2 | Y4 | Cr2 | Y5 | ... | Cb7 | Y14 | Cr7 | Y15 |

FIG. 5C

| PIXEL NUMBER | 0 | 1 | 2 | 3 | 4 | 5 | 6 | 7 | 8 | 9 | 10 | 11 | ... | 28 | 29 | 30 | 31 |
|---|---|---|---|---|---|---|---|---|---|---|---|---|---|---|---|---|---|
| IMAGE DATA | R0 | Gr0 | Gb0 | B0 | R1 | Gr1 | Gb1 | B1 | R2 | Gr2 | Gb2 | B2 | ... | R7 | Gr7 | Gb7 | B7 |

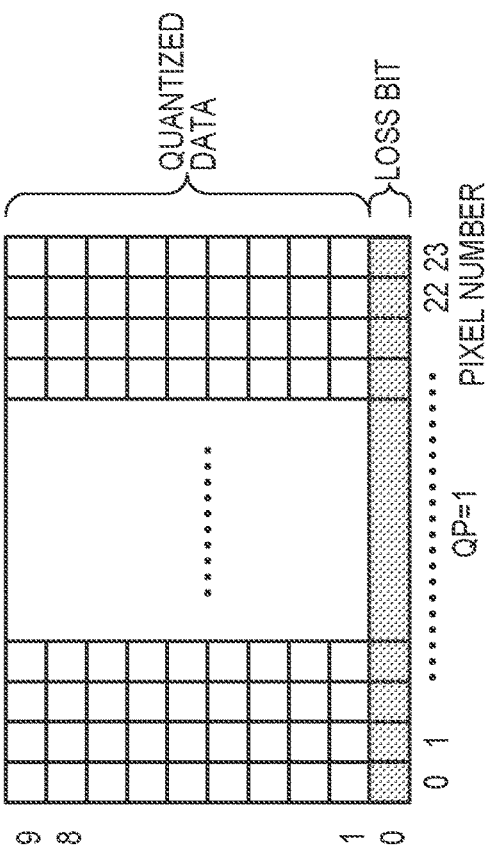
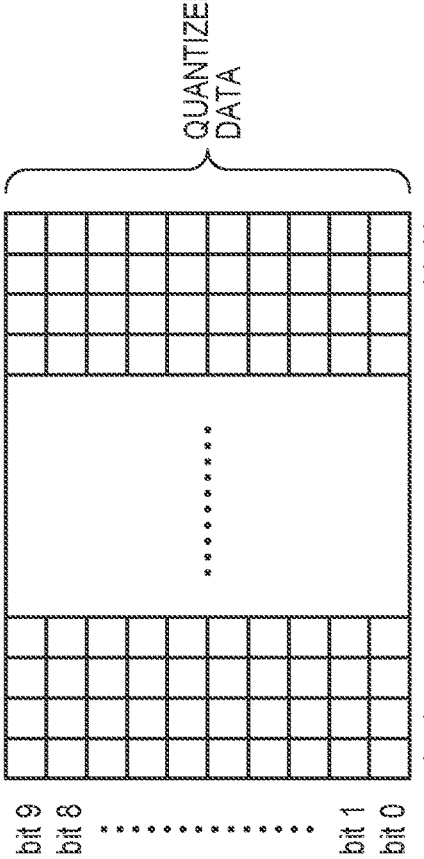
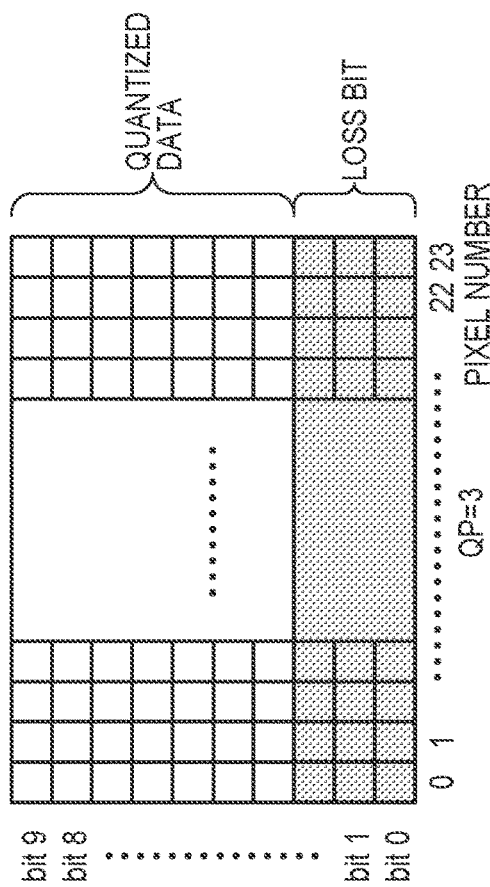
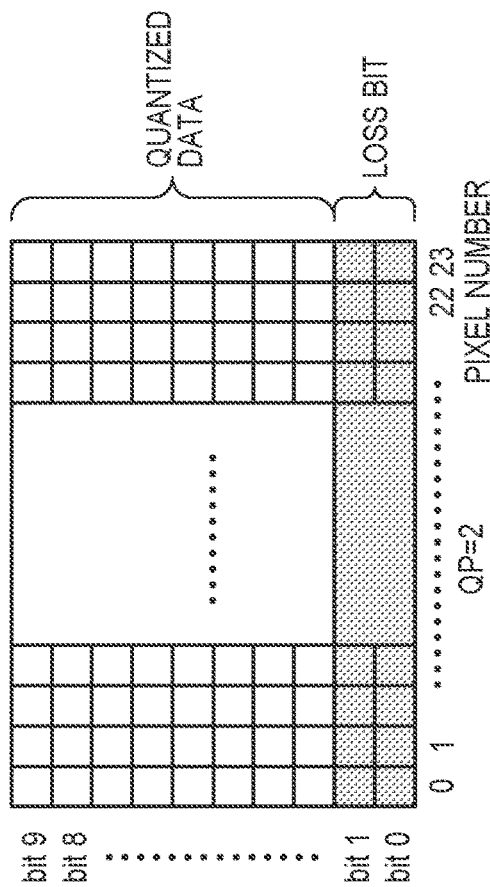

FIG. 9A

| QP | TARGET CODE AMOUNT target_size | BLOCK CODE LENGTH bl_size[qp] | NUMBER OF FREE BITS free_num[qp] | NUMBER OF LOSS BITS loss_num[qp] | DEGREE OF DEGRADATION bl_dist[qp] |
|---|---|---|---|---|---|
| 0 | 144 | 180 | -36 | 0 | 36 |
| 1 | 144 | 142 | 2 | 24 | 22 |
| 2 | 144 | 120 | 24 | 48 | 24 |
| 3 | 144 | 92 | 52 | 72 | 20 |

FIG. 9B

| QP | TARGET CODE AMOUNT target_size | BLOCK CODE LENGTH bl_size[qp] | NUMBER OF FREE BITS free_num[qp] | NUMBER OF LOSS BITS loss_num[qp] | DEGREE OF DEGRADATION bl_dist[qp] |
|---|---|---|---|---|---|
| 0 | 144 | 180 | -36 | 0 | 36 |
| 1 | 144 | 160 | -16 | 24 | 40 |
| 2 | 144 | 150 | -6 | 48 | 54 |
| 3 | 144 | 148 | -4 | 72 | 76 |

FIG. 16A

| PIXEL NUMBER | 0 | 1 | 2 | 3 | 4 | 5 | ……… | 11 | 12 | 13 | 14 | 15 | 16 | 17 | ……… | 23 |
|---|---|---|---|---|---|---|---|---|---|---|---|---|---|---|---|---|
| IMAGE DATA | R0 | G0 | B0 | R1 | G1 | B1 | ……… | B3 | R4 | G4 | B4 | R5 | G5 | B5 | ……… | B7 |

FIG. 16B

| PIXEL NUMBER | 0 | 1 | 2 | 3 | 4 | 5 | ……… | 11 | 12 | 13 | 14 | 15 | 16 | 17 | ……… | 23 |
|---|---|---|---|---|---|---|---|---|---|---|---|---|---|---|---|---|
| COEFFICIENT | LR0 | LG0 | LB0 | LR1 | LG1 | LB1 | ……… | LB3 | HR0 | HG0 | HB0 | HR1 | HG1 | HB1 | ……… | HB3 |

L BAND (LOW-FREQUENCY COMPONENT) — pixels 0–11

H BAND (HIGH-FREQUENCY COMPONENT) — pixels 12–23

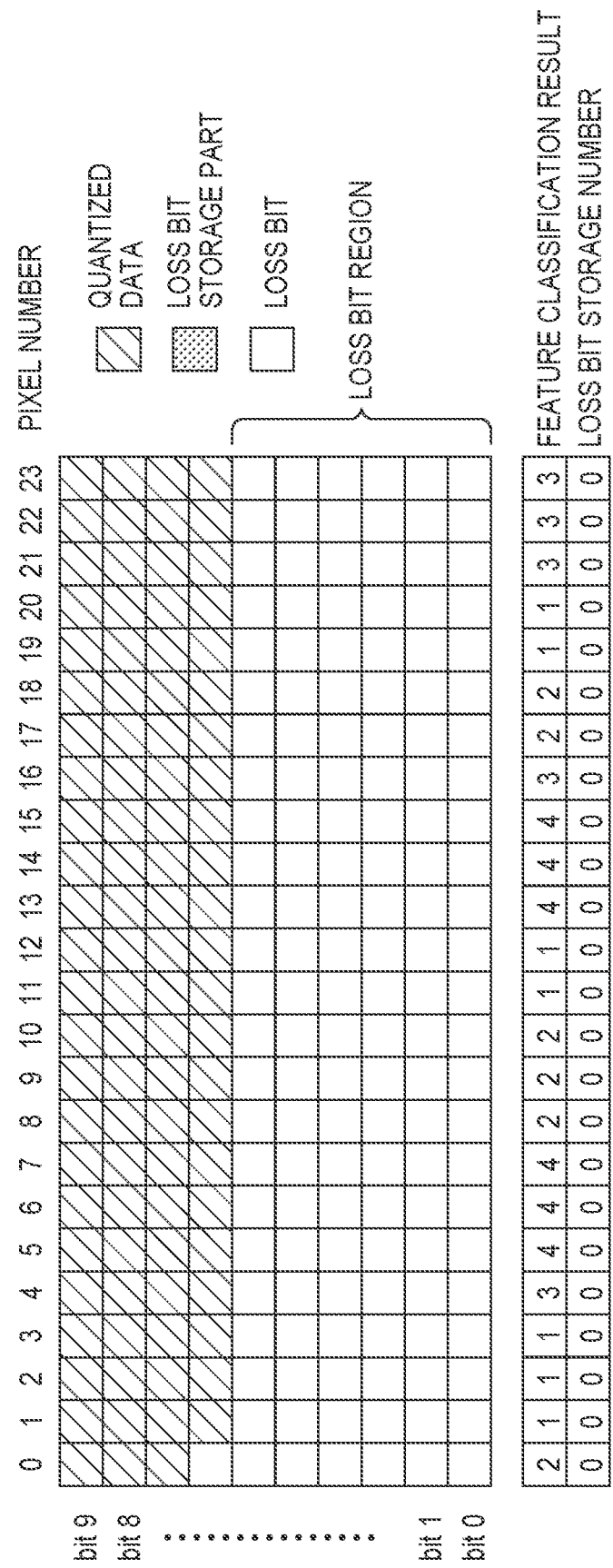

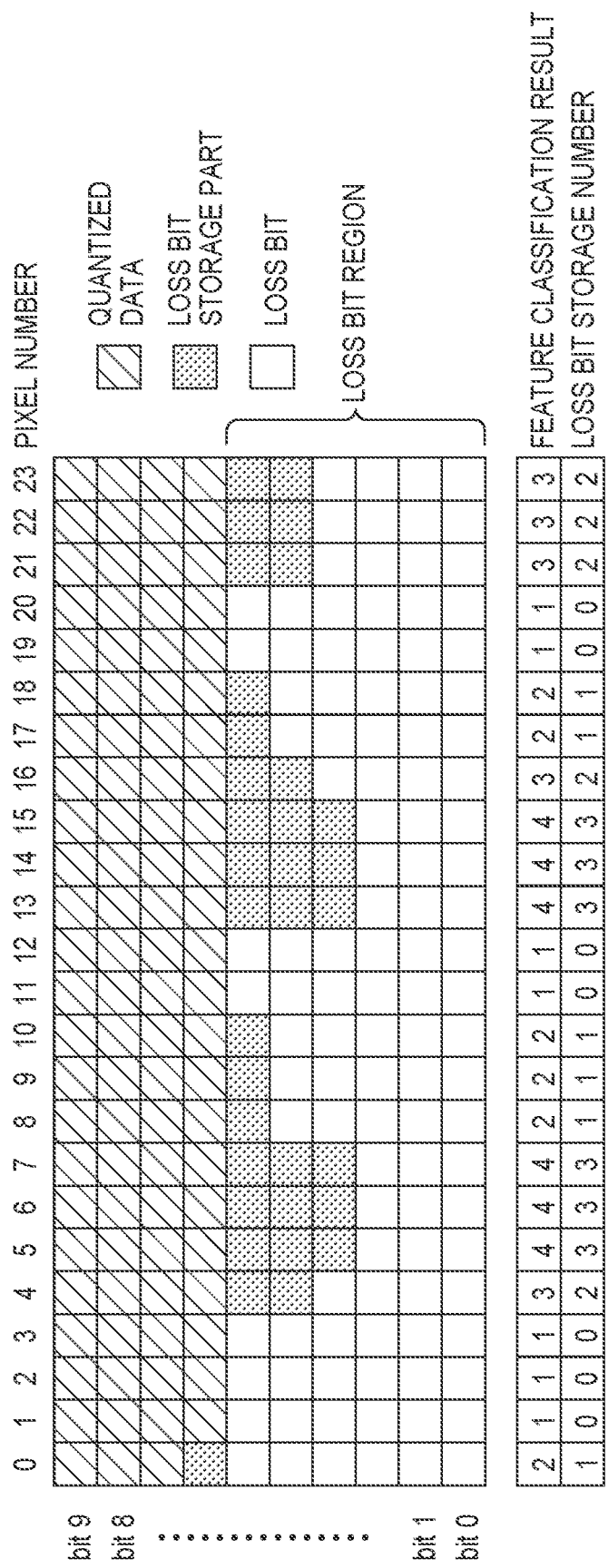

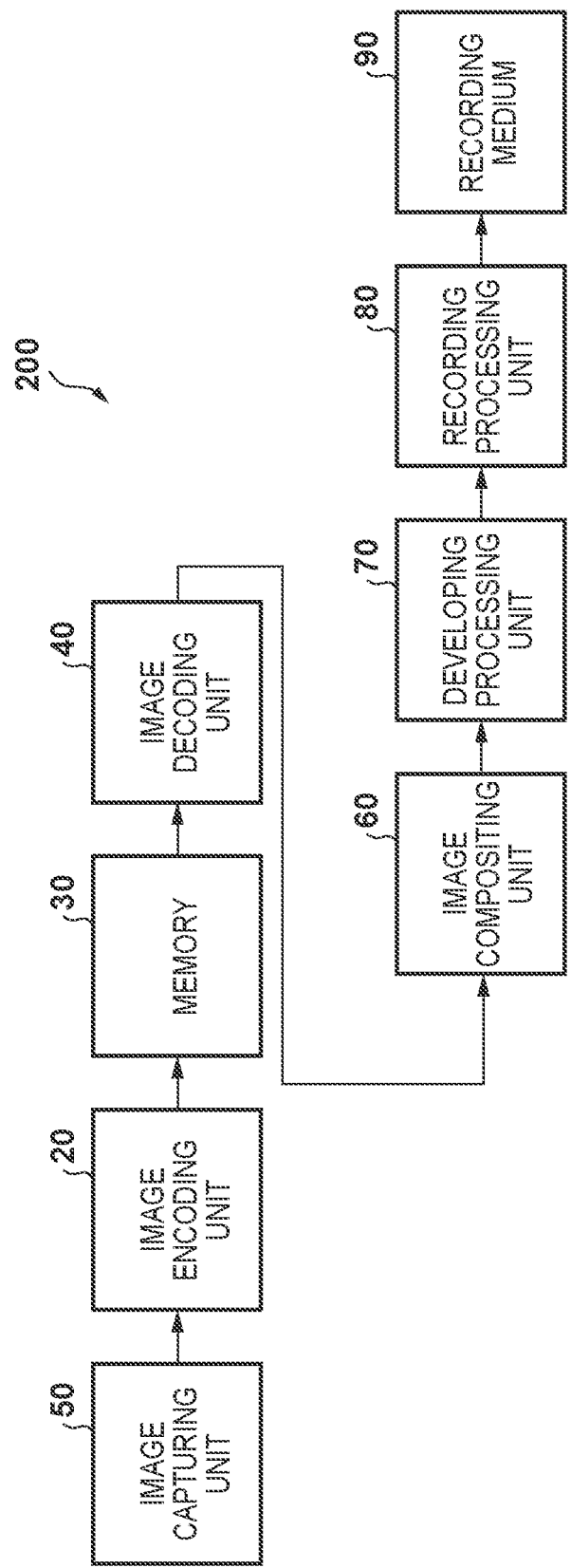

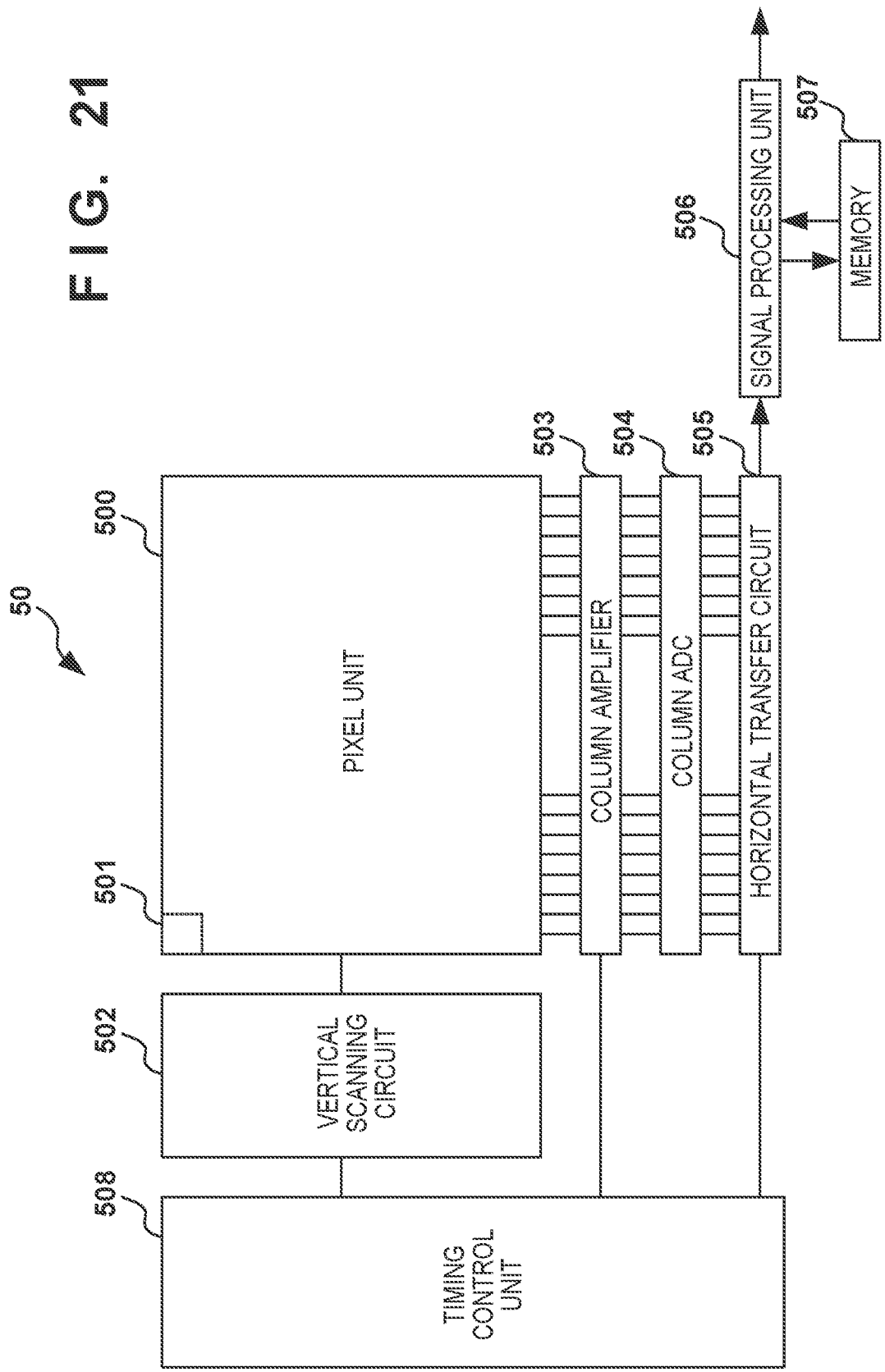

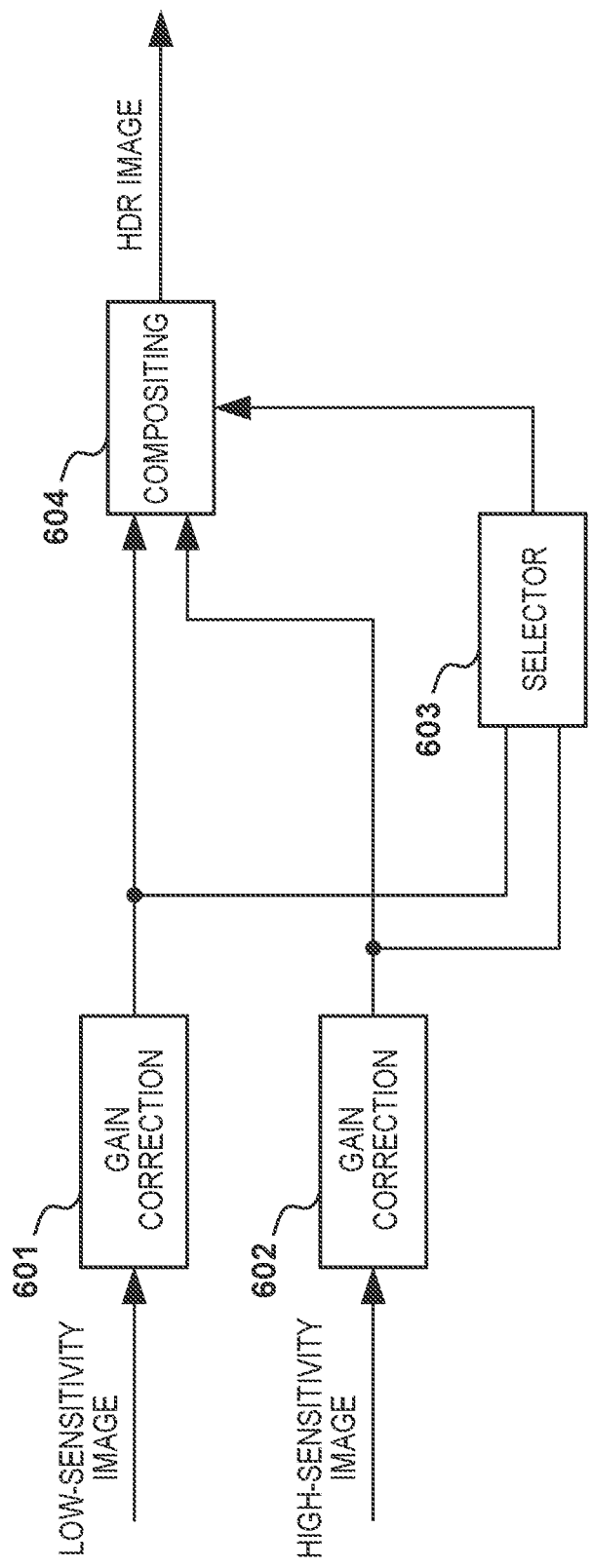

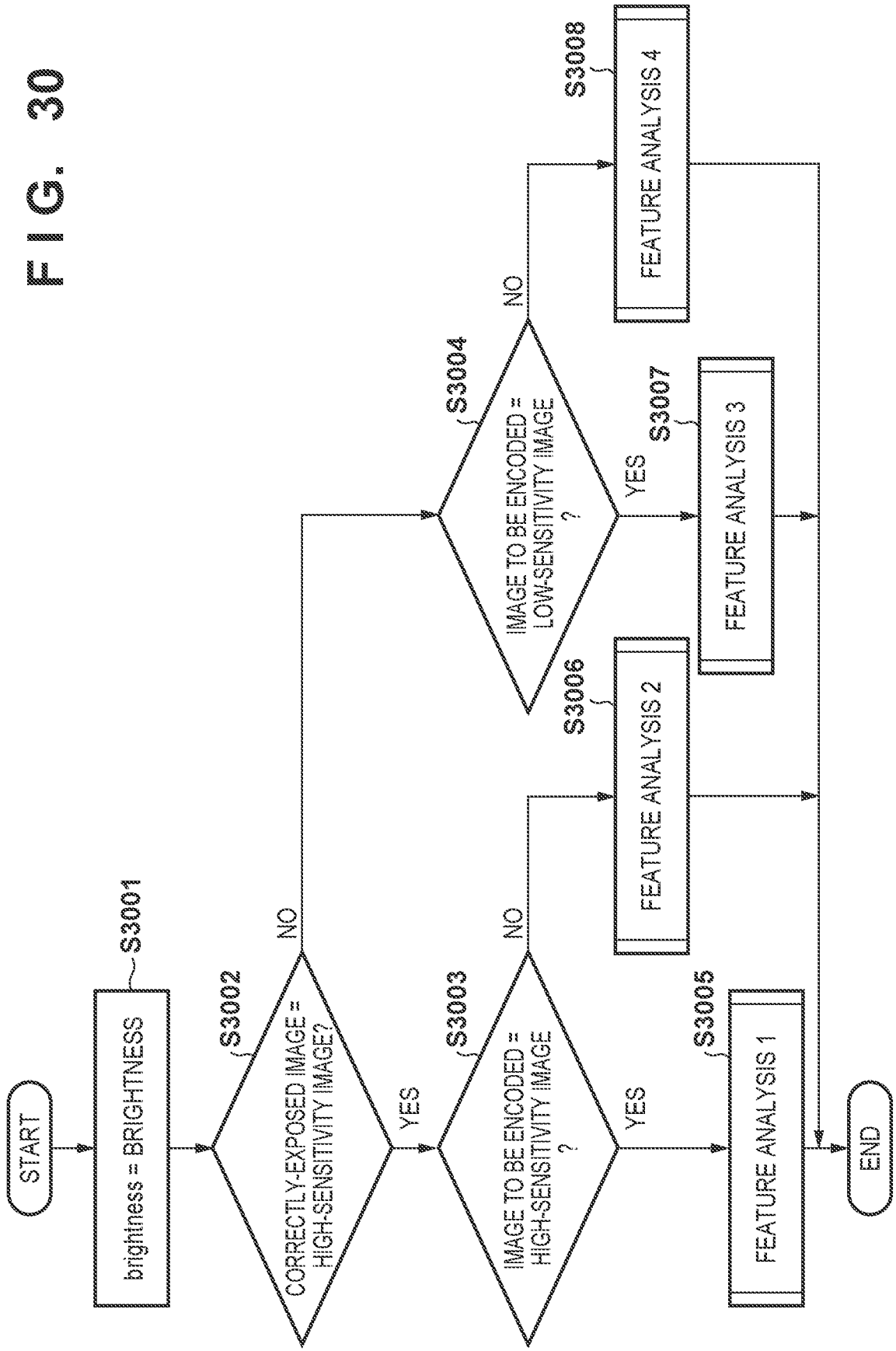

IMAGE ENCODING APPARATUS AND IMAGE DECODING APPARATUS, METHODS OF CONTROLLING THE SAME, AND NON-TRANSITORY COMPUTER-READABLE STORAGE MEDIUM

BACKGROUND OF THE INVENTION

Field of the Invention

The present invention relates to image encoding and decoding technology.

Description of the Related Art

Recently, increasing resolutions and framerates in image capturing apparatuses such as digital video cameras have led to a dramatic increase in the amounts of image data handled by the systems per unit of time. There is therefore a need to increase the speeds of image memory, bus interface circuits, and the like within the apparatuses. On the other hand, it is conceivable to compression encode images before and after the image memory, the bus interface, and the like. In other words, by suppressing the amount of data on the bus interface per unit of time, the extent to which higher circuit speeds are required can be reduced.

In such cases, it is desirable that the encoding method for the compression encoding use only a small-scale circuit and have low encoding delay. DCT-based encoding methods, such as the traditional JPEG and MPEG2 methods, are unsuitable for this reason. Therefore, compression encoding using a DPCM (Differential Pulse Code Modulation)-based predictive encoding method has been proposed. Japanese Patent Laid-Open No. 2016-213528 is one such example.

Incidentally, there are steep edges within the pixel block to be encoded, and it is necessary to allocate a large code length to edge components in order to preserve the existence of those edges. However, to fix the code length of that pixel block, it is necessary to use a large quantization step for the entire pixel block. As a result, although the edge components are maintained, the details of the original pixel data are lost, which leads to a major drop in image quality.

Having been made in view of the above-described problem, the present invention attempts to provide a technique for generating encoded data with less of a drop in image quality than before in situations where complex images such as steep edges are present in an coding block, while generating fixed-length encoded data.

SUMMARY OF THE INVENTION

According to an aspect of the invention, there is provided an image encoding apparatus that encodes each of blocks constituted by a predetermined number of pixels, and generates and outputs encoded data having a pre-set fixed length, the apparatus comprising: an acquiring unit that acquires image data of the block from an image generation source; and an encoding processing unit that encodes the image data acquired by the acquiring unit, generates encoded data of a code length that does not exceed the fixed length, adds a loss bit for filling the fixed length, and outputs the encoded data with the loss bit added, wherein the encoding processing unit includes: a variable-length encoding unit that performs quantization on each of pixels included in a block of interest so that a code length of the block of interest becomes no greater than the fixed length, and performs variable-length encoding on quantized data obtained from the quantization; a determining unit that, on the basis of a difference between the code length of the block obtained by the variable-length encoding unit and the fixed length, determines a size of a free region for filling the fixed length; an analyzing unit that analyzes the quantized data of each of the pixels in the block of interest and calculates an index value indicating an importance of each pixel; and a multiplexing unit that, by storing more values of bits lost due to the quantization in the free region as the importance of the pixel indicated by the index value increases, multiplexes the encoded data obtained by the variable-length encoding unit and the bits lost due to the quantization, and generates the fixed-length encoded data.

According to the present invention, encoded data can be generated with less of a drop in image quality than before even in situations where complex images such as steep edges are present in a coding block, while generating fixed-length encoded data.

BRIEF DESCRIPTION OF THE DRAWINGS

FIGS. 5A to 5C are diagrams illustrating a format of image data to be encoded.

FIGS. 6A to 6D are diagrams illustrating quantized data and loss bits.

FIGS. 9A and 9B illustrate specific examples of a relationship between a block code length and a degree of degradation.

FIGS. 16A and 16B are diagrams illustrating specific examples of each of sub-bands generated in the feature analysis processing according to the second embodiment.

FIGS. 19A to 19C are diagrams illustrating a method for storing loss bits in the PCM mode according to the third embodiment.

FIG. 20 is a block diagram illustrating an image processing apparatus according to a fourth embodiment.

FIG. 21 is a block diagram illustrating an image capturing unit according to the fourth embodiment.

FIG. 27 is a block diagram illustrating an image compositing unit according to the fourth embodiment.

FIG. 30 is a flowchart illustrating processing performed by a feature analyzing unit according to the fourth embodiment.

DESCRIPTION OF THE EMBODIMENTS

Figure 1:
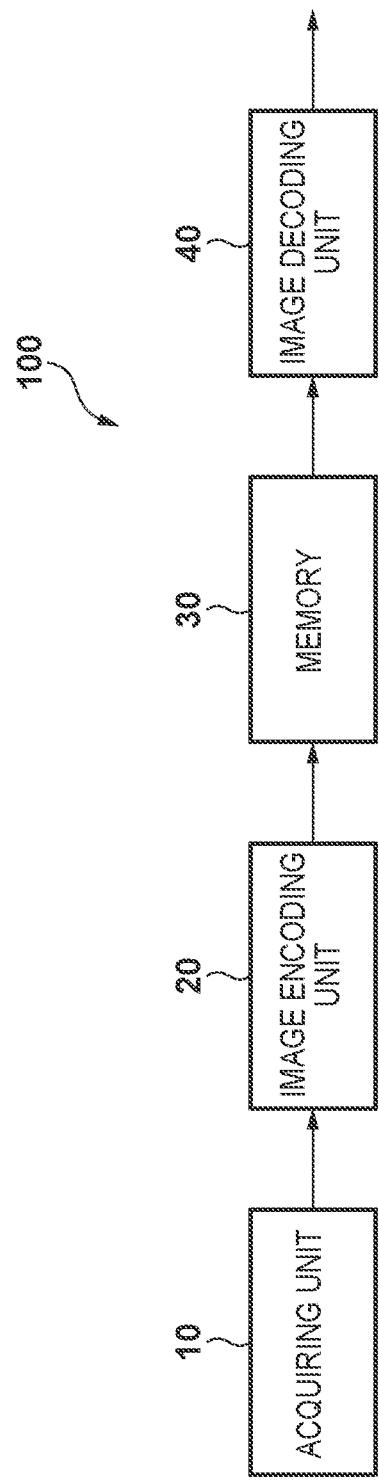
FIG. 1 is a block diagram illustrating an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Overall Description of Image Processing Apparatus

FIG. 1 is a block diagram illustrating the configuration of an image processing apparatus 100 having functions of an image encoding apparatus and an image decoding apparatus. The image processing apparatus 100 includes an acquiring unit 10, an image encoding unit 20, memory 30, and an image decoding unit 40.

Aside from physical devices such as an image sensor and storage elements such as the memory 30, the functions of the blocks in the image processing apparatus 100 may be implemented by either hardware or software. For example, the functions of the blocks may be implemented by hardware such as dedicated devices, logic circuits, memory, and the like. Alternatively, the functions of the blocks may be implemented by memory, processing programs stored in the memory, and a computer such as a CPU which executes the processing programs. Although the image processing apparatus 100 can be implemented as, for example, a digital camera, the image processing apparatus 100 can be implemented as a different device instead. For example, the image processing apparatus 100 can be implemented as any information processing terminal or image capturing apparatus, including personal computers, mobile phones, smartphones, PDAs, tablet terminals, digital video cameras, and the like.

The acquiring unit 10 has a function of acquiring image data from an image generation source. The image generation source may be, for example, an image capturing unit including an image sensor, or may be a communication unit that receives image data from the exterior over a transmission channel. Alternatively, the acquiring unit 10 may acquire the image data from a recording medium or the like through an interface that reads out the image data. The acquired image data may be still image data, or may be moving image data. When the image data acquired by the acquiring unit 10 is moving image data, a plurality of frames may be acquired continuously. The acquiring unit 10 supplies the acquired image data to the image encoding unit 20.

The image encoding unit 20 encodes the image data supplied from the acquiring unit 10 according to an encoding method (described later), and outputs encoded data in which the amount of information has been compressed. The output encoded data is stored in the memory 30. The memory 30 functions as buffer memory, and has a storage capacity necessary for storing the encoded data output from the image encoding unit 20.

The image decoding unit 40 reads out the encoded data held in the memory 30, decodes the image data according to a decoding method (described later), and outputs the decoded image data to a processing unit in a later stage (not shown).

Although FIG. 1 illustrates the acquiring unit 10, the image encoding unit 20, the memory 30, and the image decoding unit 40 as separate entities, some or all of these blocks may be integrated on a single chip.

Image Encoding Unit

Figure 2:
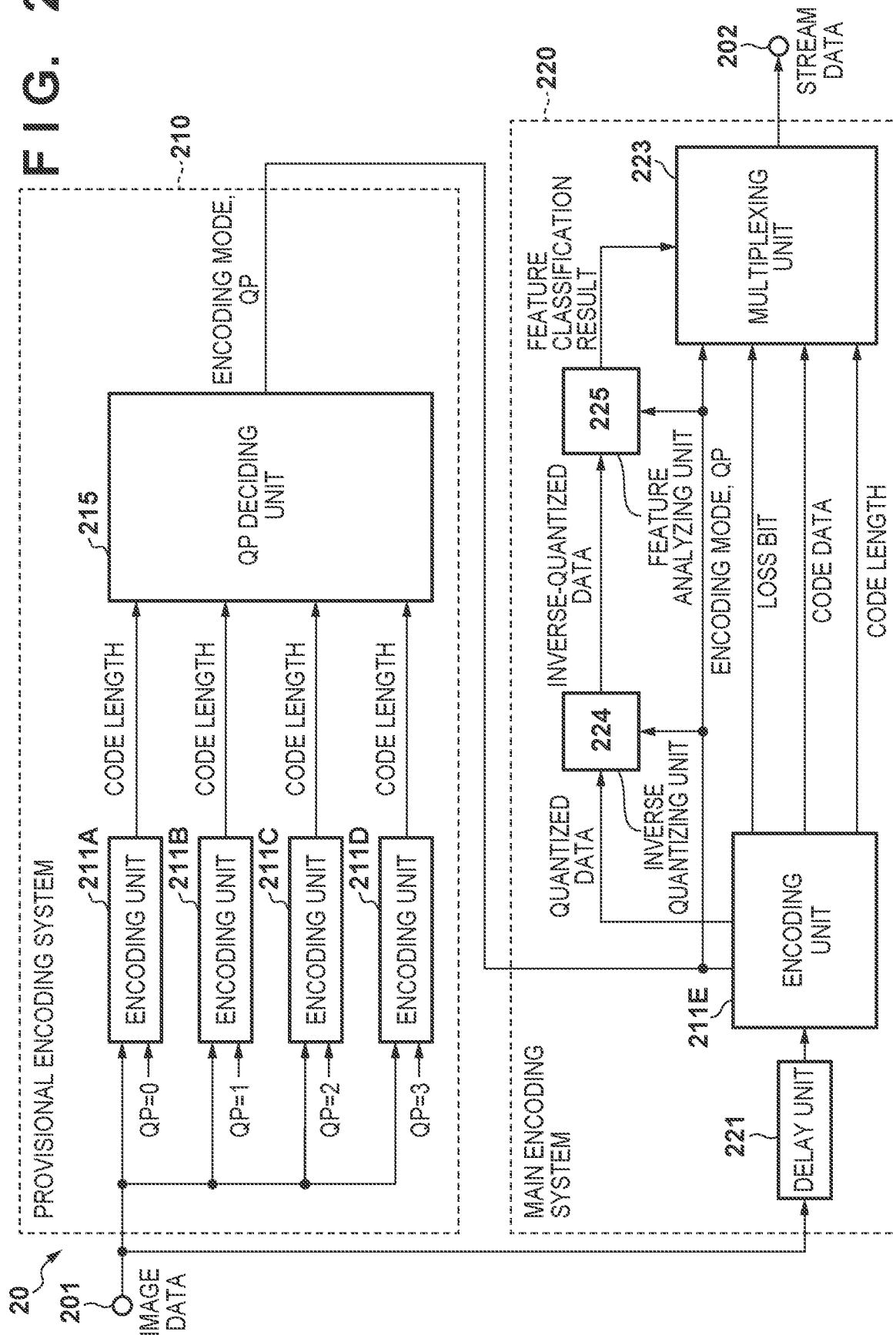
FIG. 2 is a block diagram illustrating an image encoding unit.

The image encoding unit 20 according to the present embodiment encodes each of pixels included in a block of interest constituted by a predetermined number of pixels, generates the encoded data having a code length of no greater than a pre-set fixed length, and outputs the encoded data having added loss bits ("loss bits", which will be described later) to bring the encoded data to the fixed length. FIG. 2 is a block diagram illustrating the image encoding unit 20 according to the present embodiment. The configuration and operations thereof will be described hereinafter with reference to FIG. 2.

The image encoding unit 20 includes a provisional encoding system 210 and a main encoding system 220. The provisional encoding system 210 includes encoding units 211A to 211D and a QP deciding unit 215, and operates so as to decide an encoding mode and a quantization parameter (QP) used when the main encoding system 220 performs main encoding. The main encoding system 220 includes a delay unit 221, an encoding unit 211E, a multiplexing unit 223, an inverse quantizing unit 224, and a feature analyzing unit 225. The main encoding system 220 executes the main encoding, which includes quantization processing, in accordance with the encoding mode and the QP decided in the provisional encoding system 210. Note that the encoding units 211A to 211E have the same internal configurations, and therefore may be referred to as "encoding units 211" in the following descriptions.

The image encoding unit 20 may be configured as integrated hardware including dedicated devices, logic circuits, memory, and the like, or may be distributed throughout a plurality of devices or the like. Alternatively, the functions of the image encoding unit 20 may be implemented by memory, processing programs stored in the memory, and a computer such as a CPU which executes the processing programs.

The image encoding unit 20 inputs the image data to be encoded, acquired by the acquiring unit 10, via, an input terminal 201. The following descriptions will assume that the format of the image data is the RGB format illustrated in FIG. 5A. It is further assumed that the image data is input in raster scan order, with each of pieces of R (red), G (green), and B (blue) pixel data, which correspond to respective color elements, being input sequentially having been time-division multiplexed. Additionally, it is assumed that the bit depth of each pixel is 10 bits in the present embodiment. Note, however, that the image data format, the bit depth, and so on are not limited to the RGB format illustrated in FIG. 5A. The format of the input image data may be in the YCbCr 4:2:2 format illustrated in FIG. 5B or in the Bayer array format illustrated in FIG. 5C. Furthermore, the bit depth of the image data may be eight bits, 12 bits, or the like.

Coding Block

In the image encoding processing executed by the image encoding unit 20 in the present embodiment, the image data to be encoded is divided into blocks (coding blocks) of a predetermined size (number of pixels), and the encoding is performed in units of coding blocks. The following descriptions will assume that each coding block is constituted by the data of eight horizontal pixels×one vertical pixel×three color components, i.e., data of 24 pixels, as illustrated in FIG. 5A. As illustrated in FIG. 5A, the coding block is constituted by a total of eight pixels of each color component of R, G, and B, the pixels being arranged in the order of R0, G0, B0, R1, G1, B1, and so on in raster scan order. R0, G0, and B0 represent color components that constitute a single pixel, but in the embodiment, the individual color components will be referred to as "pixels" for the sake of convenience. Accordingly, in FIG. 5A, pixel numbers of 0 to 23 are assigned to the 24 pieces of data. The encoding is assumed to be processed in order from the lowest pixel number in the coding block.

Note that the configuration of the coding block is not limited to the configuration illustrated in FIG. 5A. For example, with image data in the aforementioned YCbCr 4:2:2 format, the coding block may be constituted by a total of 32 pieces of data, namely 16 for Y, eight for Cb, and eight for Cr, as illustrated in FIG. 5B. In the case illustrated in FIG. 5B, pixel numbers of 0 to 31 are assigned.

Alternatively, in the case of image data in the aforementioned Bayer array format, the coding block may be constituted by a total of 32 pieces of data, namely eight for Gr, eight for Gb, eight for R, and eight for B, as illustrated in FIG. 5C. In FIG. 5C, pixel numbers of 0 to 31 are assigned. Alternatively, in the case of a Bayer array, the data may have a two-dimensional structure, such as 24 horizontal pixels and two vertical pixels.

The descriptions in the present embodiment will assume that a compression rate of the coding block illustrated in FIG. 5A is 6/10. The amount of information in the image data before encoding is 240 bits, i.e., 24 pixels×10 bits, in each coding block, and thus a target code length for each coding block is 144 bits. The image encoding unit 20 selects the encoding mode and QP for each coding block so that the aforementioned target code length is not exceeded. The encoding mode includes a PCM mode, in which quantized image data is used as code data, and a DPCM mode, in which difference value from a prediction value after the quantization of the image data is encoded. It should be understood that the target code length of 144 bits is merely an example for facilitating understanding.

Encoding Unit 211

Figure 3:
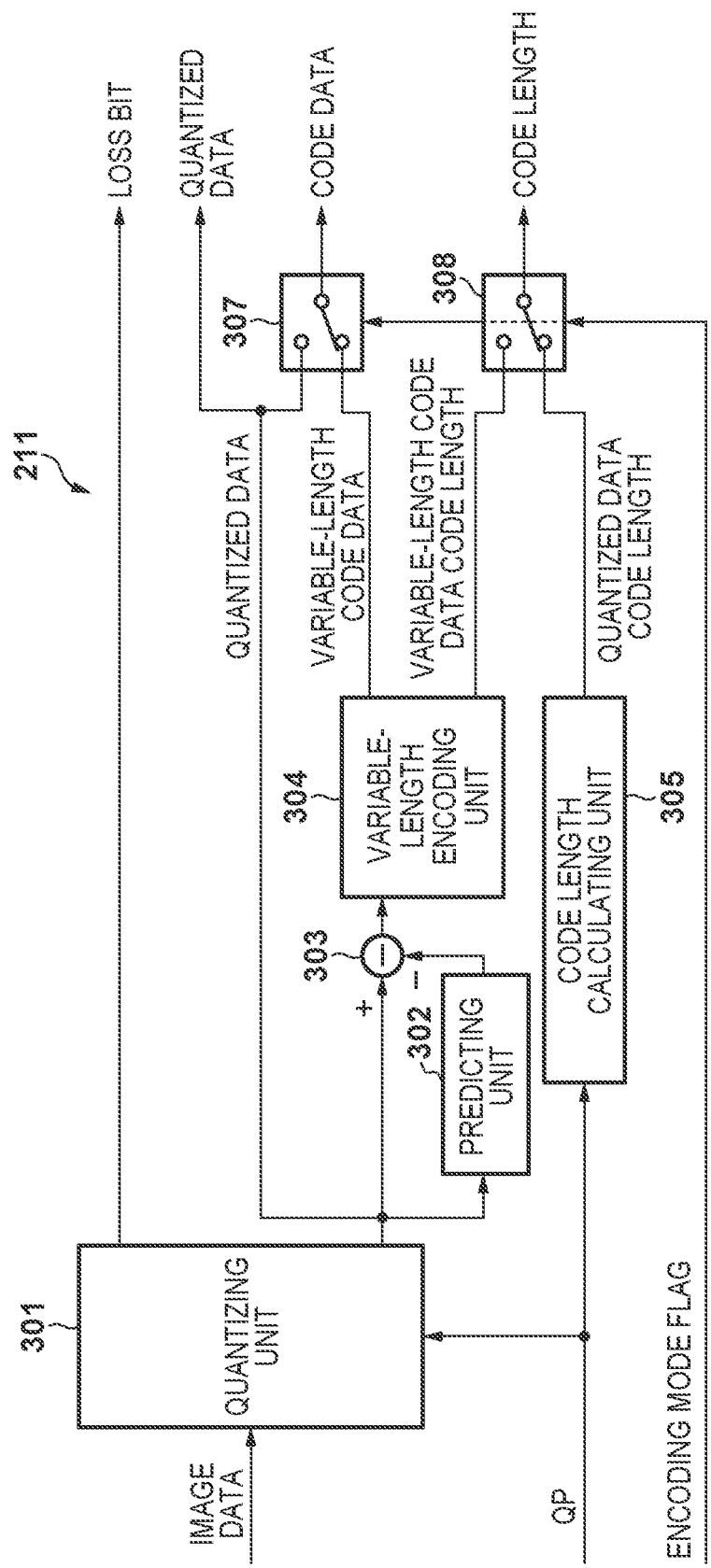
FIG. 3 is a block diagram illustrating an image decoding unit.

FIG. 3 is a block diagram illustrating the configuration of the encoding unit 211 (the encoding units 211A to 211E) in detail. As illustrated in FIG. 3, the encoding unit 211 includes a quantizing unit 301, a predicting unit 302, a subtractor 303, a variable-length encoding unit 304, a code-length calculating unit 305, a selector 307, and a selector 308.

The encoding unit 211 is supplied with the image data, an encoding mode flag, and a quantization parameter QP in units of coding blocks. In the case of the provisional encoding system 210, the QP is assigned to each of the encoding units 211A to 211D in advance as a fixed value. As illustrated in FIG. 2, in the embodiment, 0, 1, 2, and 3 are assigned as the QPs for the encoding units b 211A to 211D, respectively, in that order. In the case of the provisional encoding system 210, the respective encoding units 211A to 211D may hold the values of the QPs in advance. Additionally, in the case of the provisional encoding system 210, the encoding mode flag may be input as a fixed value indicating the DPCM mode. The encoding mode flag and the QP decided in the provisional encoding system 210 are supplied from the QP deciding unit 215 to the encoding unit 211E of the main encoding system 220 via the delay unit 221. The specific configuration and operations of the encoding unit 211 will be described hereinafter in detail.

First, the image data of the coding block input to the encoding unit 211 (in this embodiment, the 24 pieces of pixel data illustrated in FIG. 5A) is input to the quantizing unit 301. The quantizing unit 301 quantizes each piece of pixel data in the input image data in accordance with the supplied QP, and generates quantized data and data of bits lost due to the quantization (called "loss bits"). Then, the quantizing unit 301 outputs the generated quantized data to the predicting unit 302, the subtractor 303, and the exterior of the encoding unit 211. Additionally, the quantizing unit 301 outputs the generated loss bits to the exterior of the encoding unit 211.

The descriptions in the present embodiment assume that the value of QP is an integer value which has a minimum value of 0 and can be changed in a range of from 0 to 3. However, a higher QP value may be set, and a larger quantization step may be used.

In the present embodiment, the quantizing unit 301 sets a smaller (finer) quantization step as the QP decreases, and sets a larger (coarser) quantization step as the QP increases. Specifically, the quantized data is generated through the operation expressed by Equation 1, and the loss bits are generated through the operation expressed by Equation 2.

$$\text{Quant}=\text{Data}\!>\!>\!\text{QP} \qquad (1)$$

$$\text{Loss}=\text{Data}-(\text{Quant}\!<\!<\!\text{QP}) \qquad (2)$$

Here, Quant represents the quantized data, Loss represents the loss bits, Data represents the input image data, and QP represents the quantization parameter. Additionally, $>>$ indicates a right-shift calculation and $<<$ indicates a left-shift calculation. To express the above another way, the quantized data Quant is the quotient obtained by dividing the pixel data value by $2^{QP}$, indicating that the number of effective bits is reduced from 10 to 10-QP bits. The loss bits Loss represents the remainder that is truncated by the division, and indicates that the number of bits thereof is QP.

The quantized data and the loss bits will be described here with reference to FIGS. 6A to 6D. FIGS. 6A to 6D are diagrams illustrating all the bits in the coding block of the image data, where the horizontal direction represents the sequence of 24 pieces of pixel data and the vertical direction represents the 10-bit bit depth (bit 0 to bit 9).

FIG. 6A illustrates the quantized data corresponding to QP=0 (the output of the quantizing unit 301 of the encoding unit 211A), in which the input data is output as is without being quantized. In this case, there are no loss bits.

FIG. 6B illustrates the quantized data and loss bits corresponding to QP=1 (the output of the quantizing unit 301 of the encoding unit 211B), in which the nine most significant bits are output as quantized data and the one least significant bit is output as a loss bit.

FIG. 6C illustrates the quantized data and loss bits corresponding to QP=2 (the output of the quantizing unit 301 of the encoding unit 211C), in which the eight most significant bits are output as quantized data and the two least significant bits are output as loss bits.

FIG. 6D illustrates the quantized data and loss bits corresponding to QP=3 (the output of the quantizing unit 301 of the encoding unit 211D), in which the seven most significant bits are output as quantized data and the three least significant bits are output as loss bits.

In the present embodiment, for example, increasing QP from "A" to "A+1" (where A is one of 0, 1, and 2 in this embodiment) by one step is referred to as raising, increasing, or coarsening the quantization step by one step. Conversely, reducing QP from "B" to "B−1" (where B is one of 1, 2, and 3 in this embodiment) by one step is referred to as lowering, reducing, or decreasing the quantization step by one step.

Although the quantization in the present embodiment is performed such that the quantized data is reduced by one bit each time QP increases by 1, the quantization is not necessarily limited to this method. For example, the quantizing unit 301 can also perform nonlinear quantization.

The code-length calculating unit 305 decides the code length of the quantized data for each pixel, output from the quantizing unit 301, on the basis of the bit depth of the image data (10 bits, in the present embodiment) and the QP, using the following Equation (3).

$$\text{quantized data length} = \text{image data bit depth} - \text{QP} \quad (3)$$

In the present embodiment, the code length of the quantized data decreases by one bit each time the value of the QP increases by 1. Accordingly, taking QP=0 as an initial value, the code length of the quantized data shortens from 10 bits one bit at a time, each time QP increases by 1. Here, in the provisional encoding system 210 assigns the value of QP to each of the encoding units 211A to 211D in a fixed manner, and thus the quantized data code length is also a fixed value. Accordingly, the code-length calculating unit 305 may be configured to hold and output a fixed value for the quantized data code length based on the assigned value of QE rather than calculating the quantized data code length through the operation represented by Equation (3). The code-length calculating unit 305 outputs the decided quantized data code length to the selector 308.

Operations performed by the predicting unit 302 will be described next. The predicting unit 302 generates prediction data of the current quantized data using surrounding quantized data (a prediction value of the quantized value of the current pixel). One simple method is taking the previous pixel of the same color component as-is as the prediction data. For example, in the present embodiment, the image data of the respective RGB color elements is input in order, and after the image data. G0 is encoded, the image data B0 and R1 are encoded before G1 is encoded, as illustrated in FIG. 5A. Accordingly, the predicting unit 302 delays the quantized data by three pixels and outputs the delayed data as the prediction data. The predicting unit 302 may perform an operation such as linear prediction using multiple previous pixels of the same color component. Alternatively, if the coding block has a two-dimensional structure, operations such as planar prediction using surrounding pixels of the same color component, MED prediction employed in JPEG-LS, or the like may be performed. Note that there are no "previous pixels" for the first three pixels in the coding block of each color component (R0, G0, and B0). As such, for the first three pixels in a coding block, the predicting unit 302 outputs a predetermined value (e.g., 0) to the subtractor 303 as the prediction data.

The subtractor 303 outputs a difference between the quantized data from the quantizing unit 301 and the prediction data from the predicting unit 302 to the variable-length encoding unit 304 as predictive difference data. The predictive difference data is data having a positive or negative value, which is near 0 in flat areas where the image data varies little, but is a large value in edge areas and the like where the image data varies significantly. The predictive difference data typically has Laplacian distribution characteristics centered on 0.

The variable-length encoding unit 304 generates variable-length encoded data and a variable-length encoded data code length for each pixel by encoding the input predictive difference data using a predetermined variable-length encoding method. The variable-length encoding unit 304 then outputs the generated variable-length encoded data to the selector 307 and the variable-length encoded data code length to the selector 308. Huffman coding, Golomb coding, or the like can be used as the variable-length encoding method, for example. In the variable-length encoding method executed by the variable-length encoding unit 304, code data having the shortest code length is assigned when the input value is 0, and code data having longer code lengths are assigned as the absolute value of the input value increases.

The selector 307 takes the quantized data and the variable-length encoded data as inputs, selects one of those data according to the encoding mode flag, and outputs the selected data as the encoded data to the exterior of the encoding unit 211. The selector 307 according to this embodiment selects the variable-length encoded data when the value of the encoding mode flag is 0, and selects the quantized data when the value of the encoding mode flag is 1.

The selector 308 takes the quantized data code length and the variable-length encoded data code length as inputs, selects one of those code lengths according to the encoding mode flag. The selector 308 selects the variable-length encoded data code length when the value of the encoding mode flag is 0, and selects the quantized data code length when the value of the encoding mode flag is 1.

The encoding modes will be described here. The encoding unit 211 switches between operating in the DPCM mode and the PCM mode in accordance with the encoding mode flag indicating the encoding mode. The DPCM mode is a mode in which the predictive difference data is generated by the subtractor 303 using the quantized data quantized by the quantizing unit 301 and the prediction data generated by the predicting unit 302, and the variable-length encoding unit 304 performs variable-length encoding. In the case of the DPCM mode, the variable-length encoded data is generated using image data, the QP, and so on. The encoding mode flag is "0" in the DPCM mode. On the other hand, the PCM mode is a mode in which the input image data is quantized as-is by the quantizing unit 301 and output as quantized data. In the case of the PCM mode, fixed-length code data determined according to the QP is generated. The encoding mode flag is "1" in the PCM mode.

Note that in the PCM mode, it is necessary, in the multiplexing of the code data (described later), to multiplex a one-bit flag indicating that the code data was generated in the PCM mode. As such, one predetermined pixel among the pixels of the coding block is quantized having raised the QP by one step, so that the code data and a code length is output with one bit fewer than the other pixels. The one predetermined pixel is assumed to be a pixel located at the left end (the beginning) of the coding block, for example.

Provisional Encoding System

Provisional encoding processing performed by the provisional encoding system 210 will be described here with further reference to the image encoding unit 20 illustrated in FIG. 2. The image data input to the provisional encoding system 210 illustrated in FIG. 2 undergoes provisional encoding by the plurality of encoding units 211A to 211D, with DPCM used as the encoding mode and 0 to 3, respectively, used as the QPs. The encoding units 211A to 211D then output encoding results to the QP deciding unit 215. As illustrated in FIG. 3, the signals output from the encoding units 211A to 211D include output signals corresponding to the code data, the code length, the quantized data, and the loss bits, but only the code length (the code length of the variable-length encoded data) is used by the provisional encoding system 210.

Note that in the present embodiment, the range of the QP used in the encoding is from 0 to 3, and thus the provisional encoding system 210 includes the four encoding units 211A to 211D. However, this is merely a specific example for simplifying the descriptions, and the number of the encoding units 211 can be changed depending on the range of the QP used for encoding.

The QP deciding unit 215 determines the QP of a coding block of interest in the main encoding system 220 (called an "applied QP") on the basis of information of the code length of one coding block, for each QP input from the encoding units 211A to 211D in the previous stage. The QP deciding unit 215 according to this embodiment is assumed to include a buffer that temporarily stores data input from each of the encoding units 211E to 211D. The method by which the QP deciding unit 215 decides the applied QP will be described in detail below.

Figure 7:
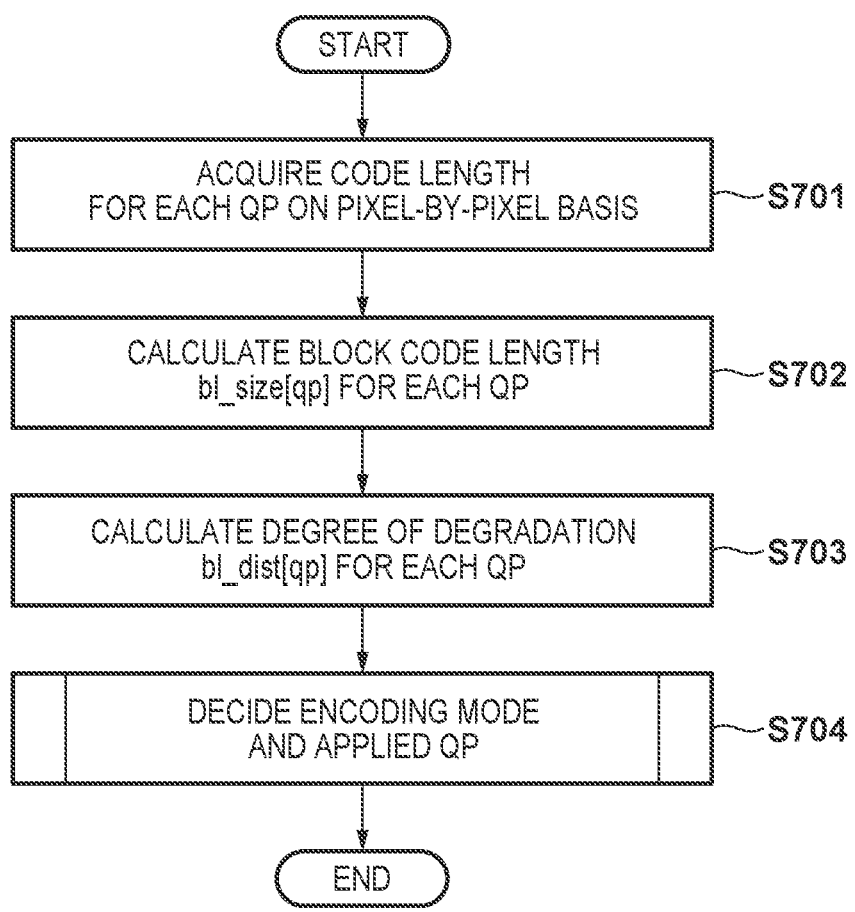
FIG. 7 is a flowchart illustrating processing for deciding an encoding mode and an applied QP.

Processing through which the QP deciding unit 215 decides the applied QP will be described in detail with reference to FIG. 7.

First, in step S701, the QP deciding unit 215 acquires, on a pixel-by-pixel basis, information on the code length calculated for each QP assigned to each encoding unit, from the encoding units 211A to 211D.

In step S702, the QP deciding unit 215 calculates the code length of the entire coding block (called the "block code length" hereinafter) for each QP using the total of the code lengths acquired on a pixel-by-pixel basis. In this embodiment, there are four encoding units 211A to 211D in the provisional encoding system 210, and thus the QP deciding unit 215 calculates four block code lengths. Note that when calculating the block code length, it is necessary to take into account the code length of header information multiplexed onto the encoded data. The header information is information of each coding block which is required at the time of decoding. In the present embodiment, the code length of the header information is three bits in total, i.e., two bits for expressing the QP (0 to 3) and one bit for the encoding mode flag. Accordingly, in step S702, the QP deciding unit 215 calculates a block code length hl size NO by adding a code length hd_size of the header information (=three bits) and the sum of the code lengths on a pixel-by-pixel basis (here, qp is a value corresponding to the QP). The number of bits for expressing the QP can be changed according to the range of the QP used for encoding.

In step S703, the QP deciding unit 215 calculates a number of free bits free_num[qp] and a number of loss bits loss_num [qp] for each QP, using a target code length target_size (144 bits, in this embodiment) and the block code length bl_size [qp] of each QP. The QP deciding unit 215 calculates a degree of degradation bl_dist [qp] for each QP using the number of free bits free_num [qp] and the number of loss bits loss_num[qp].

The number of free bits free_num [qp] is calculated through the following Equation (4).

$$\text{free\_num}[qp] = \text{target\_size} - bl\_\text{size}[qp] \qquad (4)$$

The number of free bits is a value obtained by subtracting the block code length from the target code length, as indicated by Equation 4. The number of free bits being positive indicates that the block code length at the corresponding QP is less than the target code length. The number of free bits being negative indicates that the block code length at the corresponding QP is greater than the target code length.

The number of loss bits loss_num [qp] is calculated through the following Equation (5).

$$\text{loss\_num}[qp] = qp \times \text{pix\_num} \qquad (5)$$

Here, pix_num is the number of pixels in the coding block ("24", in this embodiment).

The number of loss bits loss_num [qp] indicates the number of bits lost due to quantization, and is a value which is uniquely determined by the QP and the number of pixels in the coding block. Here, the number of pixels pix_num of the coding block is 24 in the present embodiment, and thus the number of loss bits loss_num[2], when QP=2, is 48.

The degree of degradation bl_dist [qp] is calculated through the following Equation (6).

$$bl\_\text{dist}[qp] = \text{loss\_num}[qp] - \text{free\_num}[qp] \qquad (6)$$

The degree of degradation bl_dist [qp] indicates the degree of encoding degradation. In the present embodiment, when the block code length is less than the target code length, the encoding is performed so that as much of the bit data lost due to the quantization (loss bits) as possible is stored in a free bit region. During decoding, the degradation due to quantization is reduced by restoring the loss bits stored in the free bit region. Therefore, the final degree of degradation is a value obtained by subtracting the number of free bits from the number of loss bits.

In step S704, the QP deciding unit 215 determines the encoding mode and the applied QP using the bl_size [qp] calculated in step S702 and the bl_dist [qp] calculated step S703.

Figure 8:
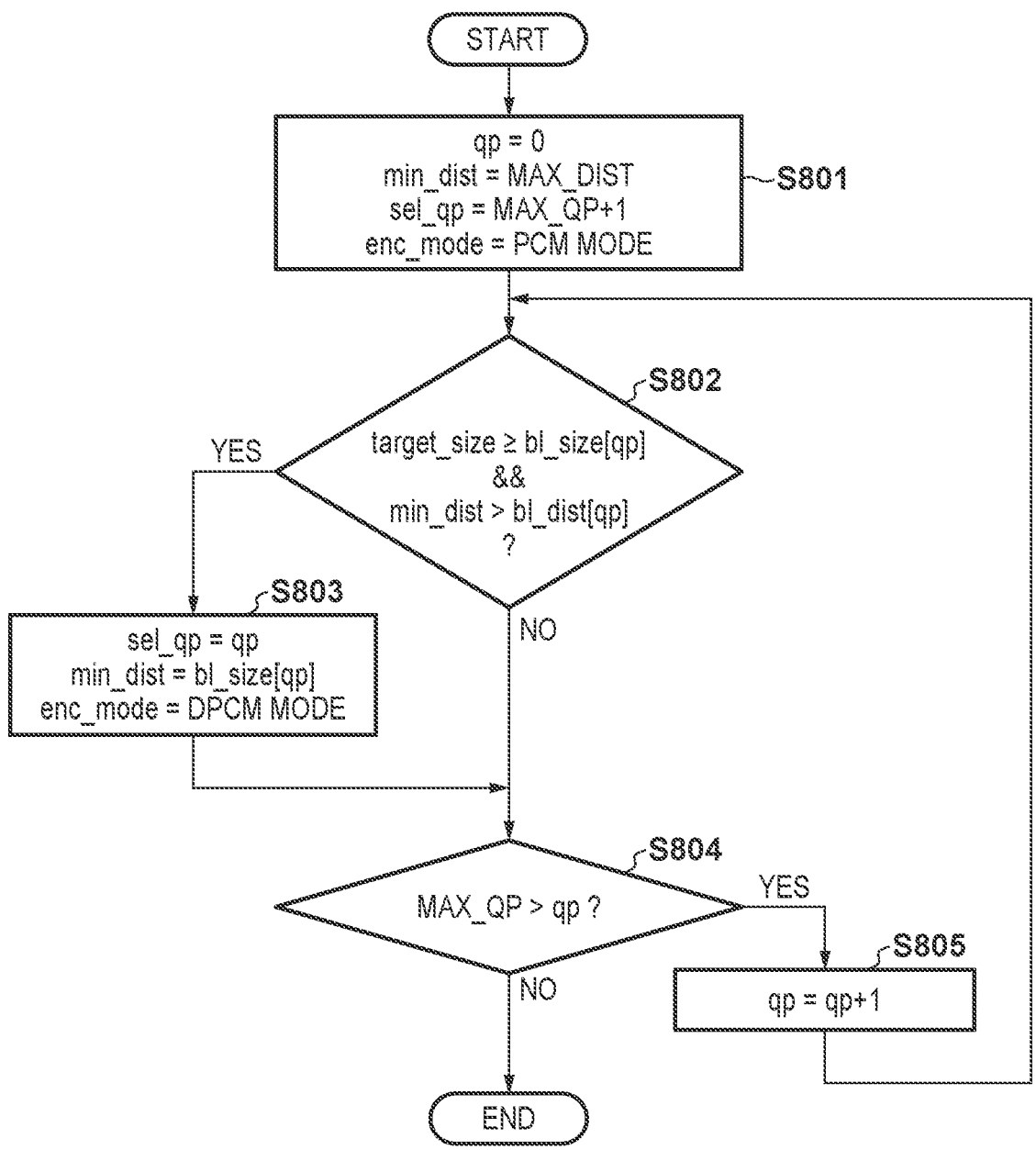
FIG. 8 is a flowchart illustrating the details of the process of step S704 in FIG. 7.

Here, the process of step S704 will be described in detail with reference to FIG. 8.

In step S801, the QP deciding unit 215 initializes several variables. Specifically, the QP deciding unit 215 initializes qp (the value of the QP) to 0, and initializes min_dist (the value of a minimum degree of degradation) to a pre-set MAX_DIST. The QP deciding unit 215 also initializes sel_qp (the applied. QP) to a value of MAX_QP+1. Here, MAX_DIST is the maximum value that can be taken as the degree of degradation of the coding block, and is a value obtained by subtracting the target code length from the amount of information in the image data before encoding. In the present embodiment, MAX_DIST=240−144=96. MAX_QP is the maximum value of the QP used for the encoding. In the present embodiment, MAX_QP is 3, and thus sel_qp is initialized to 4. The initial value of sel_qp is initialized as the QP to be applied when a condition for selecting the applied QP, described below, is not satisfied by any of the QPs.

In step S802, the QP deciding unit 215 determines whether or not a condition that the code length bl_size N0 of the coding block with the current QP (variable qp) is no greater than the target code length target_size, and the degree of degradation bl_dist [qp] of the coding block is less than min_dist, is satisfied. When this condition is satisfied, the QP deciding unit 215 moves the processing to step S803, and if the condition is not satisfied, the QP deciding unit 215 moves the processing to step S804.

In step S803, the QP deciding unit 215 substitutes qp for sel_qp as a candidate for the QP to be selected. The QP deciding unit 215 substitutes the degree of degradation bl_dist [qp] for min_dist. At this point, the QP deciding unit 215 decides that the DPCM mode is to be used as the encoding mode, and the QP deciding unit 215 therefore sets enc_mode to the DPCM mode.

In step S804, the QP deciding unit 215 determines whether or not the value of the current QP (variable qp) is less than the maximum value MAX_QP. If qp<MAX_QP, the processing moves to step S805, whereas if not, the processing of this flowchart ends.

In step S805, the QP deciding unit 215 adds 1 to qp. The same processing is then performed for the next QP value, starting from step S802.

Note that a determination of "No" being made in S804 without a determination of "Yes" being made even once in step S802 means that there is no QP having a block code length less than the target code length in the DPCM mode, and that the block code length cannot be kept within the target code length. In this case, the processing of FIG. 8 ends with enc_mode and sel_qp remaining the PCM mode and 4 (=MAX_QP+1), respectively, which are the values from the initialization performed in step S801.

When, as a result of the foregoing processing, any of the block code lengths bl_size [qp] is no greater than the target code length, the DPCM mode is selected, and the QP with the lowest degree of degradation bl_dist [qp] of the coding block is selected as the applied QP. Additionally, when any of the block code lengths bl_size [qp] exceeds the target code length, the PCM mode is selected, and a qp value of "4", obtained by adding 1 to the maximum value of the QP value (MAX_QP), is used as the applied QP.

FIGS. 9A and 9B illustrate a specific example of a relationship between bl_size [qp] and bl_dist [qp]. In the example in FIG. 9A, when QP=3, the block code length bl_size [3]=92 bits, which is less than the target code length of 144 bits, and the degree of degradation bl_dist [3]=20, which is the minimum. Accordingly, in the case of FIG. 9A, QP=3 is selected as the applied QP, and the DPCM mode is selected as the encoding mode. In the example of FIG. 9B, the block code length exceeds the target code length fir all the QPs. As such, "4" is selected as the applied QP, and the PCM mode is selected as the encoding mode.

Note that as described with reference to Equation (6), the degree of degradation bl_dist [qp] is a value obtained by subtracting the number of free bits free_num [qp] from the number of loss bits loss_num [qp]. Here, substituting the right side of Equation 4 into the number of free bits free_num [qp] in Equation (6) gives the following Equation 7.

$$bl\_dist[qp] = loss\_num[qp] - (target\_size - size[qp]) = loss\_num[qp] + bl\_size[qp] - target\_size \quad (7)$$

In Equation (7), target_size is constant regardless of the value of the QP, and the code length corresponding to the header information in the block code length bl_size [qp] is also constant regardless of the value of the QP. Accordingly, a magnitude relationship between the degrees of degradation of different QPs is determined by the total code length output by the encoding unit 211 (the block code length) and the number of loss bits loss_num [qp]. As such, the QP deciding unit 215 can decide the applied QP and the encoding mode on the basis of the code length and the number of loss bits, without calculating the degree of degradation. In the example in FIG. 9A, when QP=3, the sum of the code length and the number of loss bits is the minimum value, and thus QP=3 is decided as the applied QP. Meanwhile, in the example in FIG. 9B, all the code lengths corresponding to the respective QPs exceed the target code length. Accordingly, QP=4 is decided as the applied QP so that the code length of the coding block is no greater than the target code length.

Encoding Processing by Main Encoding System 220

Encoding processing performed by the main encoding system will be described here with further reference to FIG. 2.

The same image data as the image data of the coding block input to the provisional encoding system 210 is input to the main encoding system 220. However, the encoding processing performed by the main encoding system 220 cannot begin until the QP deciding unit 215 of the provisional encoding system 210 decides and outputs the encoding mode and the applied QP. Accordingly, the input image data of the coding block is first input to the delay unit 221, and is delayed by the number of processing cycles necessary for the provisional encoding system 210 to decide the encoding mode and the applied QP. The image data of the delayed coding block is input to the encoding unit 211E from the delay unit 221. Through this, the encoding unit 211E can perform encoding using the encoding mode and the applied QP decided by the provisional encoding system 210.

The image data of the delayed coding block, the encoding mode flag of the encoding mode decided by the QP deciding unit 215, and the applied QP are supplied to the encoding unit 211E. Then, the encoding unit 211E performs main encoding on the delayed image data in accordance with the encoding mode flag and applied QP which have been input. Code data of the same code length as the block code length decided by the QP deciding unit 215 is generated as a result. The encoding unit 211E outputs the generated code data, along with the code length and loss bits, to the multiplexing unit 223. The encoding unit 211E also outputs the quantized data, which has been quantized according to the applied QP, to the inverse quantizing unit 224.

The inverse quantizing unit 224 generates inverse-quantized data by inverse-quantizing the quantized data from the encoding unit 211E using the applied QP output by the QP deciding unit 215. The inverse quantizing unit 224 outputs the inverse-quantized data to the feature analyzing unit 225.

Here, the bit depth of the inverse-quantized data inverse-quantized using the applied QP is always the same bit depth as the input image data. Accordingly, the feature analyzing unit 225 according to the present embodiment always performs feature analysis on 10 bits of data, which is the same as the bit depth of the input image data. However, if the feature analyzing unit 225 supports processing for all bit depths, it is not absolutely necessary to provide the inverse quantizing unit 224 as in the present embodiment. In such a case, the quantized data output from the encoding unit 211E may be directly analyzed by the feature analyzing unit 225.

The feature analyzing unit 225 analyzes a plurality of pieces of inverse-quantized data output from the inverse quantizing unit 224, and detects areas in the coding block where degradation is likely to be noticeable to the human eye. In the present embodiment, dark areas or flat areas in the image are treated as areas where degradation is likely to be noticeable.

To give a concrete example, in this embodiment, each pixel is based on an RGB brightness. Accordingly, the feature analyzing unit 225 counts a number of pixels satisfying a condition that the data after inverse quantization is lower than a dark area determination threshold. When the count value is at least a predetermined number, the area is determined to be a dark area, whereas when the count value is less than the predetermined number, the area is determined to be a non-dark area.

Additionally, to determine whether or not an area is a flat area, for example, a difference between a maximum value and a minimum value of the inverse-quantized data is found, and if the difference is no greater than a threshold for determining flatness, the area is determined to be flat, whereas if the difference is greater than the threshold, the area is determined not to be flat. Although doing so takes some time, whether or not an area is flat may be determined by finding a variance of the inverse-quantized data and comparing the variance with a threshold.

The feature analyzing method described above is merely one example, and the feature analyzing method is not limited to this method. For example, edges in the image (areas of transition between light and dark), flat areas adjacent to edges, boundary areas of coding blocks, and the like can be treated as areas where degradation is easily noticeable. If the areas where the degradation is easily noticeable are different depending on the image to be encoded or the encoding method, the feature analyzing method can be changed adaptively in accordance with those areas.

A block having a predetermined size (number of pixels) constituted by multiple pieces of inverse-quantized data will be called an "inverse-quantized block" hereinafter. The feature analyzing unit 225 therefore performs the processing in units of inverse-quantized blocks. The feature analyzing method of the feature analyzing unit 225 will be described in detail below with reference to a flowchart. Note that in this embodiment, the size of the inverse-quantized block (the number of pieces of inverse-quantized data contained therein) is assumed to be the same as the size of the coding block (the number of pixels contained therein).

Feature Analyzing Method of Feature Analyzing Unit 225

Figure 10:
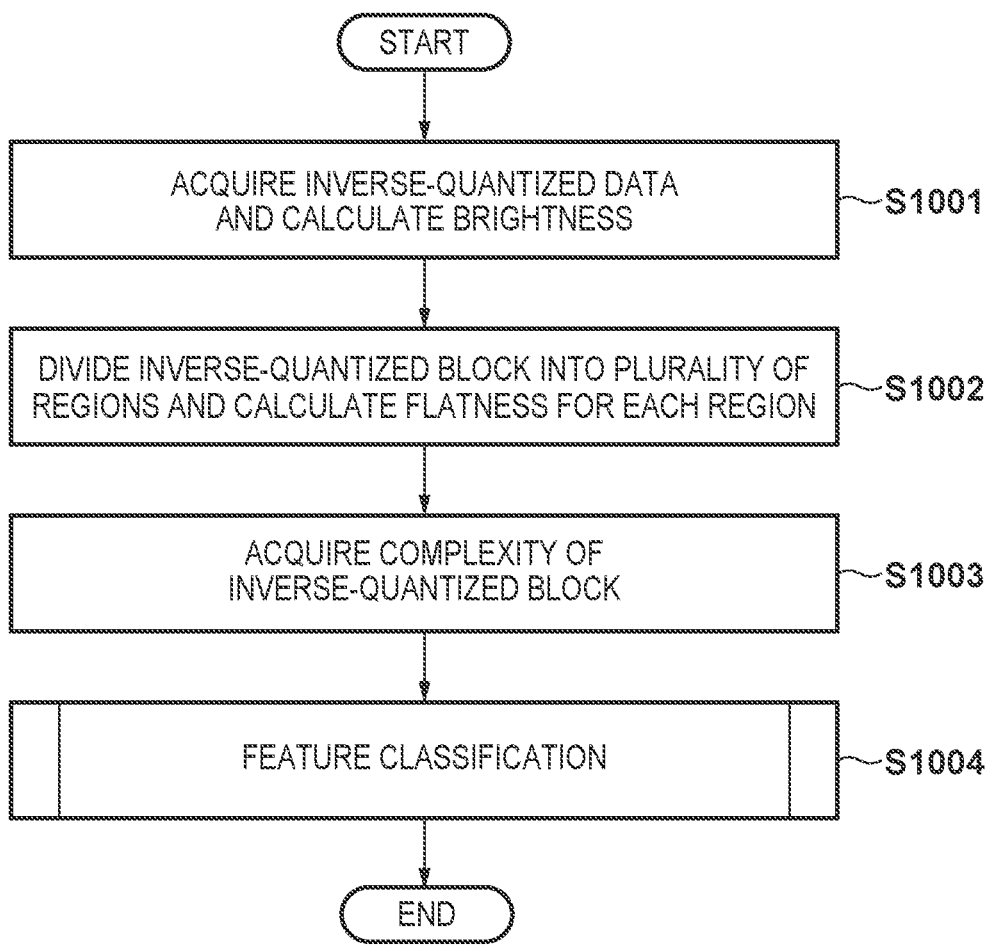
FIG. 10 is a flowchart illustrating feature analysis processing.

FIG. 10 is a flowchart illustrating a sequence of feature analysis processing by the feature analyzing unit 225 according to this embodiment. Processing performed by the feature analyzing unit 225 will be described hereinafter with reference to the drawing.

In step S1001, the feature analyzing unit 225 acquires the inverse-quantized data from the inverse quantizing unit 224 in units of pixels, and calculates a brightness of each of the pixels.

Generally speaking, the visual characteristics of humans have a property of being sensitive to changes in dark areas, and less sensitive to changes in bright areas. In the present embodiment, using this property, it is assumed that degradation caused by encoding will be more noticeable in pixels with lower brightnesses, and thus measures are taken to reduce degradation in such pixels.

Additionally, in the present embodiment, a level value of the inverse-quantized data is used as an indicator of brightness (low level value=dark, high level value=bright). The method is not limited to using an indicator of the brightness as in the present embodiment, and for example, inverse-quantized data in the RGB format may further be subject to color space conversion into the YUV format, and the level value of the Y component may be used. Alternatively, the inverse-quantized block may be divided into a plurality of regions and the average of the level value of the inverse-quantized data in each divided region may be used.

In step S1002, the feature analyzing unit 225 divides the inverse-quantized block into a plurality of regions and calculates a flatness for each divided region.

Generally speaking, the visual characteristics of humans have a property of being sensitive to changes in flat areas, and less sensitive to changes in complex areas. In the present embodiment, using this property, it is assumed that degradation caused by encoding will be more noticeable in pixels with a higher level of flatness, and thus measures are taken to reduce degradation in such pixels.

In addition, in the present embodiment, a variance value (a variation in the level values of the inverse-quantized data) within the above-described divided region is used as an indicator of flatness (variance greater than a threshold=not flat, variance less than or equal to the threshold=flat). The method is not limited to using an indicator of the flatness as in the present embodiment, and for example, a dynamic range (the difference between a maximum value and a minimum value of the level values of the inverse-quantized data) within each divided region may be used.

In step S1003, the feature analyzing unit 225 performs complexity determination processing that indicates a feature of the inverse-quantized block as a whole. In the present embodiment, the number of edges included in the inverse-quantized block is used as an indicator of the complexity (a number of edges higher than a threshold=complex, a number of edges less than or equal to the threshold=not complex). Additionally, the feature analyzing unit 225 determines that one edge is present when a difference value between adjacent inverse-quantized data of the same color component is greater than a predetermined threshold. The method is not limited to using an indicator of the complexity as in the present embodiment, and for example, a variance value of the inverse-quantized block may be used.

In step S1004, the feature analyzing unit 225 performs feature classification in units of pixels using the feature amounts acquired in steps S1001 to S1003. Although details will be given later, a result of the feature classification (a rank) has a value of from 1 to 4, where the higher the value is for a pixel, the more visually noticeable degradation in that pixel will be to the human eye. In other words, the rank obtained as a result of the feature classification can be said to be an index value indicating how noticeable degradation is, or an index value indicating a degree of importance.

Figure 11:
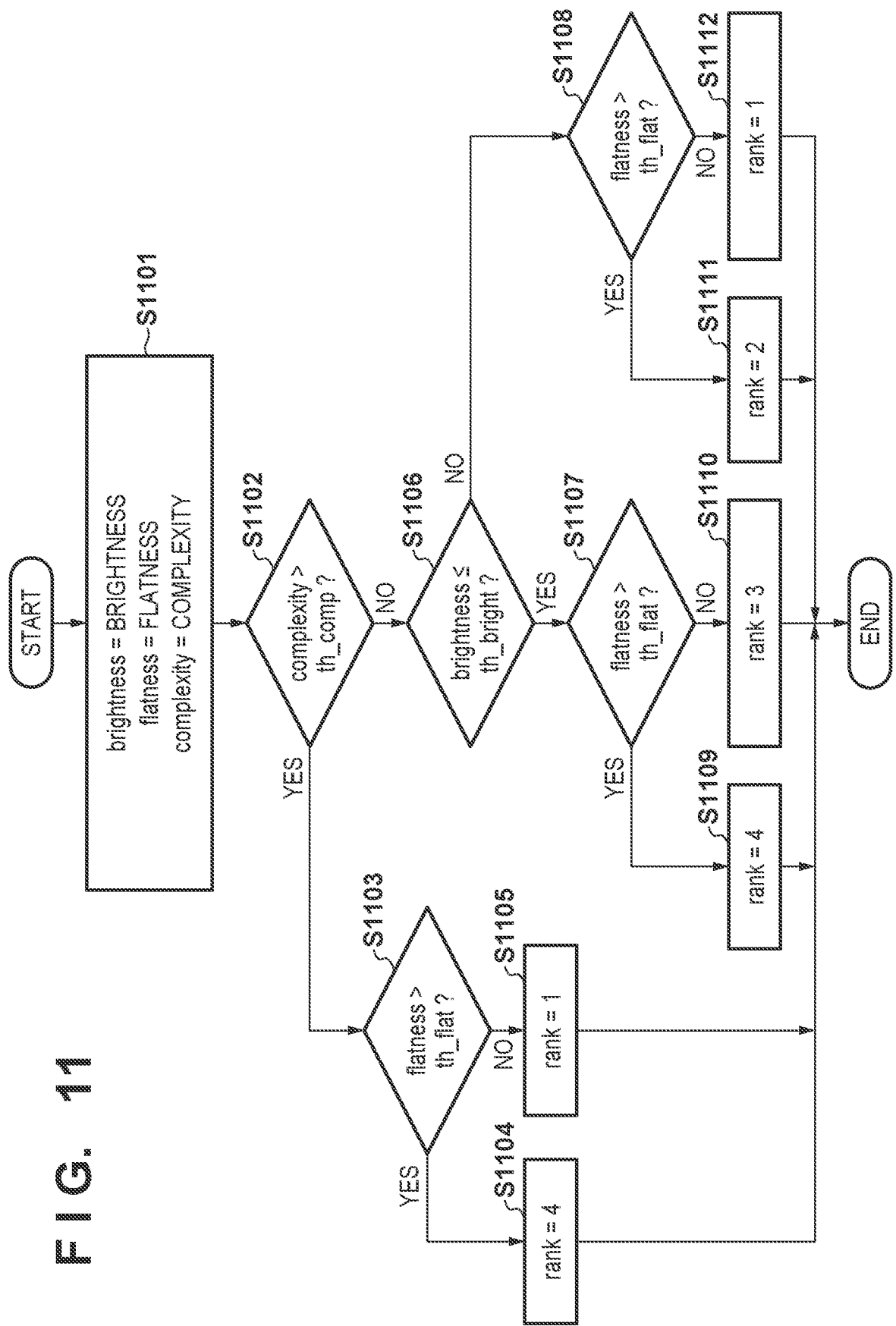
FIG. 11 is a flowchart illustrating a feature classification method of step S1004 in FIG. 10.

Here, the feature classification method for each pixel, performed in step S1004, will be described with reference to FIG. 11.

In step S1101, the feature analyzing unit 225 initializes several variables. Specifically, the feature analyzing unit 225 substitutes the brightness of a pixel of interest acquired in step S1001 for a variable "brightness"; the flatness of the divided region to which the pixel of interest belongs, acquired in step S1002, for variable "flatness"; and the complexity of the inverse-quantized block to which the pixel of interest belongs, acquired in step S1003, for a variable "complexity".

In step S1102, the feature analyzing unit 225 determines whether or not the complexity "complexity" is greater than a pre-set complexity threshold th_comp. When the feature analyzing unit 225 determines that the complexity of the inverse-quantized block to which the pixel of interest belongs is greater than the threshold th_comp ("Yes" in step S1102), the processing moves to step S1103. In step S1103, the feature analyzing unit 225 performs the feature classification using only the feature amount of "flatness" to which the pixel of interest belongs, in order to give more importance to flat areas present within the inverse-quantized block. On the other hand, when the feature analyzing unit 225 determines that the complexity of the inverse-quantized block is less than or equal to the threshold th_comp ("No" in step S1102), the feature classification is performed using two feature amounts, namely the "brightness" and "flatness", in steps S1106 to S1108.

Although the feature analyzing unit 225 is configured to be capable of selecting a feature amount to be used for the pixel from a plurality of feature amounts in the present embodiment, the same feature amount may always be used (e.g., only the brightness is used).

When the condition in step S1102 is satisfied, in step S1103, the feature analyzing unit 225 determines whether or not the flatness "flatness" of the divided region to which the pixel of interest belongs is greater than a pre-set flatness threshold th_flat. When the condition in step S1103 is satisfied, in step S1104, the feature analyzing unit 225 substitutes "4" for the rank in the feature classification result for the pixel of interest. When the condition in step S1103 is not satisfied, in step S1105, the feature analyzing unit 225 substitutes "1" for the rank in the feature classification result for the pixel of interest.

On the other hand, when the condition in step S1102 is not satisfied, in step S1106, the feature analyzing unit 225 determines whether or not the brightness "brightness" of the pixel of interest is less than or equal to a pre-set brightness threshold th_bright. Both when the condition in step S1106 is satisfied, and when that condition is not satisfied, in steps S1107 to S1108, the feature analyzing unit 225 determines whether or not the flatness "flatness" of the divided region to which the pixel of interest belongs is greater than the pre-set flatness threshold th_flat. Furthermore, the feature analyzing unit 225 substitutes "1" to "4" for the rank in the feature classification result for the pixel of interest in steps S1109 to S1112, according to the result of the determination made in step S1107 or step S1108.

As described above, the rank in the feature classification result is an indication of how visually noticeable degradation will be to the human eye. For example, if the "complexity" of the inverse-quantized block is low ("No" in step S1102), a pixel having a rank of 1 is brighter (a higher brightness) and less flat (a lower flatness), and thus degradation is less noticeable in the pixel. On the other hand, a pixel having a rank of 4 is darker (a lower brightness) and flatter (a higher flatness), and thus degradation is more noticeable in the pixel.

Although the same threshold values (th_flat, th_bright) are used for the pixels of each color component in the present embodiment, these thresholds may be configured to have separate values for each color component. Additionally, although the present embodiment describes an example in which feature classification is performed for each pixel through threshold processing, the feature classification method is not absolutely limited to this method, and feature classification can also be performed for each pixel using a method such as pattern matching or machine learning.

In this manner, the feature analyzing unit 225 performs feature classification for each pixel and outputs the feature classification results to the multiplexing unit 223.

Multiplexing Unit in Main Encoding System 220

The multiplexing unit 223 in the main encoding system 220 will be described here with further reference to FIG. 2. The code data, code length, and loss bits from the encoding unit 211E, and the encoding mode flag and the applied QP from the QP deciding unit 215, are input to the multiplexing unit 223. In addition, the feature classification results from the feature analyzing unit 225 are input to the multiplexing unit 223. The multiplexing unit 223 then multiplexes these data in a predetermined format for each coding block.

Figure 12:
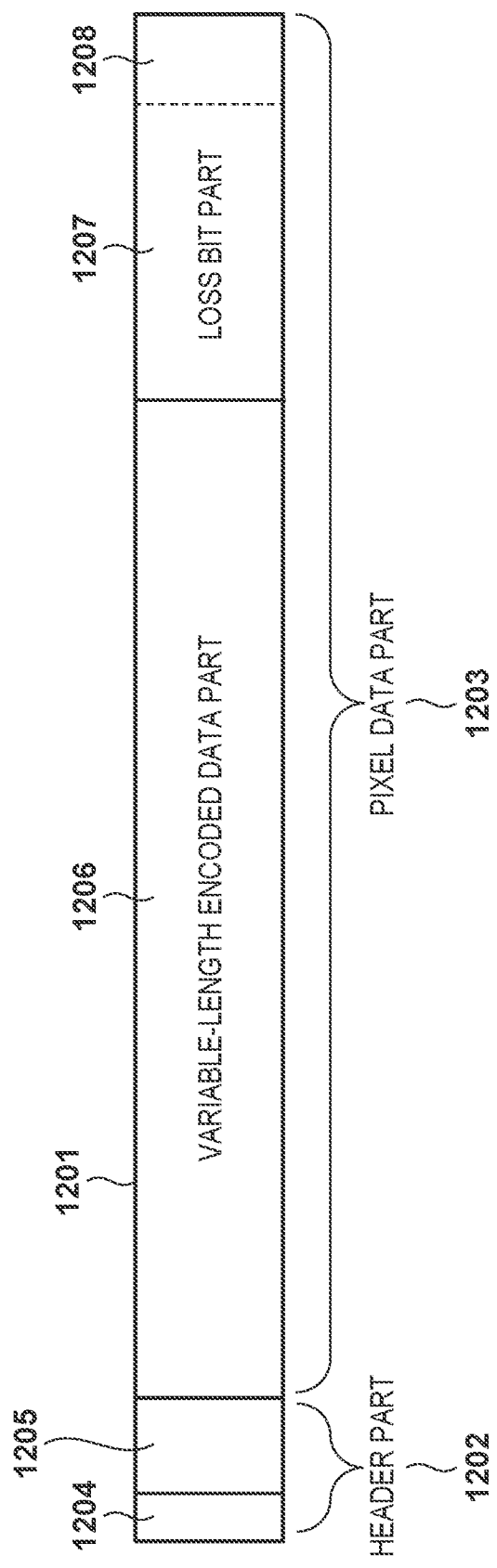
FIG. 12 is a diagram illustrating a format of encoded data in a DPCM mode.

The encoding format used in the DPCM mode will be described here with reference to FIG. 12. As described above, in the present embodiment, the compression rate for the coding block is set to 6/10, and thus the size of a coding block 1201 illustrated in FIG. 12 is equal to the 144 bits that is the target code length.

The coding block 1201 includes a header part 1202 (three bits) and a pixel data part 1203 (141 bits). The header part 1202 includes an encoding mode flag 1204 (one bit) indicating the encoding mode and a QP value part 1205 (two bits) indicating the QP. The pixel data part 1203 includes a variable-length encoded data part 1206, a loss bit part 1207, and a stuffing part 1208. Note that the stuffing part 1208 may not be present.

The encoding mode flag and QP output from the QP deciding unit 215 are stored in the encoding mode flag 1204 (one bit) and the QP value part 1205 (two bits) of the header part 1202, respectively. In the present embodiment, the value of the encoding mode flag indicating the DPCM mode is assumed to be 0. The variable-length encoded data from the encoding unit 211E (24 pixels' worth) is packed in order, in units of bits, using the code length of each pixel, and is stored in the variable-length encoded data part 1206.

The loss bits output from the encoding unit 211E are stored in the loss bit part 1207 of the coding block 1201. The loss bit part 1207 is a region immediately following the variable-length encoded data part 1206. The method for storing the loss bits will be described in detail later.

Note that when the variable-length encoded data amount in the variable-length encoded data part 1206 is the same size as the pixel data part 1203, no region for storing the loss bits will be left in the coding block 1201. In this case, the loss bits are not stored in the coding block 1201. Additionally, when the size of a region which is the total of the header part 1202, the variable-length encoded data part 1206, and the loss bit part 1207 is less than the target code length, the leftover region is filled with the stuffing part 1208 (dummy bits).

Figure 13A:
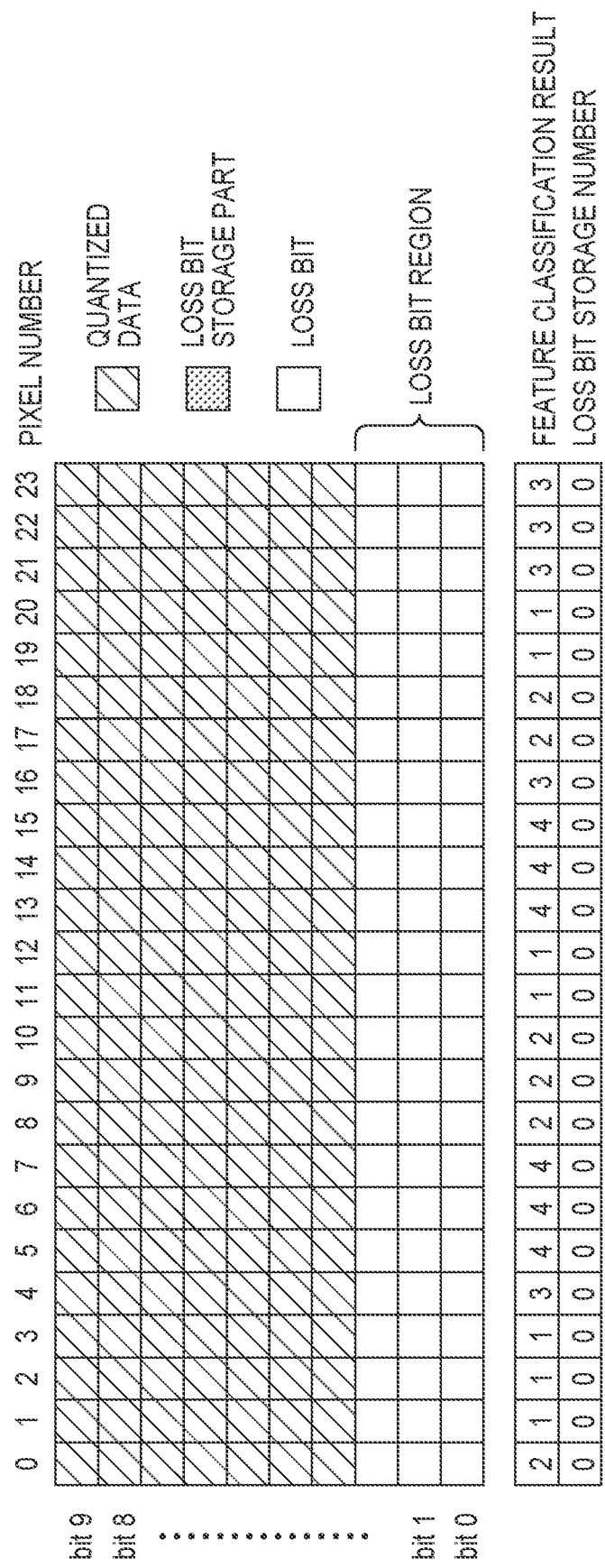
FIG. 13A to 13C are diagrams illustrating a method for storing loss bits in the DPCM mode.
Figure 13B:
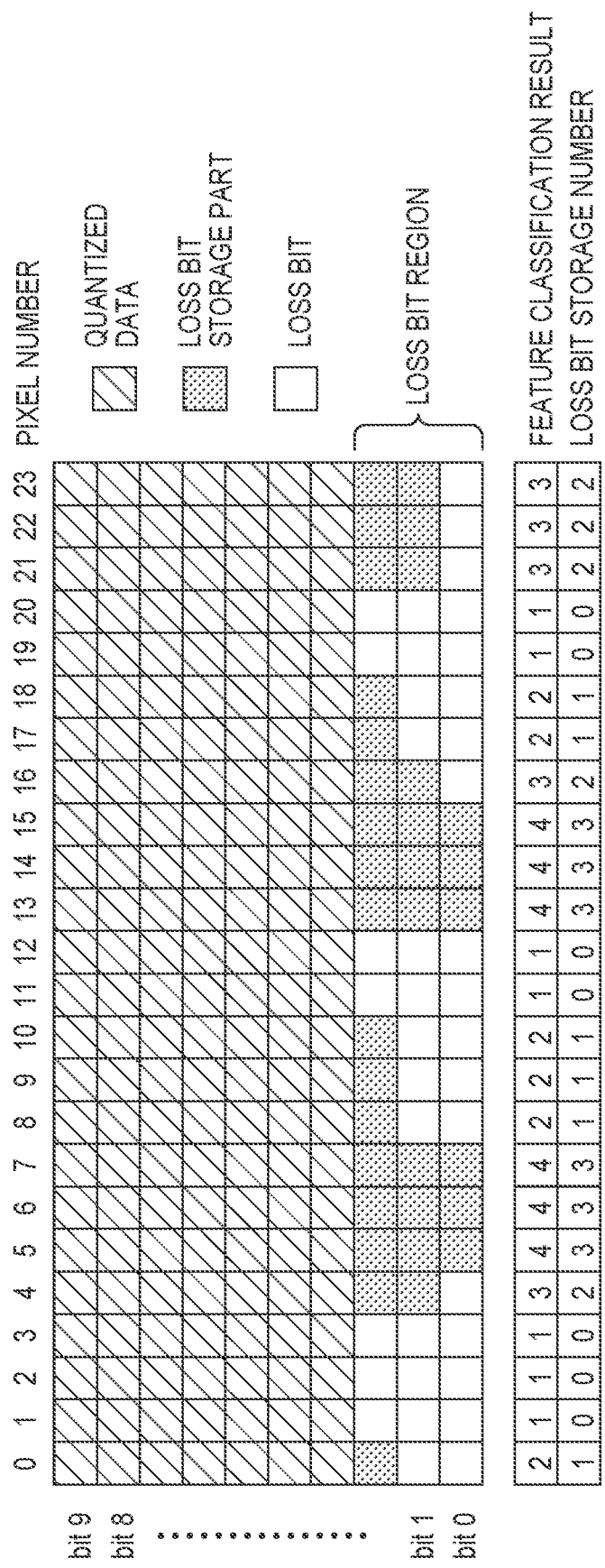
Figure 13C:
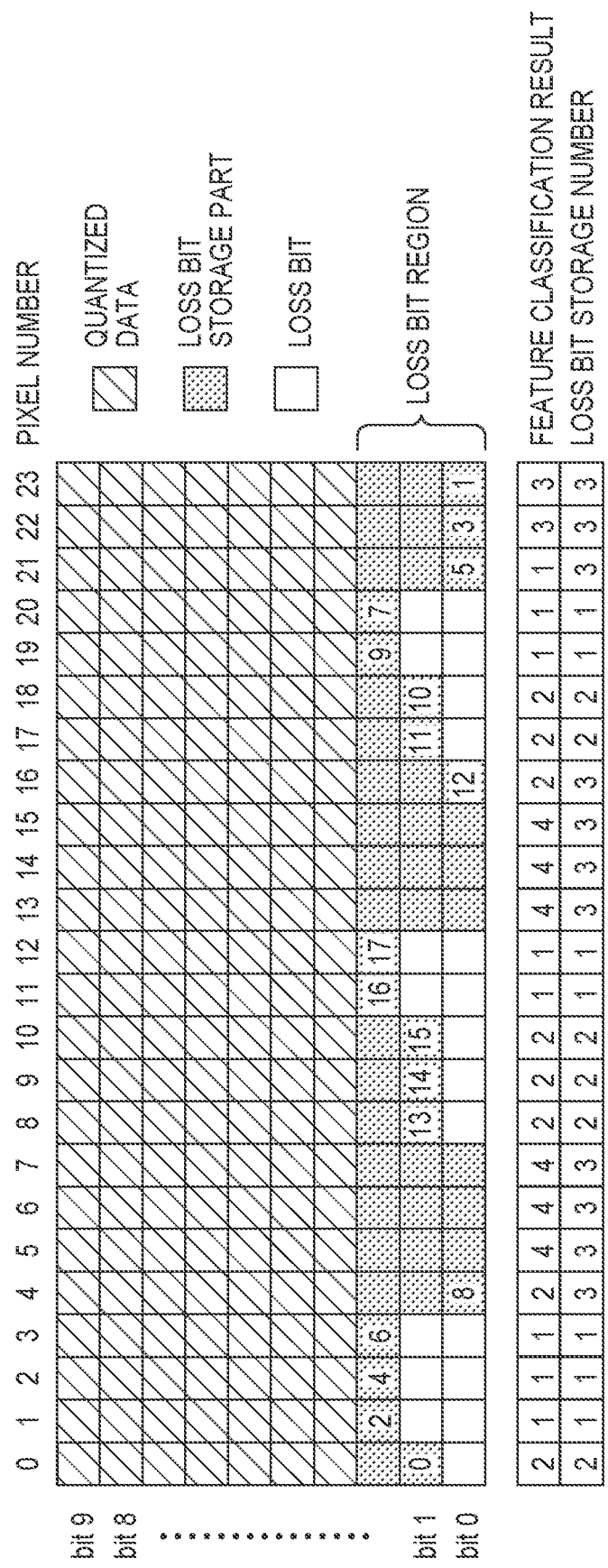

A method for storing the loss bits in the DPCM mode will be described here with reference to FIGS. 13A to 13C. For the sake of simplicity, FIGS. 13A to 13C are diagrams illustrating all the bits in the image data of the coding block when QP=3, where the horizontal direction represents the sequence of 24 pieces of pixel data and the vertical direction represents the 10-bit bit depth. FIGS. 13A to 13C illustrate feature classification results for each pixel and the number of stored loss bits for each pixel, and illustrate an example of a case where there are seven pixels with a rank of 1, six pixels with a rank of 2, five pixels with a rank of 3, and six pixels with a rank of 4.

FIG. 13A illustrates all the bits in the coding block before the multiplexing unit 223 stores the loss bits, where the seven most significant bits of each pixel are the quantized data and the three least significant bits are the loss bits.

The multiplexing unit 223 decides a loss bit storage number based on the feature classification result for each pixel, and stores the loss bits in a loss bit region indicated in FIG. 13A. In the present embodiment, a loss bit storage number store_bits [pix] of each pixel is found through the following Equation (8).

$$\text{store\_bits[pix]} = \text{free\_num}[qp] \times \text{weight[pix]} \qquad (8)$$

Here, "pix" represents the pixel number (one of 0 to 23 in this embodiment) in the coding block. Additionally, free_num [qp] represents the number of free bits in the selected QP. weight [pix] is a decimal, less than or equal to 1, indicating how noticeable degradation is in each pixel (this is called a "weighting coefficient"). In other words, Equation (8) indicates that the number of free bits free_num [qp] is assigned to each pixel according to the weighting coefficient weight [pix].

Additionally, in the present embodiment, the weighting coefficient weight [pix] is found through the following Equation (9).

$$\text{weight[pix]} = \text{rank[pix]}/\text{SUM}(\text{rank[pix]}) \qquad (9)$$

Here, rank [pix] is the feature classification result of each pixel, and SUM(rank[pix]) is the sum of rank [pix] for all of the pixels in the coding block.

Note that it is assumed that the multiplexing unit 223 clips the value of store_bits [pix] to the value of QP when e value of the loss bit storage number store_bits [pix] calculated through Equation (8) and Equation (9) exceeds the value of QP. This is because the loss bits in each pixel cannot be stored above the value of QP (3 or higher, in this specific example).

The foregoing essentially indicates that the number of free bits when storing encoded data for a fixed length is obtained by free_num [qp]. This means that as the rank of the pixel increases, a greater number of free bits is allocated in order to hold the loss bits.

The aforementioned method of calculating the loss bit storage number for each pixel, the method of calculating the weighting coefficient, and so on are merely examples, and the methods are not limited to those described here. For example, a loss bit storage number based on the feature classification result of each pixel may be determined in advance, such as storing one bit for pixels having the rank of 1, storing three bits for pixels having a rank of 3, and so on. Additionally, although the present embodiment describes calculating the weighting coefficient using only the feature classification result of each pixel, it is also possible to adjust the weighting coefficient to be higher in pixels closer to both ends of the coding block, taking into account how degradation is more noticeable at the boundary areas of coding blocks.

FIG. 13B is a diagram illustrating all the bits of the coding block after the multiplexing unit 223 has stored the loss bits. FIG. 13B illustrates an example of a case where the number of free bits free_num [qp (=3)] is "52". It can be seen that more loss bits are stored for pixels where degradation is more noticeable, such as three bits for pixels having a rank of 4, two bits for pixels having a rank of 3, one bit for pixels having a rank of 2, and 0 bits for pixels having a rank of 1.

Here, it should be noted that the total value of loss bit storage number store_bits [pix] of all the pixels in the coding block illustrated in FIG. 13B is not necessarily equal to the number of free bits free_num [qp]. This is because store_bits [pix], on the right side of Equation (8), is an integer, and thus values of free_num [qp]×weight [pix] on the left side of Equation (8), below the decimal point are discarded.

Therefore, in order to store all the bits of the number of free bits free_num [qp] in the coding block, it is necessary to further store leftover bits produced by the calculation error in Equation (8) (called "residual_loss") in the loss bit region. In the present embodiment, the leftover bits residual_loss is found through the following Equation (10).

$$\text{residual\_loss} = \text{free\_num}[qp] - \text{SUM}(\text{store\_bits[pix]}) \qquad (10)$$

Here, SUM(rank[pix]) is the total value of store_bits [pix] in all of the pixels within the coding block.

The multiplexing unit 223 furthermore stores the leftover bits residual_loss, calculated through Equation (10), in the loss bit region indicated in FIG. 13B. A method by which the multiplexing unit 223 stores the leftover bits in the loss bit region will be described hereinafter.

FIG. 13C is a diagram illustrating all the bits of the coding block after the multiplexing unit 223 has stored the leftover bits calculated through Equation (10). FIG. 13C illustrates an example of a case where leftover bits residual_loss=18, where the numbers appended to the loss bit storage parts (0 to 17) indicate storage priority levels for the leftover bits.

The multiplexing unit 223 stores the leftover bits in parts where loss bits have not yet been stored in FIG. 13B. At this time, leftover bits are stored for more significant bits of each pixel, starting from both ends of the coding block and moving toward the center, such as indicated by bit 1 for pixel number 0, bit 0 for pixel number 23, bit 0 for pixel number 1, and so on. Doing so makes it possible to reduce degradation in the image at boundary areas of the coding blocks.

Note that the method for storing the leftover bits is not limited to the method described above. For example, it is also possible to store the leftover bits preferentially from the center of the coding block. Alternatively, the leftover bits can be stored with priority given to pixels in which degradation is more noticeable, in accordance with the feature classification result of each pixel.

In this manner, visual degradation noticeable to the human eye can be reduced by the multiplexing unit 223 preferentially storing the lost bits of pixels in which image degradation is more noticeable in the loss bit part 1207 indicated in FIG. 12.

The encoding format used in the PCM mode will be described next with reference to FIG. 14. In the present embodiment, the size of a coding block 1401 is 144 bits, corresponding to the target code length, in the same manner as in the case of the DPCM mode.

The coding block 1401 includes an encoding mode flag 1402 (1 bit) indicating the encoding mode and a quantized data part 1403 (143 bits). The encoding mode flag from the QP deciding unit 215 is stored in the encoding mode flag 1402 (1 bit). In the present embodiment, the value of the encoding mode flag indicating the PCM mode is assumed to be 1. The quantized data from the encoding unit 211E (24 pixels' worth) is packed in order, in units of bits, using the code length of each pixel, and is stored in the quantized data part 1403. In the present embodiment, QP is 4 when the PCM mode is used, but as described above, one of the pixels of the coding block is quantized with the QP having been raised one step to 5. As such, 23 of the 24 pixels are quantized to six bits per pixel, and one of the pixels is quantized to five bits. Thus, a total of 23×6+5=143 bits of quantized data is stored in the quantized data part 1403.

In this manner, the encoded data multiplexed according to the encoding mode for each coding block is output to an output terminal 202 as stream data, and is input to the memory 30.

As described above, when a code length obtained through encoding at the level of pixels in a single coding block is less than a fixed length, the image encoding unit 20 according to this embodiment stores bits lost due to quantization in free regions for pixels in which degradation due to encoding is more noticeable. This makes it possible to suppress a drop in image quality more than in the past.

Details of Image Decoding Unit 40

Figure 4:
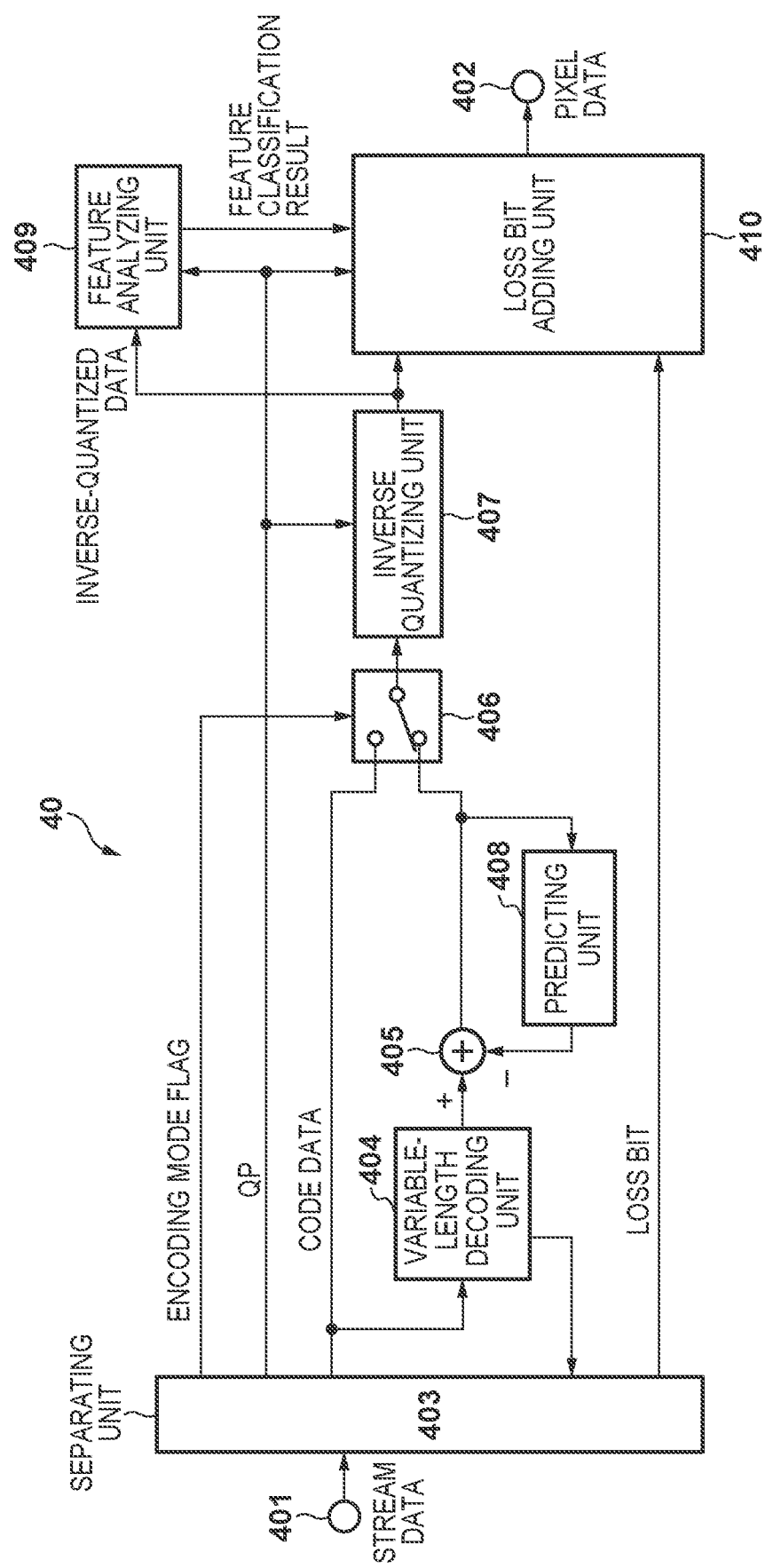
FIG. 4 is a block diagram illustrating the image encoding unit in detail.

The configuration and operations of the image decoding unit 40, which decodes the encoded data generated by the image encoding unit 20, will be described with reference to FIG. 4. FIG. 4 is a block diagram illustrating, in detail, the configuration of the image decoding unit 40. The image decoding unit 40 can decode encoded data held in the memory 30.

The image decoding unit 40 illustrated in FIG. 4 includes a separating unit 403, a variable-length decoding unit 404, an adder 405, a selector 406, an inverse quantizing unit 407, a predicting unit 408, a feature analyzing unit 409, and a loss bit adding unit 410. The image decoding unit 40 may be configured as integrated hardware including dedicated devices, logic circuits, memory, and the like, or may be distributed throughout a plurality of devices or the like. Alternatively, the functions of the image decoding unit 40 may be implemented by memory, processing programs stored in the memory, and a computer such as a CPU which executes the processing programs.

The stream data generated by the image encoding unit 20 and temporarily stored in the memory 30 (i.e., encoded data of each coding block) is input to the separating unit 403 through an input terminal 401.

The separating unit 403 separates the encoding mode flag, the QP, the code data, and the loss bits at the start of the input stream data, and outputs these in sequence in each processing cycle.

The separating unit 403 outputs the code data (which is quantized data in the case of PCM) to the variable-length decoding unit 404 and the selector 406. The variable-length decoding unit 404 performs variable-length decoding on the input code data, outputs the decoded data to the adder 405, and outputs the code length of the code to the separating unit 403. The separating unit 403 cumulatively adds the code length until the variable-length decoding unit 404 has decoded 24 pixels' worth of variable-length code included in a single coding block. Then, by subtracting the value obtained by the cumulative adding from the fixed length, the separating unit 403 sets a storage location of the loss bit part in the fixed length data (to be more precise, the total size of the loss bit part 1207 plus the stuffing part 1208), and outputs the data including the loss bit part to the loss bit adding unit 410.

The adder 405 adds prediction data from the predicting unit 408 (described later) to the decoded data to obtain a decoded value, and outputs the decoded value to the selector 406 and the predicting unit 408.

The predicting unit 408 generates prediction data for the current image data using the decoded value from the adder 405. The method for generating the prediction data is the same as the method by which the predicting unit 302 of the encoding unit 211 generates the prediction data, described earlier.

On the basis of the encoding mode flag, the selector 406 selects the code data from the separating unit 403 when the PCM mode is used, selects the data output from the adder 405 when the DPCM mode is used, and outputs the selected data to the inverse quantizing unit 407 as quantized data.

Using the QP input from the separating unit 403, the inverse quantizing unit 407 generates inverse-quantized data by inverse-quantizing the quantized data from the selector 406, and outputs the inverse-quantized data to the feature analyzing unit 409 and the loss bit adding unit 410. Note that when the encoding mode is PCM, the separating unit 403 outputs "4" as the QP.

The feature analyzing unit 409 includes buffer memory that stores one coding block's worth of inverse-quantized data. Then, using the same method as the feature analyzing unit 225 of the main encoding system 220, the feature analyzing unit 409 performs feature analysis on the inverse-quantized data stored in the buffer, and classifies a feature of each pixel. The feature analyzing unit 409 also outputs a feature classification result to the loss bit adding unit 410.

The loss bit adding unit 410 also includes buffer memory that stores one coding block's worth of inverse-quantized data and loss bits. The loss bit adding unit 410 generates decoded image data by adding the loss bits output from the separating unit 403 to the inverse-quantized data. The method for adding the loss bits is the same as the method used by the multiplexing unit 223 of the main encoding system 220 (in the present embodiment, the non-loss bit part indicated in FIG. 13C is decoded).

A specific example of the loss bit adding processing performed by the loss bit adding unit 410 will be described here. Assume that here, the pixel to be decoded is the first pixel in FIG. 13C. The seven most significant bits out of 10 bits are obtained by the inverse quantization. Accordingly, the loss bit adding unit 410 can determine to add two bits to that pixel on the basis of the feature classification result from the feature analyzing unit 409. The loss bit adding unit 410 reads the corresponding two bits from the buffer and supplements the two more significant bits (bit 2 and bit 1) that are dominant with respect to the number of loss bits of "3" of the pixel of interest. The loss bit adding unit 410 adds a pre-set value (e.g., "0") to the least significant bit 0 that cannot be supplemented. Through this, the loss bit adding unit 410 can decode the 10 bits of pixel data of the pixel of interest. The loss bit adding unit 410 outputs the 10 bits of data representing the pixel of interest after the supplementing to an output terminal 402.

As described thus far, according to the present embodiment, even when steep edges and the like are present in image data to be encoded and it is necessary to allocate a long code length to such edge components, degradation visible to the human eye can be reduced by storing the loss bits preferentially for pixels where such image degradation is easily noticeable.

Note that the image encoding unit 20 may perform the main encoding using the main encoding system 220, without performing the provisional encoding using the provisional encoding system 210. In this case, the encoding unit 211E of the main encoding system 220 may perform the quantization according to a predetermined quantization parameter, for example. When performing the quantization according to a predetermined quantization parameter, the image decoding unit 40 can also perform inverse quantization according to the same quantization parameter.

In the foregoing embodiment, the provisional encoding system 210 includes four encoding units 211A to 211D, which perform encoding in the DPCM mode with a QP of 0, 1, 2, and 3, respectively. When the target code length is exceeded even when QP is 3, the main encoding system 220 performs the encoding in the PCM mode with a QP of 4. However, PCM encoding is not necessarily required. For example, the bit depth of one pixel is defined as M and the target code length of one coding block is defined as Ctarget. Assume that the value of QP required to keep the total code length per coding block below the target code length in the DPCM mode in a worst-case scenario is "N" (where N<M−1). If the encoded data in the DPCM mode with a QP of N is permitted as final data, the provisional encoding system 210 is provided with N+1 encoding units having QPs of 0 to N. The QP deciding unit 215 determines a code length for each of the N+1 encoding units, and determines the maximum QP at which the total code length of a single coding block is less than or equal to the target code length Ctarget as the applied QP. The main encoding system 220 may perform the encoding in the DPCM mode, according to the decided applied QP.

Additionally, in the foregoing embodiment, the index value (rank) representing how noticeable degradation is determined from the three indicators of brightness, flatness, and complexity, but the processing may be simplified by using only one of these indicators. For example, the rank value may be increased as the brightness decreases. Alternatively, the rank value may be increased as the degree of flatness increases.

It is also desirable to apply the foregoing embodiment in an image capturing apparatus such as a digital camera or a video camera. For example, a control circuit including the image encoding unit 20 is provided for an image capturing unit, and a control circuit including the image decoding unit 40 is provided for units that take image capturing results and perform various types of image processing. As a result, normal communication between the two control circuits can be performed without overwhelming the communication bandwidth, even when the image capturing resolution is increased.

Second Embodiment

The feature analyzing unit 225 according to the second embodiment can obtain indices indicating the brightness and flatness in a single process. Specifically, the feature analyzing unit 225 according to the second embodiment performs a frequency transform on the inverse-quantized block constituted by a plurality of inverse-quantized data, and performs the feature classification using a coefficient from after the frequency transform.

Like the first embodiment, the present second embodiment can reduce degradation visible to the human eye by preferentially storing loss bits for pixels in which image degradation is noticeable. The second embodiment will describe parts that are different from the first embodiment, and parts that are the same as in the first embodiment will not be described.

Figure 15:
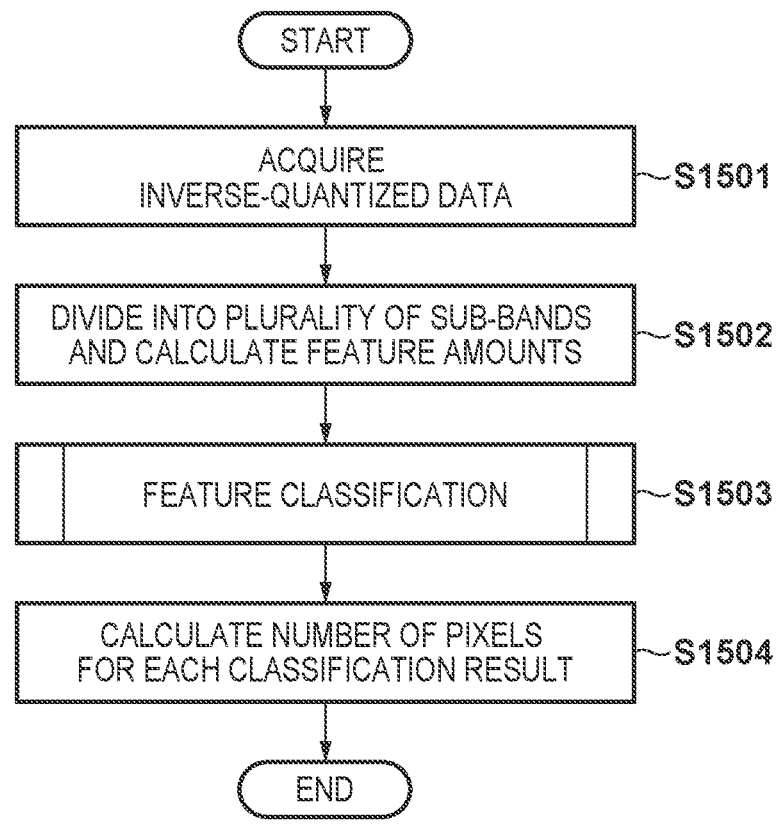
FIG. 15 is a flowchart illustrating feature analysis processing by a feature analyzing unit according to a second embodiment.

A feature analysis method used by the feature analyzing unit 225 according to the present second embodiment will be described with reference to FIG. 15.

In step S1501, the feature analyzing unit 225 acquires the inverse-quantized data from the inverse quantizing unit 224, and generates an inverse-quantized block constituted by a plurality of inverse-quantized data.

In step S1502, the feature analyzing unit 225 performs a single wavelet transform in the horizontal direction on the inverse-quantized block generated in step S1501, and divides the inverse-quantized block into an L band (where "L" means "low-frequency component") and an H band (where "H" means "high-frequency component"). The present embodiment uses the Haar wavelet transform, which is easy to implement, but the number of times, the direction, and method, and so on of the wavelet transform are not limited to the aforementioned method. For example, a plurality of wavelet transforms may be performed in the horizontal direction so break the inverse-quantized block down into even finer sub-bands. Additionally, when coding block has a two-dimensional shape, a DWT or the like using a 5×3 tap filter, such as that employed by JPEG 2000, can also be used.

A specific example of each sub-band generated by the feature analyzing unit 225 will be described here with reference to FIGS. 16A and 16B.

FIG. 16A is a diagram illustrating the image data (coding block) to be encoded in the present embodiment, and like FIG. 5A, pixel numbers 0 to 23 are assigned in the order of R0, G0, B0, R1, G1, B1, and so on, in raster scan order.

FIG. 16B is a diagram illustrating a coding block obtained as a result of the feature analyzing unit 225 performing the wavelet transform on the coding block illustrated in FIG. 16A. At this time, the feature analyzing unit 225 finds a coefficient in each sub-band through the following Equation (11) and Equation (12). Note that in the present embodiment, C in Equation (11) and Equation (12) means one of the color components of R, G, or B, and pixel number pix is an even number from 0 to 6.

$$LC[\text{pix}]=(C[\text{pix}]+C[\text{pix}+1])/2 \qquad (11)$$

$$HC[\text{pix}]=(C[\text{pix}]-C[\text{pix}-1])/2 \qquad (12)$$

The feature analyzing unit 225 according to the second embodiment uses the L band coefficient (the low-frequency component) indicated in FIG. 16B as an indicator of the brightness of each pixel, and uses the H band coefficient (the high-frequency component) as an indicator of the flatness of each pixel. Note that Equation (11) and Equation (12) calculate the L band coefficient and the H band coefficient for each of two adjacent pixels. Accordingly, the feature analyzing unit 225 according to the second embodiment holds feature amounts (brightness and flatness) having the same values for two adjacent pixels.

In this manner, in step S1502, the feature analyzing unit 225 calculates the feature amounts, i.e., the brightness and the flatness, for each pixel.

In step S1503, the feature analyzing unit 225 performs feature classification using the calculated feature amounts. The feature classification method is the same as the method illustrated in FIG. 11.

Although the present embodiment describes an example in which a wavelet transform is used as the method for the frequency transform performed by the feature analyzing unit 225, the method is not absolutely limited thereto. For example, the feature analyzing unit 225 can also perform a discrete cosine transform (DCT), a direct cosine transform such as a KIT transform, or the like on the inverse-quantized block, and use the obtained coefficient as one of the feature amounts.

Third Embodiment

In the first embodiment described above, when the encoding mode is DPCM, the quantization and variable-length encoding is performed on a coding block of interest (24 pixels) with QP being one of 0 to 3. When the obtained code length is less than the target code length (144 bits) and there is a free region with respect to the target code length, the bits lost due to the quantization of pixels in which deterioration is easily noticeable are preferentially stored in the free region. Meanwhile, when the encoding mode is PCM, the quantization is performed with a QP of 4. 144-bit fixed-length data is then generated, with one bit indicating that the encoding mode is PCM, five bits for one of the 24 pixels, and six bits for each of the other 23 pixels. In other words, when the encoding mode is PCM, how noticeable the degradation of each pixel is not taken into account.

The present third embodiment will describe an example in which fixed-length code data that takes into account how noticeable degradation is generated even when the encoding mode is PCM. The apparatus configuration is the same as in FIG. 2, and is the same as in the first embodiment with the exception of the QP deciding unit 215 of the provisional encoding system 210, and an encoding unit 213E and the multiplexing unit 223 of the main encoding system 220. Additionally, the details of the encoding when the encoding mode is DPCM are the same as in the first embodiment, and the data structure of the code data generated in this case is also the same as in FIG. 12, and thus descriptions thereof will not be given.

Figure 17:
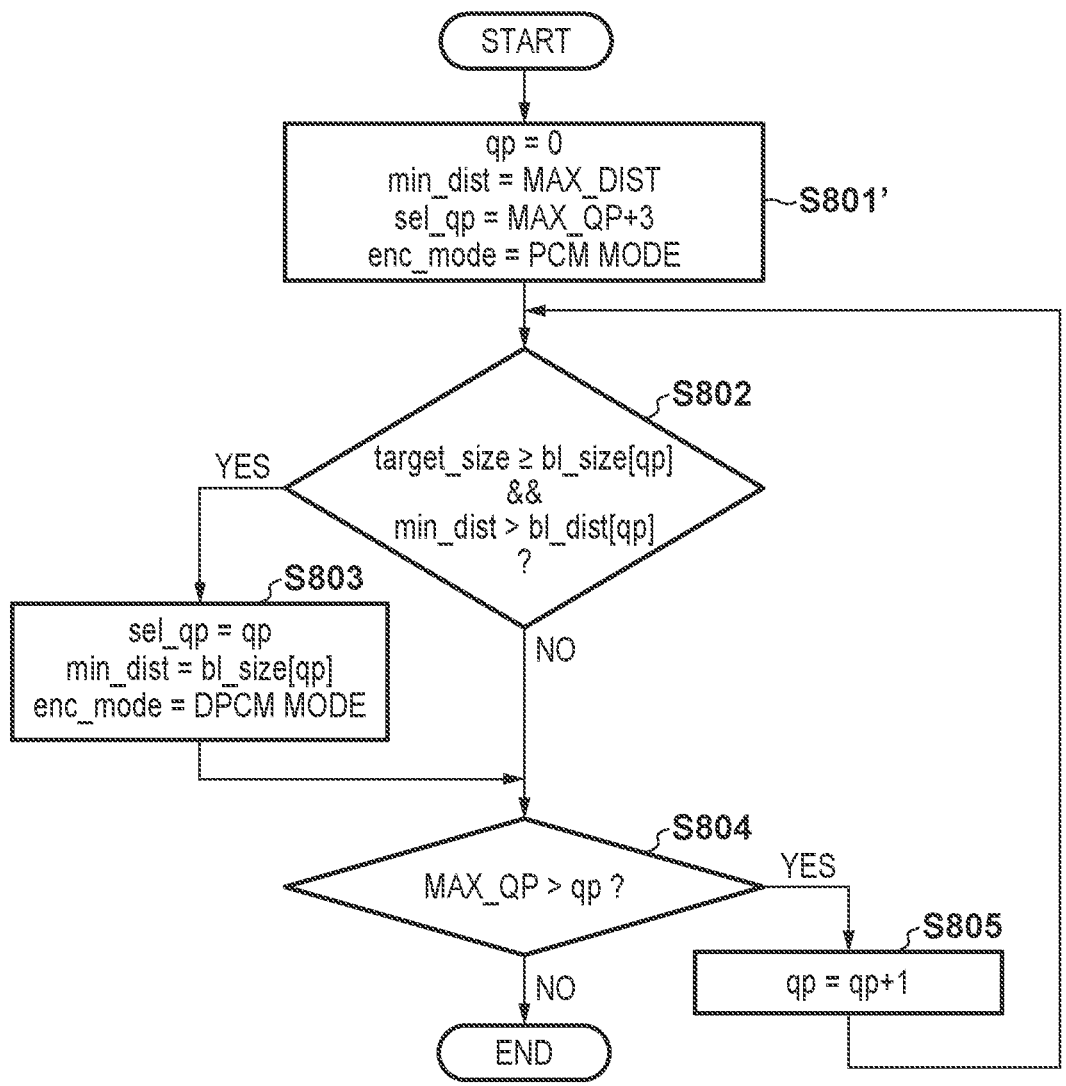
FIG. 17 is a flowchart illustrating processing for deciding an encoding mode and an applied QP according to a third embodiment.

FIG. 17 is a flowchart illustrating processing through which the QP deciding unit 215 in the provisional encoding system 210 decides the encoding mode and the QP, according to the present third embodiment. The only difference from FIG. 8, described in the first embodiment, is step S801', and the rest of the flowchart is the same. The difference is that in the first embodiment, MAX_QP+1 is substituted for the variable sel_qp, whereas in the present third embodiment, MAX_QP+3 is substituted for the variable sel_qp. MAX_QP is "3", and thus the variable sel_qp is initialized to "6". It is sufficient for the value to which the variable sel_qp is initialized to be greater than MAX_QP+1 and less than 10, which is the bit depth of the image data. Accordingly, the "+3" indicated here should be understood as being merely an example.

It can be understood from the descriptions given thus far that if the QP deciding unit 215 performs the processing illustrated in FIG. 17 but does not execute the process of step S803 even once, the encoding mode for the coding block of interest will be PCM, and the applied QP at that time will be decided as 6.

Accordingly, the encoding unit 211E in the main encoding system 220 quantizes each pixel in the coding block at $2^6$, and outputs the quantized data (four bits) to the multiplexing unit 223 as the code data. The encoding unit 211E also outputs the loss bits (six bits) to the multiplexing unit 223.

Figure 18:
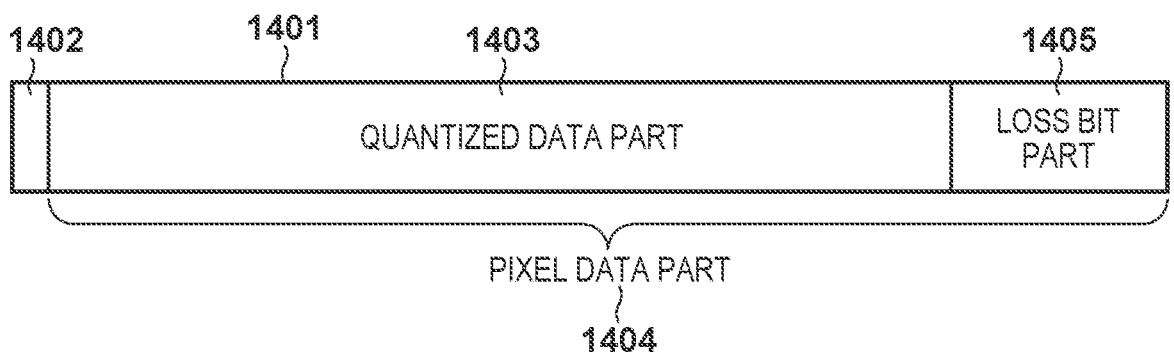
FIG. 18 is a diagram illustrating a format of encoded data in a PCM mode according to the third embodiment.

The format of the encoded data when the encoding mode for the coding block is the PCM mode in the present third embodiment is the structure illustrated in FIG. 18. The encoding format used in the PCM mode will be described below with reference to FIG. 18. In the present third embodiment, the size of the coding block 1401 is 144 bits, corresponding to the target code length, in the same manner as in the case of the DPCM mode.

The coding block 1401 is constituted by the encoding mode flag 1402 (1 bit) indicating the encoding mode and a pixel data part 1404 (143 bits). The encoding mode flag from the QP deciding unit 215 is stored in the encoding mode flag 1402 (1 bit). In the present embodiment, the value of the encoding mode flag indicating the PCM mode is assumed to be 1, in the same manner as in the first embodiment. The quantized data from the encoding unit 211E (24 pixels' worth) is packed in order, in units of bits, using the code length of each pixel, and is stored in the quantized data part 1403. In the present third embodiment, QP is 6 when the PCM mode is used, but as described above, one of the pixels in the pixel block within the coding block is quantized with the QP having been raised one step to 7. As such, one of the 24 pixels is quantized to three bits, and the remaining 23 pixels are quantized to four bits. Thus, a total of 3+23×4=95 bits of quantized data is stored in the quantized data part 1403.

As with the DPCM mode, the loss bits output from the encoding unit 211E are stored in a loss bit part 1405 of the coding block 1401. With the PCM mode, the size of the loss bit part 1405 is fixed according to the QP, in the same manner as the quantized data part 1403. In the present third embodiment, the size of the loss bit part 1405 is 48 bits, which is obtained by subtracting the quantized data part 1403 (95 bits) from the pixel data part 1404 (143 bits). Additionally, in the PCM mode, the number of free bits free_num [qp] relative to the target code length is equal to the size of the loss bit part 1405, which is 48 bits, as described above.

Figure 19C:
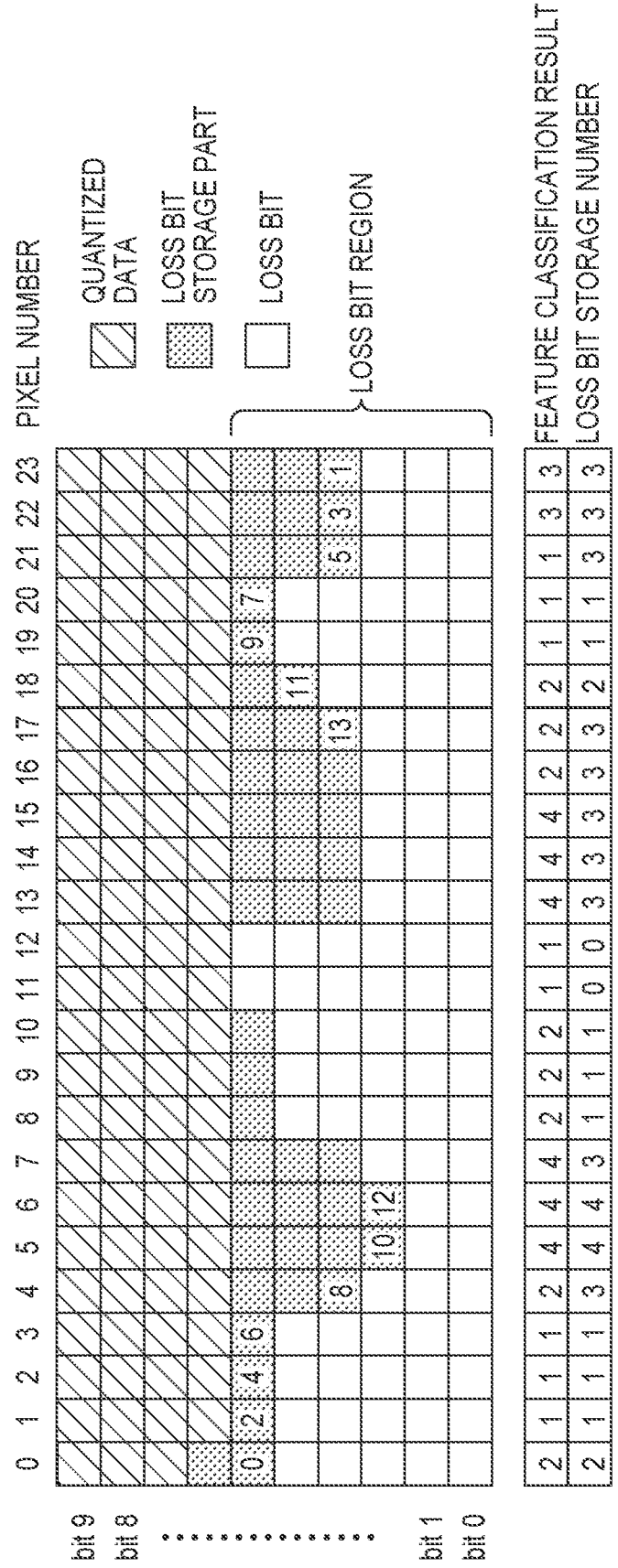

A method for storing the loss bits in the PCM mode according to the present third embodiment will be described here with reference to FIGS. 19A to 19C. FIGS. 19A to 19C are diagrams illustrating all of the bits of the image data of the coding block when a QP of 6 is selected, and as described above, one pixel located at the left end of the coding block is quantized one step higher, i.e., with a QP of 7.

Like FIGS. 13A to 13C, FIGS. 19A to 19C illustrate a sequence of 24 pieces of pixel data in the horizontal direction and a 10-bit bit depth in the vertical direction. Additionally, FIGS. 19A to 19C illustrate the results of the feature classification of each pixel and the number of stored loss bits for each pixel, and illustrate an example of a case where there are seven pixels with a rank of 1, six pixels with a rank of 2, five pixels with a rank of 3, and six pixels with a rank of 4, the rank being an indicator of the complexity.

FIG. 19A illustrates all the bits in the coding block before the multiplexing unit 223 stores the loss bits, where the four most significant bits of each pixel are the quantized data and the six least significant bits are the loss bits. Note that for the one pixel located on the left end of the coding block, the three most significant bits are the quantized data and the seven least significant bits are the loss bits.

As with the DPCM mode, the multiplexing unit 223 decides a loss bit storage number based on the feature classification result for each pixel, and stores the loss bits in a loss bit region indicated in FIG. 19A. In other words, the multiplexing unit 223 decides the loss bit storage number store_bits [pix] for each pixel using Equation (8) and Equation (9).

FIG. 19B is a diagram illustrating all the bits of the coding block after the multiplexing unit 223 has stored the loss bits. FIG. 19B illustrates an example of a case where the number of free bits free_num [qp] (=6)] is "48". It can be seen that more loss bits are stored for pixels where degradation is more noticeable, such as three bits for pixels having a rank of 4, two bits for pixels having a rank of 3, one bit for pixels having a rank of 2, and 0 bits for pixels having a rank of 1.

As with the DPCM mode, the multiplexing unit 223 furthermore adds the leftover bits residual_loss, calculated through Equation (10), to the loss bit region indicated in FIG. 19B. A method by which the multiplexing unit 223 stores the leftover bits in the loss bit region will be described hereinafter.

FIG. 19C is a diagram illustrating all the bits of the coding block after the multiplexing unit 223 has stored the leftover bits calculated through Equation 10). FIG. 19C illustrates an example of a case where leftover bits residual_loss=14, where the numbers appended to the loss bit storage parts (0 to 17) indicate storage priority levels for the leftover bits.

The multiplexing unit 223 stores the leftover bits in parts where loss bits have not yet been stored in FIG. 19B. At this time, leftover bits are stored with preference given to more significant bit positions in each pixel, starting from both ends of the coding block and moving toward the center, such as indicated by bit 5 for pixel number 0, bit 3 for pixel number 23, bit 5 for pixel number 1, and so on. Doing so makes it possible to reduce degradation in the image at boundary areas of the coding blocks.

Note that the method for storing the leftover bits is not limited to the method described above. For example, it is also possible to store the leftover bits preferentially from the center of the coding block. Alternatively, the leftover bits can be stored with priority given to pixels in which degradation is more noticeable, in accordance with the feature classification result of each pixel.

Figure 14:
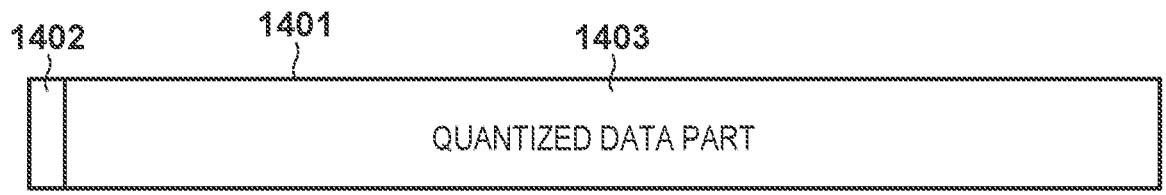
FIG. 14 is a diagram illustrating a format of encoded data in a PCM mode.

In this manner, visual degradation noticeable to the human eye can be reduced by the multiplexing unit 223 preferentially storing the loss bits of pixels in which image degradation is more noticeable in the loss bit part 1405 indicated in FIG. 14.

The processing performed by the image encoding unit 20 in the third embodiment has been described thus far. The decoding processing performed by the image decoding unit 40 when the encoding mode is DPCM in the present third embodiment is the same as in the first embodiment. Additionally, when the encoding mode is PCM, the image decoding unit 40 simply adds processing for adding the loss bits to the quantized data in the same manner as with DPCM, and thus descriptions thereof will not be given.

The encoding may be performed using a simpler PCM mode in order to reduce the hardware scale of the predicting units, the variable-length encoding units, and so on of the provisional encoding system and the main encoding system.

According to the present third embodiment as described thus far, the image quality can be expected to be better when the encoding mode is PCM than in the first embodiment. The reason for this is that according to the present third embodiment, even when the encoding mode is PCM, the encoding is performed having taken into account the noticeability of the degradation of each pixel in the coding block of interest.

Note that the second embodiment described earlier can also be applied in the present third embodiment.

Fourth Embodiment

In recent years, image capturing devices are known in which the exposure time can be controlled for each pixel, and an image having a multiple different sensitivities depending on the length of the exposure time can be output. By compositing the images having multiple different sensitivities obtained from such an image capturing device, an image having a higher dynamic range than in possible with a conventional image capturing device can be obtained in a single shot. The fourth embodiment will describe a case where an image obtained from such an image capturing device is encoded.

FIG. 20 is a block diagram illustrating the configuration of an image processing apparatus 200 including the above-described image capturing device. The image processing apparatus 200 includes an image capturing unit 50, the image encoding unit 20, the memory 30, the image decoding unit 40, an image compositing unit 60, a developing processing unit 70, a recording processing unit 80, and a recording medium 90.

Aside from physical devices such as the image capturing unit 50, the memory 30, and the recording medium 90, the functions of the blocks in the image processing apparatus 200 may be implemented by either hardware or software. For example, the functions of the blocks may be implemented by hardware such as dedicated devices, logic circuits, memory, and the like. Alternatively, the functions of the blocks may be implemented by memory, processing programs stored in the memory, and a computer such as a CPU which executes the processing programs. Although the image processing apparatus 200 can be implemented as, for example, a digital camera, the image processing apparatus 200 can be implemented as a different device instead. For example, the image processing apparatus 200 can be implemented as any information processing terminal or image capturing apparatus, including personal computers, mobile phones, smartphones, PDAs, tablet terminals, digital video cameras, and the like.

The image capturing unit 50 is an image sensor such as a CCD or CMOS sensor. The image capturing unit 50 photoelectrically converts an optical image formed on the image sensor through an optical system (not shown) and A/D converts an obtained analog signal to output a digital image signal (i.e., RAW data).

The image capturing unit 50 has two operating modes: an operating mode in which the exposure time is the same for each pixel (a normal mode), and an operating mode in which the exposure time differs from pixel to pixel (an HDR mode). When the image capturing unit 50 operates in the normal mode, the image capturing unit 50 outputs one type of image having a predetermined sensitivity in a single shot. However, when the image capturing unit 50 operates in the HDR mode, the image capturing unit 50 outputs a different type of image for each of a plurality of sensitivities in a single shot. These sensitivities, operating modes, and the like can be controlled by a CPU (not shown) provided within the image processing apparatus 200. A user operating the image processing apparatus 200 can change the sensitivities, the operating mode, and the like through the CPU (not shown) included within the image processing apparatus 200.

The present embodiment assumes that when the image capturing unit 50 operates in HDR mode, two types of images are output from the image capturing unit 50, namely a low-sensitivity image captured at a short exposure, and a high-sensitivity image captured at a long exposure. In this case, the amount of data output from the image capturing unit 50 is double the amount output when in the normal mode, and thus the configuration may be such that a plurality of the processing blocks in the later stages (the image encoding unit 20 and the like) are provided, depending on the processing capabilities of those processing blocks. Additionally, the configuration may be such that the image capturing unit 50 can output three or more types of images, such as a low-sensitivity image, a medium-sensitivity image, and a high-sensitivity image.

Although the present embodiment describes a configuration in which the image capturing unit 50 is separate from the image encoding unit 20, the memory 30, and the like, the configuration may be such that, for example, some of the blocks constituting the image processing apparatus 200 are provided in a logic circuit unit or the like included within the image capturing unit 50.

When the image capturing unit 50 operates in the normal mode, the image encoding unit 20 operates in the same manner as described in the first to third embodiments. In other words, by performing feature analysis on the input image data and reducing loss for pixels included in dark areas, flat areas, and so on in the image, the image encoding unit 20 can make visual degradation in the compression encoded image less noticeable.

On the other hand, although details will be given later, when the image capturing unit 50 operates in the HDR mode, the image encoding unit 20 compression encodes each of the low-sensitivity image and the high-sensitivity image output from the image capturing unit 50. Furthermore, by performing feature analysis based on the sensitivity of the input image data, the image encoding unit 20 can make visual degradation in the compression encoded image less noticeable even more effectively than in the first to third embodiments.

When the image capturing unit 50 operates in the normal mode, the memory 30 stores the encoded data output from the image encoding unit 20, in the same manner as in the first to third embodiments. When the image capturing unit 50 operates in the HDR mode, the memory 30 stores the encoded data of the low-sensitivity image and the encoded data of the high-sensitivity image output from the image encoding unit 20.

When the image capturing unit 50 operates in the normal mode, the image decoding unit 40 reads out the encoded data held in the memory 30, decodes the data using a predetermined decoding method, and outputs the decoded image data to later stages, in the same manner as in the first to third embodiments. When the image capturing unit 50 operates in the HDR mode, the image decoding unit 40 reads out the encoded data of the low-sensitivity image and the encoded data of the high-sensitivity image held in the memory 30, decodes the low-sensitivity image and the high-sensitivity image, and outputs the decoded data to later stages.

When the image capturing unit 50 operates in the HDR mode, the image compositing unit 60 generates a high dynamic range image (called an "HDR image") by compositing the low-sensitivity image and the high-sensitivity image output from the image decoding unit 40. When the image capturing unit 50 operates in the normal mode, the image compositing unit 60 outputs the image output from the image decoding unit 40 as-is to the later stages.

The developing processing unit 70 generates recording image data by performing developing processing on the image output by the image compositing unit 60 (the RAW data). To be more specific, the developing processing unit 70 performs color interpolation processing called de-Bayering (demosaicing), color space conversion processing, noise reduction processing, optical distortion correction, enlargement/reduction processing, and the like to generate recording image data expressed as a luminance and color differences, such as YCbCr 4:2:2.

Although the image compositing unit 60 performs the image compositing on the image output from the image decoding unit 40 in the present embodiment, the configuration may be such that, for example, the image compositing unit 60 is provided in a stage after the developing processing unit 70 and performs the image compositing on the developed image output from the developing processing unit 70.

The recording processing unit 80 performs compression processing on the recording image data output from the developing processing unit 70, and stores the compressed recording image data in the recording medium 90. When, for example, the recording image data is a still image, the recording processing unit 80 compresses the recording image data using JPEG compression, HEIF compression, or the like. When the recording image data is a moving image, the recording processing unit 80 compresses the recording image data using MPEG-2, H.264, H.265, or the like.

FIG. 21 is a diagram illustrating an example of the configuration of the image capturing unit 50 according to the present embodiment.

A plurality of unit pixels 501, each constituted by a photoelectric conversion element such as a photodiode, are arranged in a matrix in a pixel unit 500. With the pixel unit 500 according to the present embodiment, exposure times are controlled on a pixel-by-pixel basis by a timing control unit 508 (described later), and two types of pixels are present: long exposure pixels, for which a long exposure time is set, and short exposure pixels, for which a short exposure time is set.

A vertical scanning circuit 502 performs timing control for sequentially reading out pixel signals obtained from the pixel unit 500 in a single frame. In a single frame period, the pixel signals are typically read out on a row-by-row basis, in sequence from the top row to the bottom row.

A column amplifier 503 is constituted by a plurality of column amplifiers, which are provided for each column in the pixel unit 500, and is used for electrically amplifying the signals read out from the unit pixels 501. Amplifying the signals using the column amplifier 503 makes it possible to amplify the pixel signal levels with respect to noise arising in a column ADC 504 in a later stage, which substantially improves the S/N ratio.

The column ADC 504 is constituted by a plurality of circuits, which are provided for each column in the pixel unit 500, and converts the signals amplified by the column amplifier 503 into digital signals. The pixel signals converted into digital signals are read out sequentially by a horizontal transfer circuit 505 and input to a signal processing unit 506.

The signal processing unit 506 is a circuit that processes signals digitally, and can easily carry out gain computations by carrying out shift computations, multiplication, and so on in addition to processing for adding a set offset value through digital processes. When the pixel unit 500 has a structure in which a light-shielded pixel region is present, a digital black level clamping operation may be performed using that region. The signal processing unit 506 has a serializer function, and converts multi-bit input parallel signals in the signal processing unit 506 into a serial signal. The signal processing unit 506 converts this serial signal into an LVDS signal or the like, and outputs the signal to an external device as pixel information.

Memory 507 has a function for temporarily holding the signals read out from the pixel unit 500 and processed by the column amplifier 503, the column ADC 504, and the signal processing unit 506.

The timing control unit 508 controls the overall operations of the image capturing unit 50 by supplying an operating clock signal, timing signals, and the like to the blocks within the image capturing unit 50. The timing control unit 508 can also control the exposure time of each pixel by controlling control signals 516 and 517, which will be described later.

Figure 22:
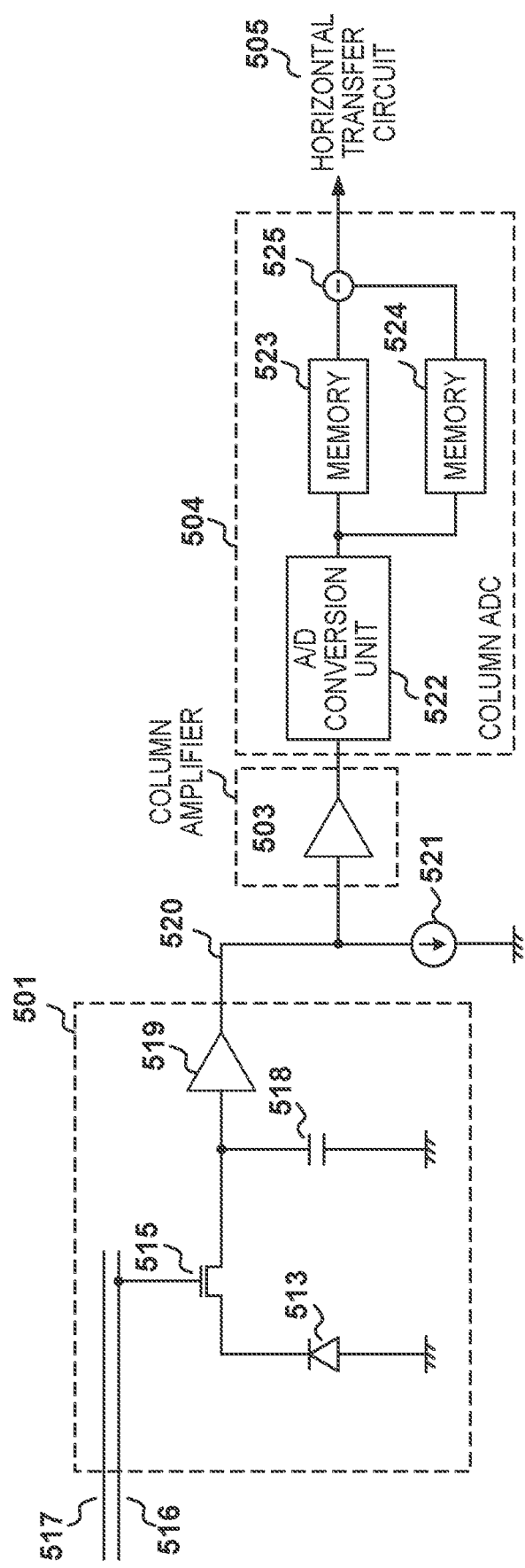
FIG. 22 is a diagram illustrating a flow of signals from a pixel unit, according to the fourth embodiment.

The flow of signals from the pixel unit 500 to the horizontal transfer circuit 505 will be described next with reference to FIG. 22.

A photoelectric conversion unit 513 converts light into a charge through photoelectric conversion. A transfer switch 515 transfers the charge produced by the photoelectric conversion unit 513 to circuitry in later stages.

The control signals 516 and 517 are control signals for controlling the exposure time of each pixel, and are a control signal for short exposure and a control signal for long exposure, respectively. These two control signals are provided for the unit pixels 501, and one of the control signals 516 and 517 is assumed to be connected to the transfer switch 515 of each unit pixel. In the example illustrated in FIG. 22, the control signal 516 for short exposure is connected to the transfer switch 515, and thus the unit pixel 501 illustrated in FIG. 22 is a short exposure pixel. By controlling on/off intervals of these two signals, the timing control unit 508 can control the exposure times on a pixel-by-pixel basis.

A charge holding unit 518 temporarily holds the charge produced by the photoelectric conversion unit 513. A pixel amplifier 519 converts the charge held in the charge holding unit 518 into a voltage signal, and outputs that signal to the column amplifier 503 through a vertical line 520. A current control unit 521 controls a current in the vertical line 520.

The column ADC 504 includes an A/D conversion unit 522, memory 523 and 524, and a subtractor 525. The A/D conversion unit 522 performs A/D conversion on the output from the column amplifier 503. The memory 523 and 524 temporarily hold the digital signal obtained from the conversion by the A/D conversion unit 522. The memory 523 holds a pixel signal read out from the photoelectric conversion unit 513, and a noise signal of a readout circuit unit (the circuitry from the charge holding unit 518 to the A/D conversion unit 522). The memory 524 holds the noise signal from the readout circuit unit. The subtractor 525 subtracts the output of the memory 524 from the output of the memory 523, and outputs a result of the subtraction to the horizontal transfer circuit 505 as a pixel signal.

The pixel arrangement structure of the pixel unit 500 will be described next with reference to FIG. 23. The pixel arrangement of the pixel unit 500 illustrated in FIG. 23 has a feature of the same colors being arranged in a 2×2 arrangement, with 2×2 R pixels, Gr pixels, Gb pixels, and B pixels. The configuration is such that 4×4 pixels are taken as a minimum unit, and this minimum unit is disposed in a repeating manner.

Exposure time settings in the pixel arrangement illustrated in FIG. 23 will be described with reference to FIG. 24. As illustrated in FIG. 24, the horizontal direction is represented by x and the vertical direction by y, with column numbers indicated by x coordinates and row numbers indicated by y coordinates. The numbers in parentheses are coordinates indicating the position of each pixel. In FIG. 24, gray pixels represent short exposure pixels and white pixels represent long exposure pixels. In the present embodiment, the short exposure pixels and the long exposure pixels are set in a zigzag pattern in the column direction, as illustrated in FIG. 24.

Figures 23, 24:
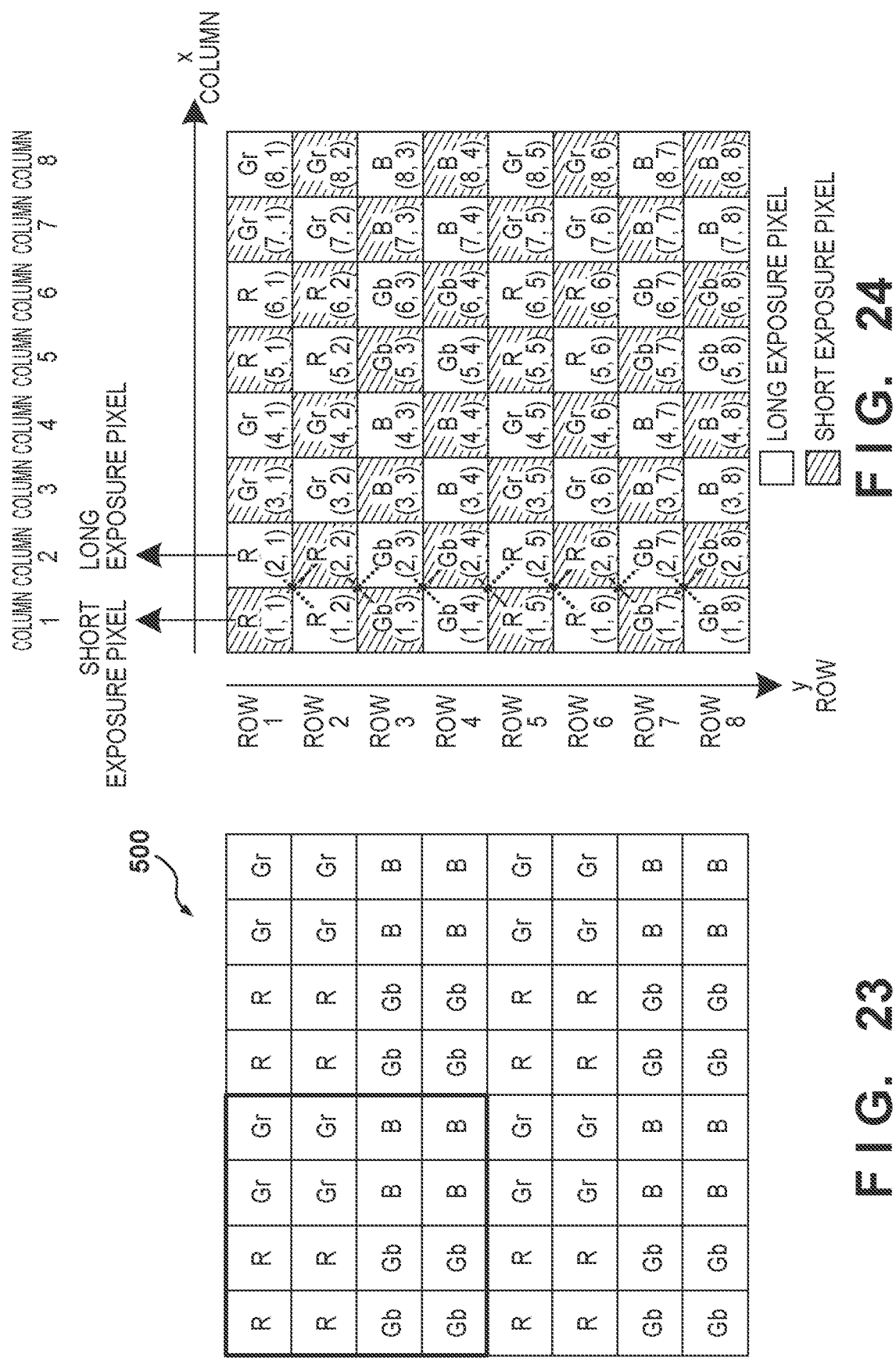
FIG. 23 is a diagram illustrating an example of a pixel arrangement in the pixel unit according to the fourth embodiment.
FIG. 24 is a diagram illustrating positional relationships between long- and short-exposure pixels in the pixel unit according to the fourth embodiment.

For example, the coordinate settings for the four R pixels in the upper-left corner of FIG. 24 are as follows.

R(1,1): short exposure pixel
R(2,1): long exposure pixel
R(1,2): long exposure pixel
R(2,2): short exposure pixel In this manner, the structure is such that the short exposure pixels and the long exposure pixels are set in an alternating manner in each column, and the short exposure pixels and the long exposure pixels are set in an alternating manner in each row. In the first column and the second column, following only the short exposure pixels in the y direction, the short exposure pixels are arranged in a zigzag pattern from the top.

In the first row, the first column is short exposure pixels;
in the second row, the second column is short exposure pixels;
in the third row the first column is short exposure pixels; and
in the fourth row, the second column is short exposure pixels.

Likewise, in the first column and the second column, following only the long exposure pixels in the y direction, the long exposure pixels are arranged in a zigzag pattern from the top.

In the first row, the second column is long exposure pixels;
in the second row, the first column is long exposure pixels;
in the third row, the second column is long exposure pixels; and
in the fourth row, the first column is long exposure pixels.

As described above, the pixel arrangement and the exposure time settings thereof are structured so that pixels of the same color are set in units of 2×2 pixels, with two short exposure pixels and two long exposure pixels being arranged in these four pixels.

An output format of the image when the image capturing unit 50 operates in the normal mode will be described next with reference to FIG. 25.

When the image capturing unit 50 operates in the normal mode, all of the pixels have the same exposure time. At this time, the image capturing unit 50 outputs the average value of 2×2 pixels of the same color, which is indicated by the gray diamond shape with reference sign 25a in FIG. 25. To be more specific, the output of the image capturing unit 50, indicated by reference sign 25b in FIG. 25, can be derived as follows.

$$\frac{R(1, 1) + R(2, 1) + R(1, 2) + R(2, 2)}{4} = \overline{R}(1, 1) \tag{13}$$

$$\frac{Gr(3, 1) + Gr(4, 1) + Gr(3, 2) + Gr(4, 2)}{4} = \overline{Gr}(2, 1) \tag{14}$$

$$\frac{Gb(1, 3) + Gb(2, 3) + Gb(1, 4) + Gb(2, 4)}{4} = \overline{Gb}(1, 2) \tag{15}$$

$$\frac{B(3, 3) + B(4, 3) + B(3, 4) + B(4, 4)}{4} = \overline{B}(2, 2) \tag{16}$$

Figure 25:
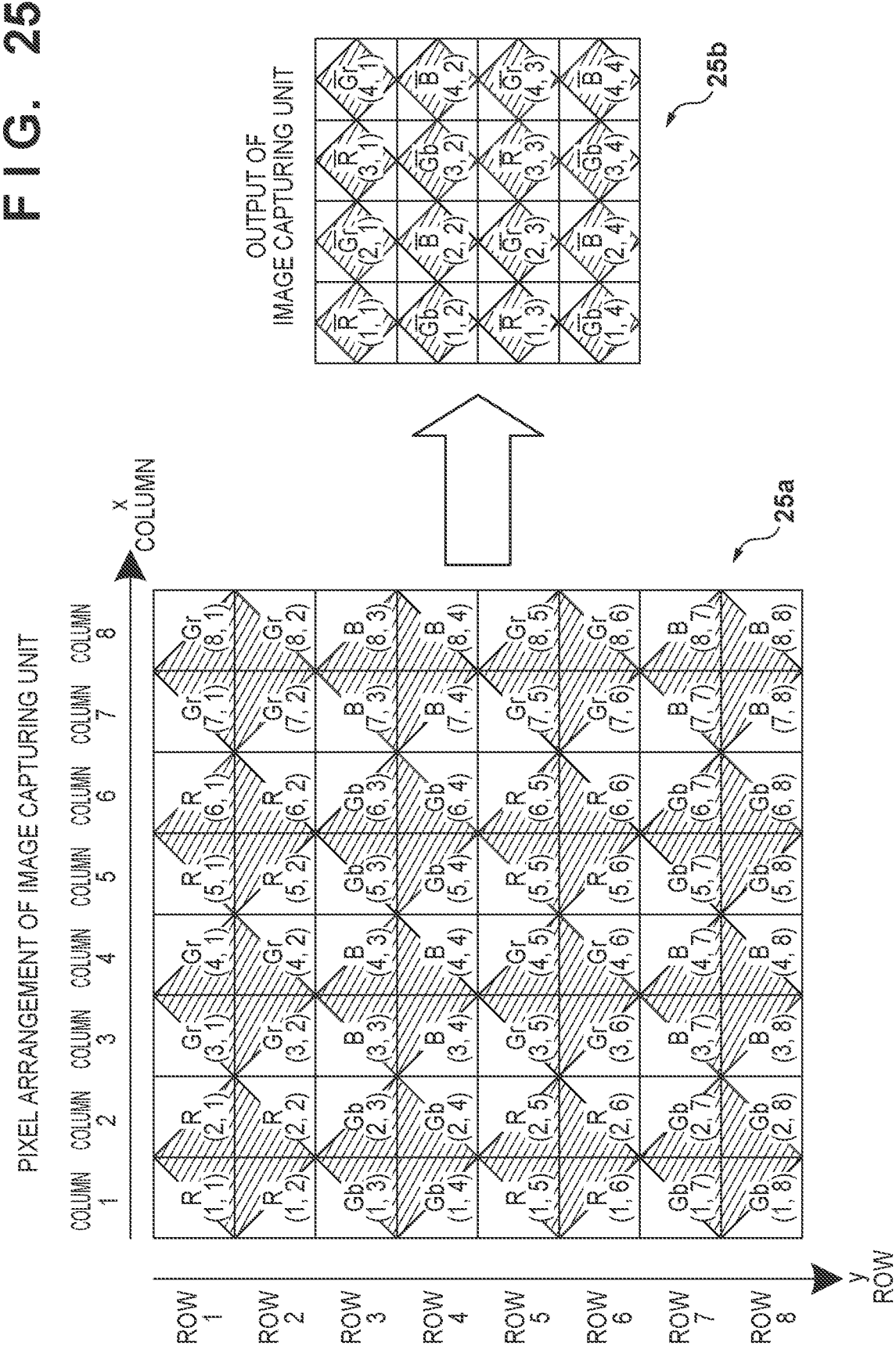
FIG. 25 is a diagram illustrating an example of an output from the pixel unit when in a normal mode, according to the fourth embodiment.

As indicated by reference sign 25b in FIG. 25, the format of the image output from the image capturing unit 50 is nothing more than the format of RAW data output from a typical Bayer pattern image sensor. As such, by performing the same operations as in the first the third embodiments, the image encoding unit 20, the image decoding unit 40, and so on in the stages after the image capturing unit 50 can reduce visual degradation produced when compression encoding Bayer pattern RAW data.

An output format of the image when the image capturing unit 50 operates in the HDR mode will be described next with reference to FIG. 26.

Figure 26:
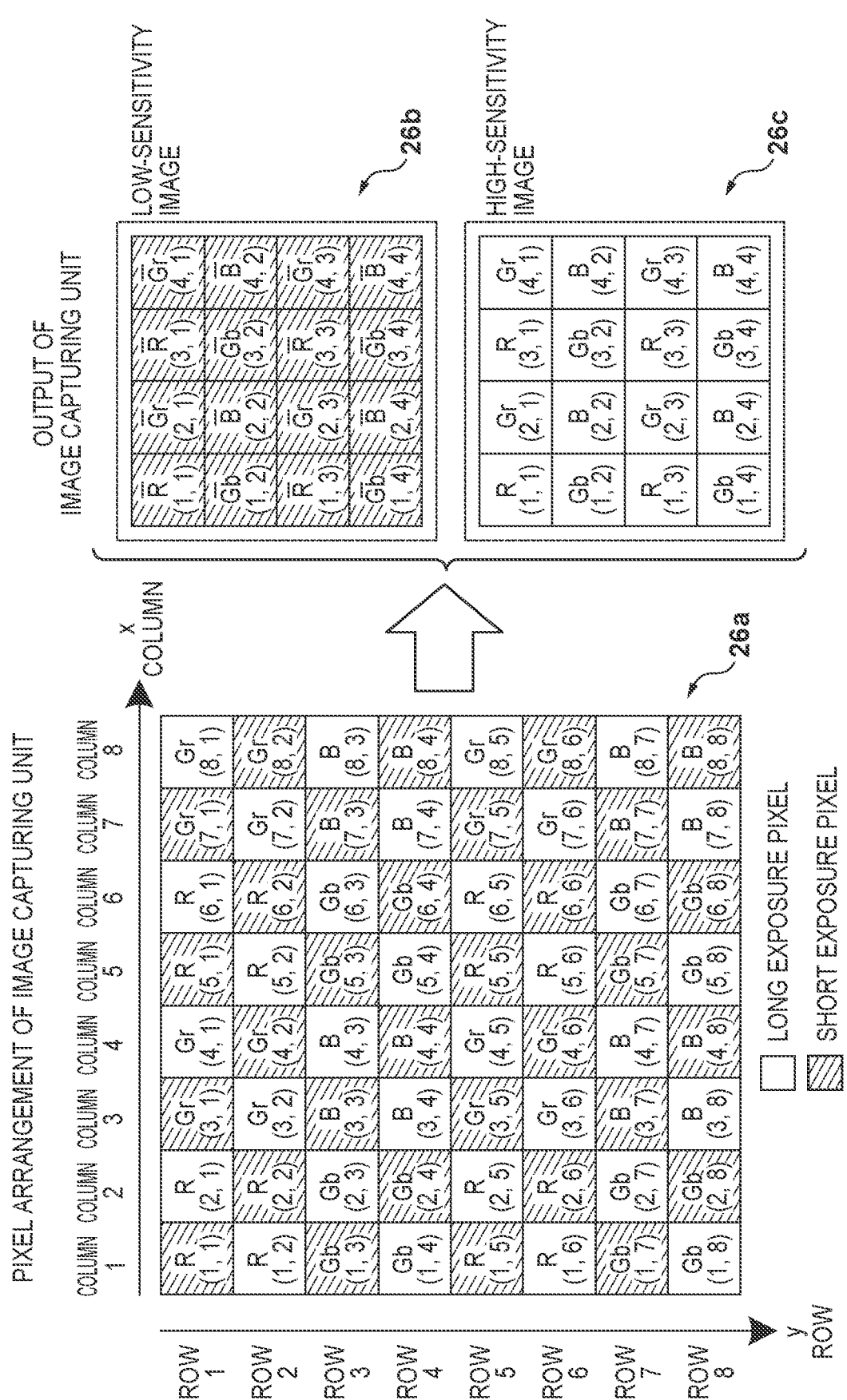
FIG. 26 is a diagram illustrating an example of an output from the pixel unit when in an HDR mode, according to the fourth embodiment.

When the image capturing unit 50 operates in the HDR mode, of pixels included in a 2×2 pixel region of the same color, indicated by reference sign 26a in FIG. 26, the image capturing unit 50 outputs an average value of the two short exposure pixels, and an average value of the remaining pixels, i.e., the two long exposure pixels. In the present embodiment, the average value of the two short exposure pixels is taken as a pixel in a low-sensitivity image from a short exposure, and the average value of the two long exposure pixels is taken as a pixel in a high-sensitivity image from a long exposure. Here, a low-sensitivity image 26B, illustrated in FIG. 26, can be derived as follows.

$$\frac{R(1,1) + R(2,2)}{2} = \overline{R}(1,1) \quad (17)$$

$$\frac{Gr(3,1) + Gr(4,2)}{2} = \overline{Gr}(2,1) \quad (18)$$

$$\frac{Gb(1,3) + Gb(2,4)}{2} = \overline{Gb}(1,2) \quad (19)$$

$$\frac{B(3,3) + B(4,4)}{2} = \overline{B}(2,2) \quad (20)$$

On the other hand, a high-sensitivity image 26C, illustrated in FIG. 26, can be derived as follows.

$$\frac{R(2,1) + R(1,2)}{2} = \overline{R}(1,1) \quad (21)$$

$$\frac{Gr(4,1) + Gr(3,2)}{2} = \overline{Gr}(2,1) \quad (22)$$

$$\frac{Gb(2,3) + Gb(1,4)}{2} = \overline{Gb}(1,2) \quad (23)$$

$$\frac{B(4,3) + B(3,4)}{2} = \overline{B}(2,2) \quad (24)$$

The two types of images output from the image capturing unit 50, i.e., the low-sensitivity image and the high-sensitivity image, are compression encoded by the image encoding unit 20 and stored in the memory 30. Furthermore, the two types of encoded data are decoded by the image decoding unit 40, and an HDR image is generated by the image compositing unit 60 compositing the decoded low-sensitivity image and high-sensitivity image. The method by which the image compositing unit 60 generates the HDR image will be described here with reference to FIG. 27.

FIG. 27 is a block diagram illustrating the image compositing unit 60. The image compositing unit 60 is constituted by a low-sensitivity image gain correction unit 601, a high-sensitivity image gain correction unit 602, a selector 603, and a compositing unit 604.

When generating an HDR image, one of the two types of images, i.e., the low-sensitivity image and the high-sensitivity image, is typically data captured at a correct exposure, while the other image is used as supplementary data for expanding the dynamic range. The following will describe two cases, namely a case where the high-sensitivity image is shot at the correct exposure, and a case where the low-sensitivity image is shot at the correct exposure.

It is assumed that the user operating the image processing apparatus 200 can set which of the low-sensitivity image and the high-sensitivity image has the correct exposure through a CPU (not shown) provided in the image processing apparatus 200. The configuration may also be such that the CPU (not shown) included in the image processing apparatus 200 can automatically determine which image has the correct exposure.

The gain correction unit 601 and the gain correction unit 602 are used to align the exposures of the low-sensitivity image and the high-sensitivity image. The correction performed by the gain correction unit 601 and the gain correction unit 602 will be described here in detail with reference to FIGS. 28A and 28B.

Figure 28A:
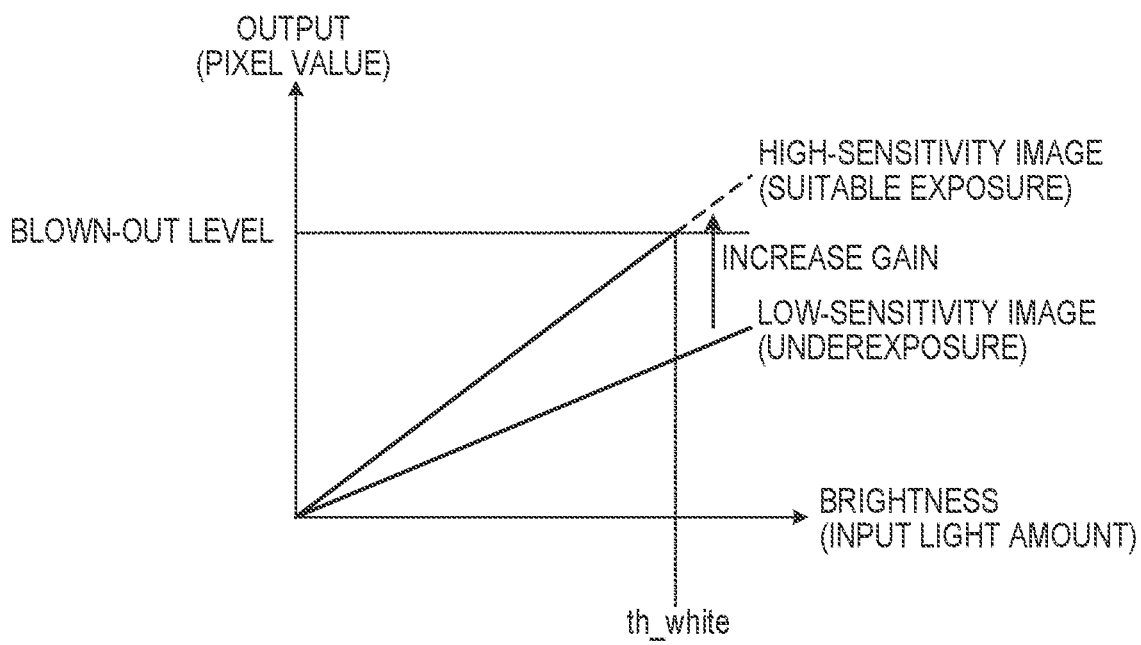
FIGS. 28A and 28B are diagrams illustrating an example of image gain correction.

FIG. 28A illustrates an example of the gain correction performed when the high-sensitivity image is shot at the correct exposure. When the brightness of a subject (an input light amount) exceeds a given threshold th_white, the output of the high-sensitivity image will be blown out, and gradations will be lost. On the other hand, with the low-sensitivity image, no blowout will occur, and the gradations will remain, even at brightnesses exceeding the threshold th_white. The pixel values of parts of the high-sensitivity image where blowout will occur are estimated by increasing the gain for the low-sensitivity image in the gain correction unit 601. Furthermore, an HDR image which compensates for blown-out areas can be generated by the compositing unit 604 in the later stage compositing the low-sensitivity image, for which the gain has been increased, with the high-sensitivity image. Note that when the high-sensitivity image has been shot at the correct exposure, no gain correction need be performed on the high-sensitivity image in the gain correction unit 602.

Figure 28B:
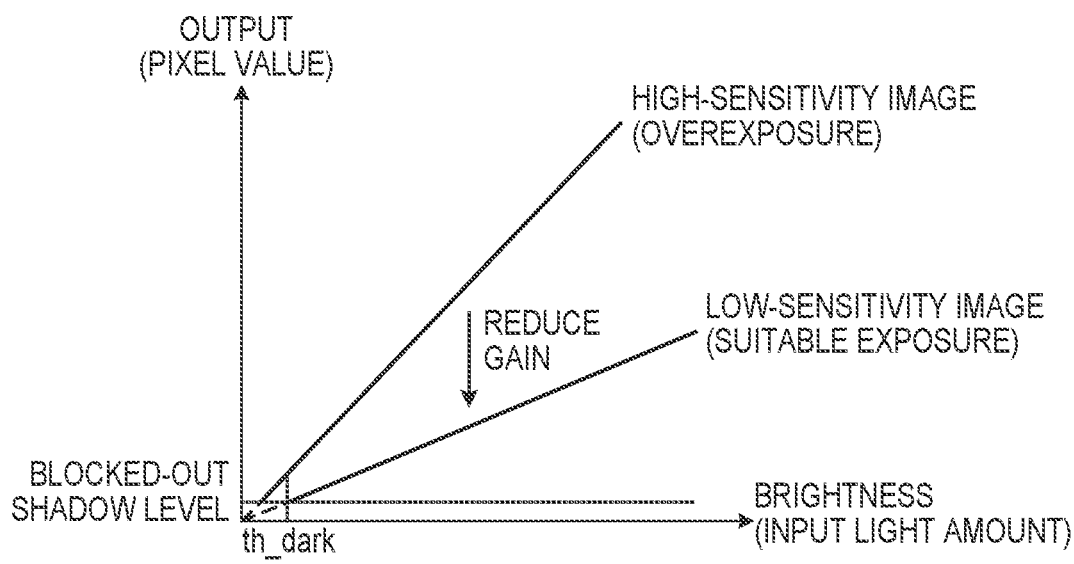

FIG. 28B is an example of the gain correction performed when the low-sensitivity image is shot at the correct exposure. When the brightness of the subject (the input light amount) is below a given threshold th_dark, the output of the low-sensitivity image will have blocked-out shadows, and gradations will be lost. On the other hand, with the high-sensitivity image, there will be regions where no blocked-out shadows occur and gradations remain, even at brightnesses below the threshold th_dark. The pixel values of parts of the low-sensitivity image where blocked-out shadows will occur are estimated by reducing the gain for the high-sensitivity image in the gain correction unit 602. Furthermore, an HDR image which compensates for blocked-out shadow parts can be generated by the compositing unit 604 in the later stage compositing the high-sensitivity image, for which the gain has been reduced, with the low-sensitivity image. Note that when the low-sensitivity image has been shot at the correct exposure, no gain correction need be performed on the low-sensitivity image in the gain correction unit 601.

Note that the degree of the gain correction performed by the gain correction unit 601 and the gain correction unit 602 (the gain values) may be found from a sensitivity ratio between the low-sensitivity image and the high-sensitivity image, an exposure time ratio between the low-sensitivity image and the high-sensitivity image, or the like. For example, when the high-sensitivity image is shot at the correct exposure and the sensitivity ratio between the low-sensitivity image and the high-sensitivity image is 1:4, if the pixel values of the low-sensitivity image are multiplied by 4, the pixel values of the blown-out part of the high-sensitivity image can be estimated.

The selector 603 outputs, to the compositing unit 604, the pixel values of the image, among the low-sensitivity image and the high-sensitivity image, which has been shot at the correct exposure.

The compositing unit 604 generates the HDR image by compositing the low-sensitivity image, for which the gain has been corrected, with the high-sensitivity image. Here, an example of the method by which the compositing unit 604 composites the low-sensitivity image and the high sensitivity image will be described with reference to FIGS. 29A and 29B.

Figure 29A:
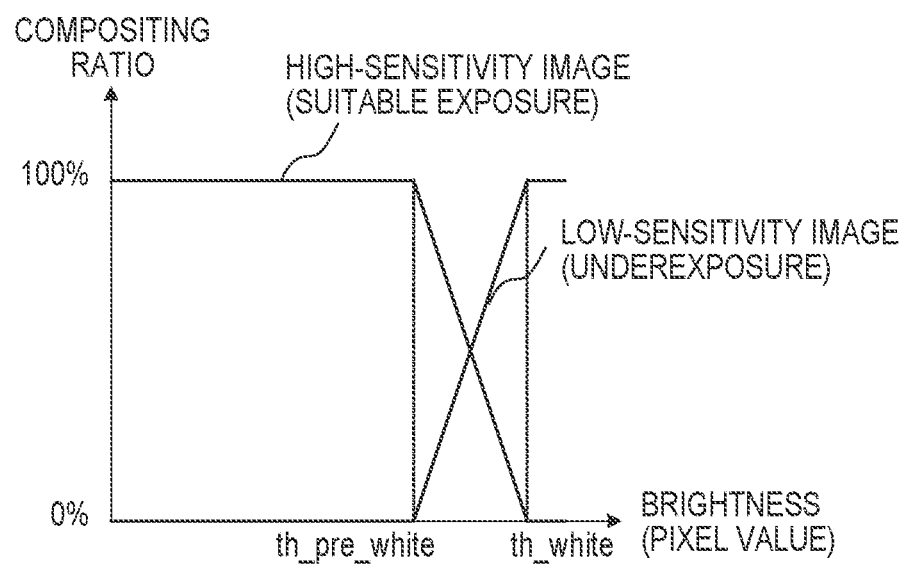
FIGS. 29A and 29B are diagrams illustrating an example of an image compositing ratio.
Figure 29B:
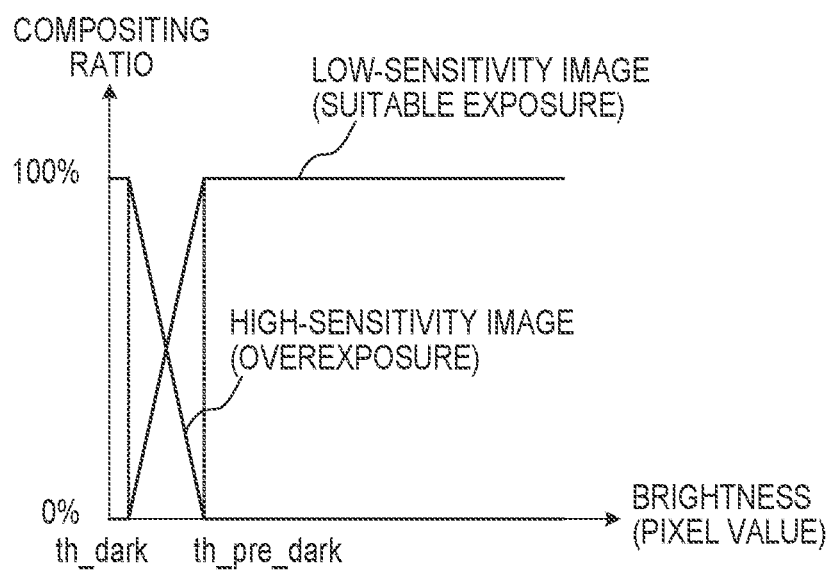

The horizontal axis of each graph in FIGS. 29A and 29B represents the brightness (pixel value) of the correctly-exposed image, which is a pixel value obtained from the selector 603. The vertical axis represents a compositing ratio of the low-sensitivity image or the high-sensitivity image.

In the present embodiment, the total of the compositing ratio of each image is set to always be 100% when compositing the images. In other words, a pixel value hdr_img [pix] of the HDR image output from the compositing unit 604 can be derived through the following equation.

$$\text{hdr\_img[pix]} = \alpha \times \text{main\_img[pix]} + (1-\alpha) \times \text{sub\_img[pix]}) \quad (25)$$

Here, α represents the compositing ratio of a correctly-exposed image, main_img [pix] represents the pixel value of the correctly-exposed image, and sub_img [pix] represents the pixel value of an incorrectly-exposed image.

FIG. 29A illustrates an example of the compositing ratio for each image when the high-sensitivity image is shot at the correct exposure. As illustrated in FIG. 28, blowouts occur in the high-sensitivity image at brightnesses exceeding the threshold th_white, and thus in the present embodiment, after a threshold th_pre_white, the compositing ratio of the high-sensitivity image is shifted so as to drop to 0% at the point in time of the threshold th_white. Additionally, after the threshold th_pre_white, the compositing ratio of the low-sensitivity image is shifted so as to rise to 100% at the point in time of the threshold th_white. By setting the compositing ratio in this manner, a high dynamic range image which compensates for blown-out parts can be composited.

FIG. 29B illustrates an example of the compositing ratio for each image when the low-sensitivity image is shot at the correct exposure. As illustrated in FIG. 28, blocked-out shadows occur in the low-sensitivity image at brightnesses below the threshold th_dark, and thus in the present embodiment, after a threshold th_pre_dark, the compositing ratio of the low-sensitivity image is shifted so as to drop to 0% at the point in time of the threshold th_dark. Additionally, after the threshold th_pre_dark, the compositing ratio of the high-sensitivity image is shifted so as to rise to 100% at the point in time of the threshold th_dark. By setting the compositing ratio in this manner, a high dynamic range image which compensates for blocked-out shadow parts can be composited.

Although the present embodiment describes an example of changing compositing ratio from a given threshold for the sake of simplicity, the algorithm for the compositing processing is not limited thereto.

In this manner, when generating the HDR image, the image compositing unit 60 changes the compositing ratio of each image in accordance with whether or not the image is at the correct exposure, or in accordance with the magnitude of the pixel value (the brightness). The magnitude of the compositing ratio is a measure of the influence on image quality, with regions where the compositing ratio is high having greater influence on the image quality, and regions where the compositing ratio is low having less influence on the image quality. In light of this, the visual degradation of the image can be more effectively reduced by the image encoding unit 20 and the image decoding unit 40 allocating a higher code amount to regions where the compositing ratio used by the image compositing unit 60 in the later stage is higher, and reducing code amounts for other regions. In the present embodiment, the feature analyzing unit 225 in the image encoding unit 20 implements this flexible allocation of code amounts. The feature analyzing method of the feature analyzing unit 225 according to the present embodiment will be described in detail below with reference to a flowchart.

FIG. 30 is a flowchart illustrating an overview of the feature analysis processing performed by the feature analyzing unit 225 when the image capturing unit 50 operates in the HDR mode, according to the present embodiment. Processing performed by the feature analyzing unit 225 will be described hereinafter with reference to the drawings.

In step S3001, the feature analyzing unit 225 acquires the inverse-quantized data from the inverse quantizing unit 224 illustrated in FIG. 2 in units of pixels, and calculates a brightness of each of the pixels. Note that like in the first embodiment, in the present embodiment, a level value of the inverse-quantized data is used as an indicator of brightness (low level value=dark, high level value=bright). The method is not limited to using an indicator of the brightness as in the present embodiment, and for example, inverse-quantized data in the RGB format may further be subject to color space conversion into the YIN format, and the level value of the Y component may be used. Alternatively, the inverse-quantized block may be divided into a plurality of regions and the average of the level value of the inverse-quantized data in each divided region may be used.

In steps S3002 to S3004, the feature analyzing unit 225 switches the processing to be executed among steps S3005 to S3008 on the basis of whether or not the correctly-exposed image is the high-sensitivity image, and whether or not the image to be encoded is the high-sensitivity image. For example, the feature analyzing unit 225 executes step S3005 when the high-sensitivity image is correctly exposed and the image to be encoded is the high-sensitivity image. Likewise, the feature analyzing unit 225 executes step S3007 when the low-sensitivity image is correctly exposed and the image to be encoded is the low-sensitivity image. Here, steps S3005 to S3008, which are executed by the feature analyzing unit 225, will be described in detail with reference to FIGS. 31A to 31D.

FIGS. 31A to 31D are flowchart illustrating details of the feature analysis processing executed by the feature analyzing unit 225 when the image capturing unit 50 operates in the HDR mode, according to the present embodiment. Processing performed by the feature analyzing unit 225 will be described hereinafter with reference to the drawing.

Figure 31A:
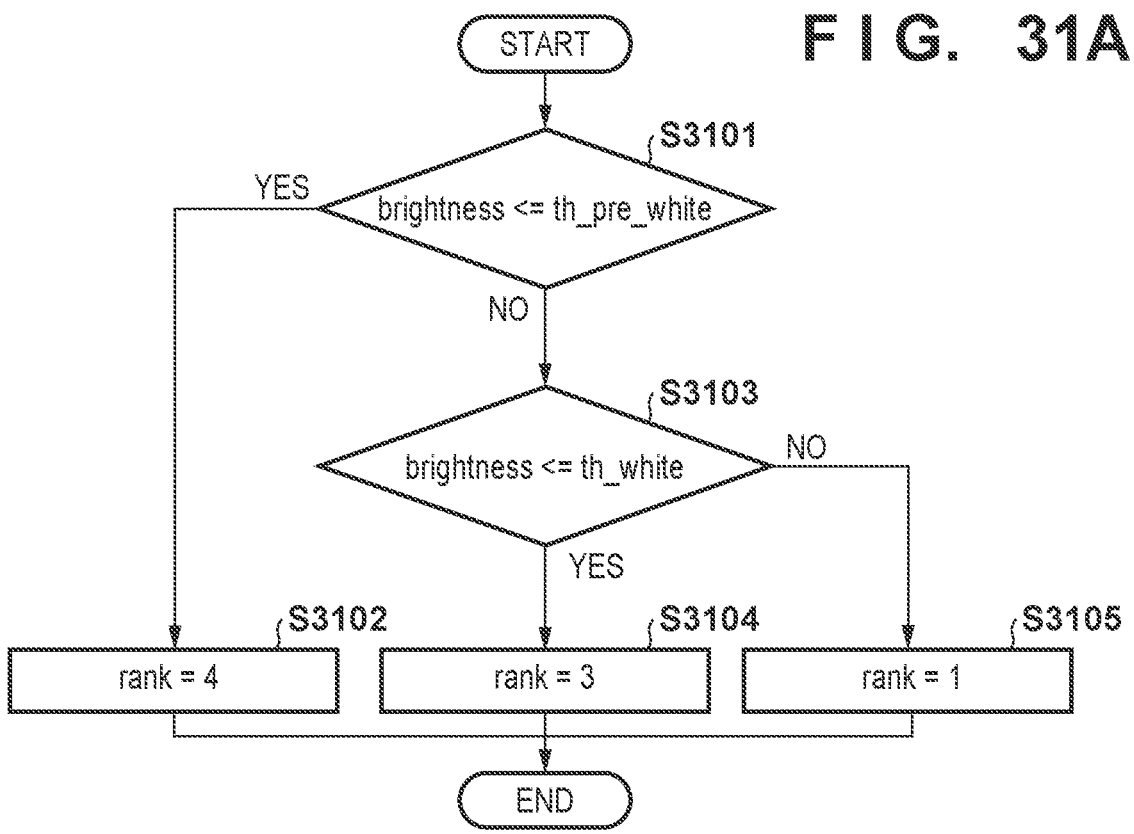
FIGS. 31A to 31D are flowcharts illustrating the details of the processes of each of steps S3005 to S3008 of FIG. 30.

FIG. 31A is a flowchart illustrating the processing (step S3005) performed by the feature analyzing unit 225 when the high-sensitivity image is correctly exposed and the image to be encoded is the high-sensitivity image.

In the processing from steps S3101 to S3105, the feature analyzing unit 225 calculates the feature classification result rank for the pixel of interest. As in the first embodiment, "rank" is assumed to have a value of 1 to 4, with pixels having a higher value being pixels where visual degradation is more noticeable to the human eye or pixels which have a higher importance.

In step S3101, the feature analyzing unit 225 determines whether or not a brightness "brightness" of the pixel of interest is less than or equal to the threshold th_pre_white. As illustrated in FIG. 29A, when the brightness "brightness" of the pixel of interest is less than or equal to the threshold th_pre_white, the compositing ratio of that pixel in the HDR image is 100%. It can therefore be said that the pixel has great influence on the image quality of the HDR image and has a high importance. In such a case, in step S3102, the feature analyzing unit 225 substitutes "4" for the rank in the feature classification result for the pixel of interest.

When the brightness "brightness" of the pixel of interest is greater than the threshold th_pre_white, the feature analyzing unit 225 determines whether or not the brightness "brightness" of the pixel of interest is less than or equal to the threshold th_white. As illustrated in FIG. 29A, when the brightness "brightness" of the pixel of interest is greater than the threshold th_pre_white and less than or equal to the threshold th_white, the compositing ratio of that pixel in the HDR image takes on a value of from 100% to 0%. Thus although it cannot be said that the pixel has great influence on the image quality of the HDR image, the pixel is treated as having a medium level of importance in the present embodiment. In such a case, in step S3104, the feature analyzing unit 225 substitutes "3" for the rank in the feature classification result for the pixel of interest.

On the other hand, when the brightness "brightness" of the pixel of interest is greater than the threshold th_white, the compositing ratio of that pixel in the HDR image is 0%, as illustrated in FIG. 29A. It can therefore be said that the pixel has little influence on the image quality of the HDR image and has a low importance. In such a case, in step S3105, the feature analyzing unit 225 substitutes "1" for the rank in the feature classification result for the pixel of interest.

Figure 31B:
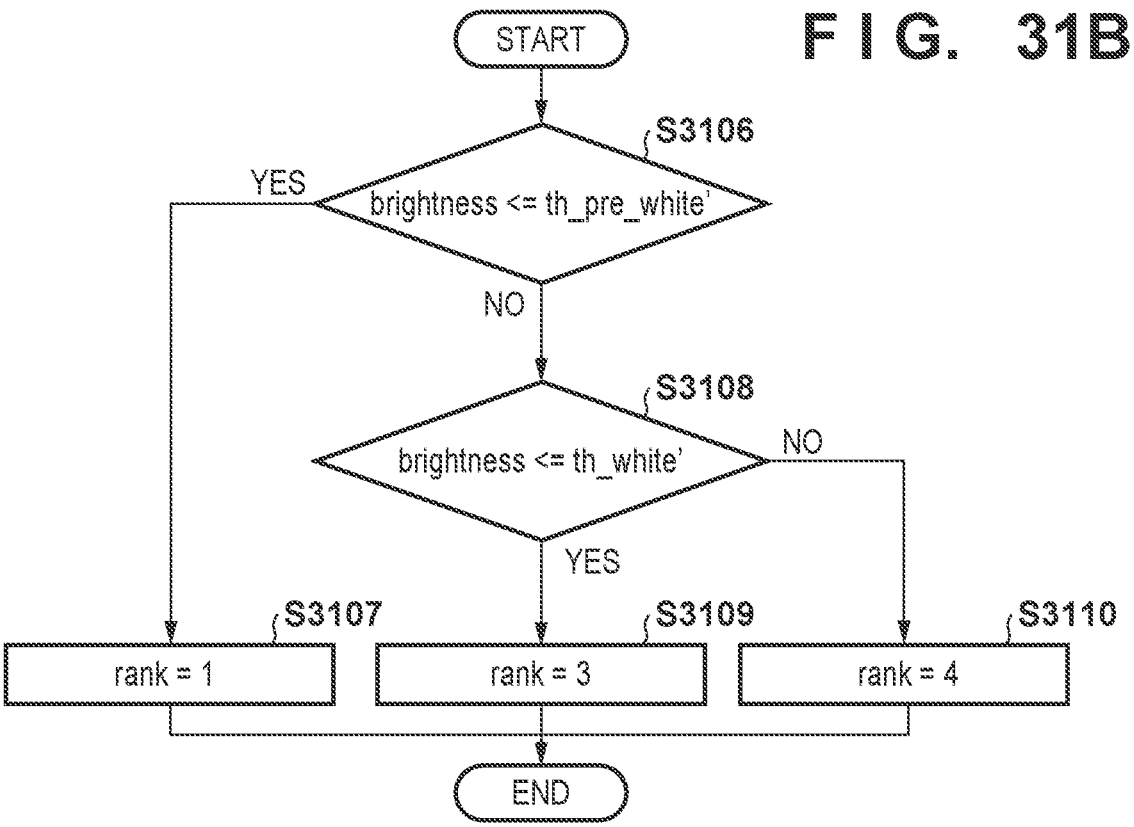

FIG. 31B is a flowchart illustrating the processing (step S3006) performed by the feature analyzing unit 225 when the high-sensitivity image is correctly exposed and the image to be encoded is the low-sensitivity image. As in the example illustrated in FIG. 28B, the feature analyzing unit 225 determines the rank for each pixel in accordance with the compositing ratio of the pixel of interest in the HDR image.

Unlike FIG. 31A, in FIG. 31B, the feature analyzing unit 225 uses the brightness "brightness" of the low-sensitivity image when determining the rank of the pixel of interest in steps S3106 and S3108. Here, because the image encoding unit 20 is located in a stage previous to the gain correction unit 601, gain correction has not yet been executed on the low-sensitivity image at this point in time, and the exposure has not yet been aligned with the correctly exposed high-sensitivity image. Accordingly, in steps S3106 and S3108, a position (brightness) where the compositing ratio is changed by the image compositing unit 60 in the later stage is determined using low-sensitivity image thresholds th_pre_white' and th_white'. Here, the thresholds th_pre_white' and th_white' may be found from the sensitivity ratio between the low-sensitivity image and the high-sensitivity image, the exposure time ratio between the low-sensitivity image and the high-sensitivity image, or the like, using the thresholds th_pre_white and th_white as references. For example, when the high-sensitivity image is taken at the correct exposure and the sensitivity ratio between the low-sensitivity image and the high-sensitivity image is 1:4, if the threshold for the low-sensitivity image is multiplied by ¼, the position (brightness) corresponding to the thresholds th_pre_white and th_white in the image compositing unit 60 in a later stage can be estimated.

Figure 31C:
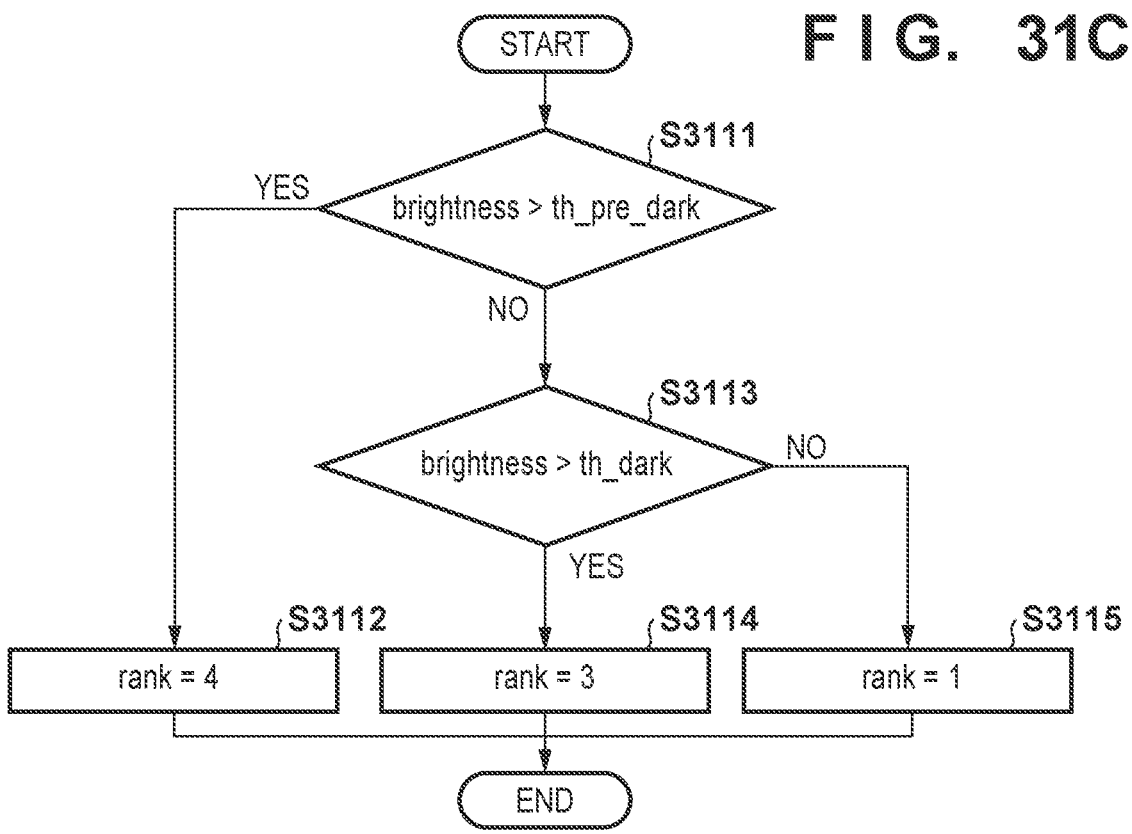

FIG. 31C is a flowchart illustrating the processing (step S3007) performed by the feature analyzing unit 225 when the low-sensitivity image is correctly exposed and the image to be encoded is the low-sensitivity image.

In step S3111, the feature analyzing unit 225 determines whether or not a brightness "brightness" of the pixel of interest is greater than the threshold th_pre_dark. As illustrated in FIG. 29B, when the brightness "brightness" of the pixel of interest is greater than the threshold th_pre_dark, the compositing ratio of that pixel in the HDR image is 100%. It can therefore be said that the pixel has great influence on the image quality of the HDR image and has a high importance. In such a case, in step S3112, the feature analyzing unit 225 substitutes "4" for the rank in the feature classification result for the pixel of interest.

When the brightness "brightness" of the pixel of interest is less than or equal to the threshold th_pre_dark, the feature analyzing unit 225 determines whether or not the brightness "brightness" of the pixel of interest is greater than the threshold th_dark. As illustrated in FIG. 29B, when the brightness "brightness" of the pixel of interest is less than or equal to the threshold th_pre_dark and greater than the threshold th_dark, the compositing ratio of that pixel in the HDR image takes on a value of from 100% to 0%. Thus, although it cannot be said that the pixel has great influence on the image quality of the HDR image, the pixel is treated as having a medium level of importance in the present embodiment. In such a case, in step S3114, the feature analyzing unit 225 substitutes "3" for the rank in the feature classification result for the pixel of interest.

On the other hand, when the brightness "brightness" of the pixel of interest is less than or equal to the threshold th_dark, the compositing ratio of that pixel in the HDR image is 0%, as illustrated in FIG. 29B. It can therefore be said that the pixel has little influence on the image quality of the HDR image and has a low importance. In such a case, in step S3115, the feature analyzing unit 225 substitutes "1" for the rank in the feature classification result for the pixel of interest.

Figure 31D:
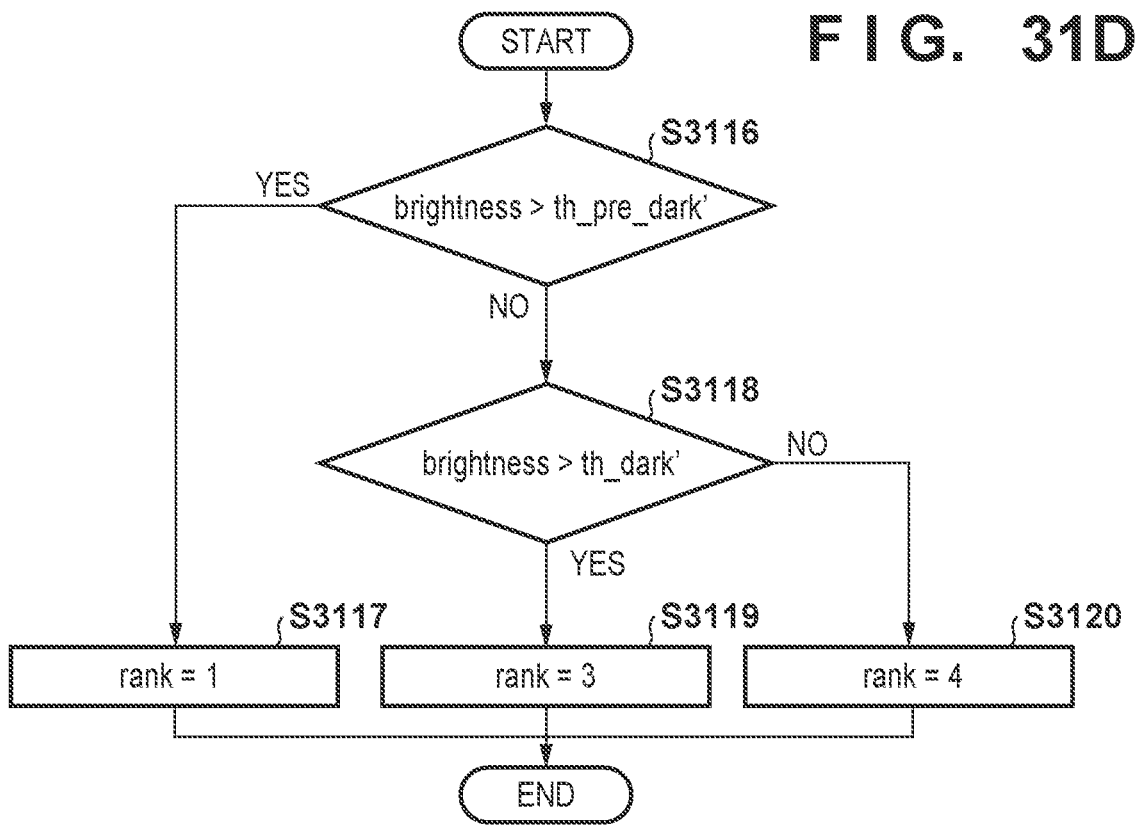

FIG. 31D is a flowchart illustrating the processing (step S3008) performed by the feature analyzing unit 225 when the low-sensitivity image is correctly exposed and the image to be encoded is the high-sensitivity image. As in the example illustrated in FIG. 31C, the feature analyzing unit 225 determines the rank for each pixel in accordance with the compositing ratio of the pixel of interest in the HDR image.

Unlike FIG. 31C, in FIG. 31D, the brightness "brightness" of the high-sensitivity image is used when determining the rank of the pixel of interest in steps S3116 and S3118. As in FIG. 31B, the gain correction for the high-sensitivity image has not yet been executed at this point in time, and the exposure is not aligned with the correctly exposed low-sensitivity image. Accordingly, in steps S3116 and S3118, a position (brightness) Where the compositing ratio is changed by the image compositing unit 60 in the later stage is determined using high-sensitivity image thresholds th_pre_dark' and th_dark'.

Note that the method for setting the rank is not limited to the method described above. For example, the image, of the low-sensitivity image and the high-sensitivity image, which has been shot at the correct exposure can be assigned a rank using the same algorithm as in the methods described in the first to third embodiments, and the rank can also be set for the other image, which has been shot at underexposure or overexposure, using the algorithm described with reference to FIGS. 30 to 31D.

As described thus far, the feature analyzing unit 225 sets a high rank for pixels having a higher compositing ratio and a low rank for pixels having a lower compositing ratio when generating the HDR image. Additionally, as already described in the first embodiment, the rank in the feature classification result from the feature analyzing unit 225 is output to the multiplexing unit 223. On the basis of the feature classification result output from the feature analyzing unit 225, the multiplexing unit 223 stores the loss bits resulting from the quantization in the encoded data preferentially for pixels having a higher importance. Doing so makes it possible to allocate a larger code amount to regions that affect the image quality, and reduce the code amount of other regions, when generating an HDR image. Accordingly, visual degradation in the HDR image can be reduced more effectively than when not applying the present embodiment, i.e., when allocating an equal code amount to all regions in the block of interest.

Fifth Embodiment

In recent years, an image capturing device is known which has a function for switching the input capacitances of amplifier circuits provided for each of columns in an image sensor, where a plurality of images having different sensitivities can be output by switching a gain in accordance with a signal level. As with the image capturing device described in the fourth embodiment, by compositing the images having multiple different sensitivities obtained from such an image capturing device, an image having a higher dynamic range than is possible with a conventional image capturing device can be obtained in a single shot. The fifth embodiment will describe a case where an image obtained from such an image capturing device is encoded.

In the fifth embodiment, only the image capturing device is different from the fourth embodiment, but the same configuration as in the fourth embodiment, illustrated in FIG. 20, can basically be realized, and thus the same effects can be achieved. As such, the fifth embodiment will primarily describe the image capturing device, which is the difference from the fourth embodiment, and details that are the same as in the fourth embodiment will not be described.

Although details will be given later, in the present embodiment, the column amplifier 503 can amplify signals using multiple gains, and the dynamic range of an image is expanded by compositing signals amplified at different gains. Additionally, the timing control unit 508 according to the present embodiment can change the gain of the column amplifier 503 by controlling each of switches provided in the column amplifier 503.

In the present embodiment, a plurality of images having different sensitivities can be output by switching the gain of the column amplifier 503, but it should be noted that the pixel unit 500 according to the present embodiment does not need to have two types of pixels, i.e., short exposure pixels and long exposure pixels, as in the fourth embodiment. In other words, in the present embodiment, it is not necessary for the two types of control signals 516 and 517 for controlling the exposure times to be connected to the unit pixels 501, and rather, it is sufficient for one type of control signal for controlling the transfer switch 515 to be connected to the unit pixels 501.

Figure 32:
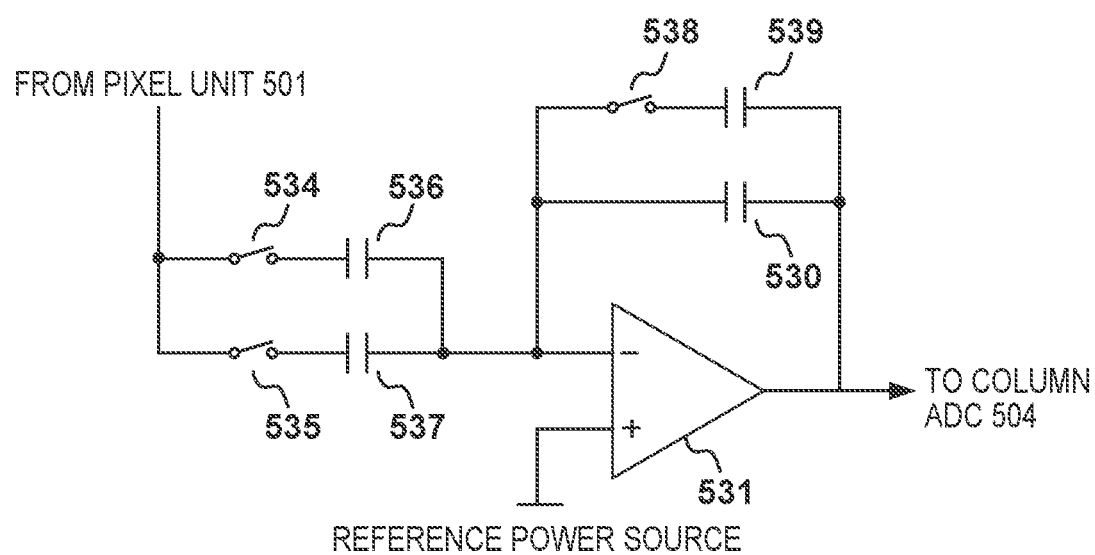
FIG. 32 is a circuit diagram illustrating part of a column amplifier according to a fifth embodiment.

FIG. 32 is a diagram illustrating the circuit configuration of the column amplifier 503 according to the present embodiment, with only one column being shown. This circuit is an inverting amplifier circuit constituted by an op-amp 531, input-side capacitors 536 and 537, and feedback capacitors 539 and 530. A predetermined reference voltage from a reference power source is applied to a positive input terminal (non-inverting input terminal) of the op-amp 531. The timing control unit 508 can switch the connections of the capacitors 516, 537, and 539 by operating the respective switches 534, 535, and 538.

The feedback capacitors 539 and 530 are connected to an inverting input terminal and an output terminal, respectively, of the op-amp 531, and are parallel with each other. The switch 538 is connected in series with the feedback capacitor 539, and controls the connection of the feedback capacitor 539. The amplification rate of the op-amp 531 is decided by "input side capacitance/feedback capacitance".

When the switch 534 is fumed on and the switches 535 and 538 are turned off, the op-amp 531 outputs a signal amplified at a first gain to the column ADC 504, corresponding to an electrostatic capacitance ratio between the capacitor 536 and the capacitor 530. When the switch 534 is turned off and the switches 535 and 538 are turned on, the op-amp 531 outputs a signal amplified at a second gain to the column ADC 504, corresponding to a composite capacitance ratio between the capacitor 537 and the capacitors 539 and 530. In this manner, the two types of image signals having different sensitivities can be read out by using the switches to switch the capacitance of the capacitors.

As described thus far, the image capturing unit 50 according to the fifth embodiment modifies the circuit structure of the column amplifier 503 so as to be capable of outputting a low-sensitivity image and a high-sensitivity image, in the same manner as the image capturing unit 50 according to the fourth embodiment. These images are then compression encoded using the same method as that described in the fourth embodiment, and an HDR image is generated by the image compositing unit 60, in the compression encoding according to the present embodiment too, a larger code amount is allocated to regions that affect the image quality, and a reduced code amount is allocated to other regions, when generating HDR image, in the same manner as in the fourth embodiment. Accordingly, visual degradation in the HDR image can be reduced more effectively than when not applying the present embodiment, i.e., when allocating an equal code amount to all regions in the block of interest.

Sixth Embodiment

The fourth embodiment and the fifth embodiment described a compression encoding method for generating an HDR image using an image capturing device capable of outputting a plurality of images having different sensitivities from a single shot. However, when using a common image sensor such as a CCD or CMOS sensor, multiple images are shot with varying exposure amounts through time-division, and those images are then composited to generate an HDR image, which is a method that is already being implemented in digital cameras and smartphones. A sixth embodiment will describe a case where every plurality of images shot in time-division with varying exposure amounts are subject to encoding.

Figure 33:
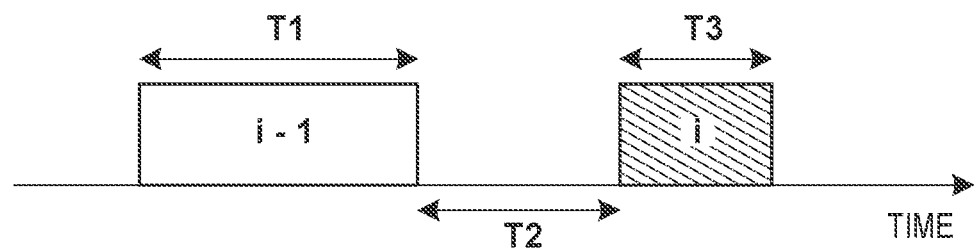
FIG. 33 is a diagram illustrating the timings of image capturing operations according to a sixth embodiment.

FIG. 33 is a diagram illustrating an example of operation timings of the image capturing unit 50 when an image of a subject is captured in time-division while varying the exposure amount.

In FIG. 33, an i–1th image has been captured by the image capturing unit 50 at a correct exposure time T1. After a set amount of time T2 has passed after the i–1th image was captured, an i-th image is captured at a shorter exposure time T2 (underexposure) than the i–1th image. Here, the i–1th image is a high-sensitivity image with a relatively longer exposure time than the i-th image, while the i-th image is a low-sensitivity image with a shorter exposure time. In this manner, the image capturing unit 50 can capture a plurality of images having different sensitivities, in time-division, while varying the exposure amount, and output the images.

The timing of operations, exposure times, and the like of the image capturing unit 50 illustrated in FIG. 33 can be changed by a CPU (not shown) provided in the image processing apparatus 200 operating the timing control unit 508 and so on of the image capturing unit 50.

In this manner, by capturing images in time-division while varying the exposure amount, the image capturing unit 50 according to the sixth embodiment can output a low-sensitivity image and a high-sensitivity image in the same manner as the image capturing units 50 according to the fourth and fifth embodiments. These images are then compression encoded using the same method as that described in the fourth and fifth embodiments, and an HDR image is generated by the image compositing unit 60. In the compression encoding according to the present embodiment too, a larger code amount is allocated to regions that affect the image quality, and a reduced code amount is allocated to other regions, when generating an HDR image, in the same manner as in the fourth and fifth embodiments. Accordingly, visual degradation in the HDR image can be reduced more effectively than when not applying the present embodiment, i.e., when allocating an equal code amount to all regions in the block of interest.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-234651, filed Dec. 25, 2019 which is hereby incorporated by reference herein in its entirety.

What is claimed is:
1. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source outputs first image data having a correct exposure, and second image data having a lower sensitivity or a higher sensitivity than the first image data,
wherein when the second image data has the lower sensitivity, the analyzing unit calculates the index value having a higher value as a brightness of the pixel increases in an analysis of the second image data.

2. The apparatus according to claim 1,
wherein on the basis of the quantized data of each of the pixels in the block, the analyzing unit calculates the index value having a higher value as a darkness of a region to which the pixels belong increases.

3. The apparatus according to claim 1,
wherein on the basis of the quantized data of each of the pixels in the block, the analyzing unit calculates the index value having a higher value as a flatness of a region to which the pixels belong increases.

4. The apparatus according to claim 1,
wherein the analyzing unit includes:
a brightness determining unit that, on the basis of the quantized data of each of the pixels in the block, determines whether or not a brightness of a pixel is no greater than a pre-set dark area determination threshold;
a flatness determining unit that, on the basis of the quantized data of each of the pixels in the block, determines whether or not the pixels belong to a pre-set flat area;
a complexity determining unit that determines a complexity of a region to which the pixels belong by finding a number of edges on the basis of the quantized data in the block and comparing the number of edges which has been found with a pre-set threshold; and a deciding unit that decides the index value of the importance of the pixels on the basis of the determinations made by the brightness determining unit, the flatness determining unit, and the complexity determining unit.

5. The apparatus according to claim 1,
wherein the encoding processing unit includes:
a generating unit that, when a code length of no greater than the fixed length cannot be generated by the variable-length encoding unit, generates the quantized data by performing quantization on each pixel in the block at a quantization step set in advance so that the code length is less than the fixed length.

6. The apparatus according to claim 5,
wherein the generating unit performs the quantization using a quantization step set so that a pre-set free region is produced with respect to the fixed length,
the analyzing unit also calculates the index value for the quantized data generated by the generating unit from the block, and
by storing more values of bits lost due to the quantization by the generating unit in the free region as the importance of the pixel indicated by the index value increases, the multiplexing unit multiplexes the quantized data generated by the generating unit and the bits lost due to the quantization, and generates the fixed-length encoded data.

7. The apparatus according to claim 1,
wherein the image encoding apparatus is implemented in an image capturing apparatus having an image capturing unit.

8. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source outputs first image data having a correct exposure, and second image data having a lower sensitivity or a higher sensitivity than the first image data,
wherein when the second image data has the lower sensitivity, the analyzing unit calculates the index value having a higher value as a darkness of the pixel of increases in an analysis of the first image data.

9. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source outputs first image data having a correct exposure, and second image data having a lower sensitivity or a higher sensitivity than the first image data,
wherein when the second image data has the higher sensitivity, the analyzing unit calculates the index value having a higher value as a darkness of the pixel increases in an analysis of the second image data.

10. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source outputs first image data having a correct exposure, and second image data having a lower sensitivity or a higher sensitivity than the first image data,
wherein when the second image data has the higher sensitivity, the analyzing unit calculates the index value having a higher value as a brightness of the pixel increases in an analysis of the first image data.

11. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source is an image sensor including:
a pixel unit constituted by a plurality of pixels, each pixel having a photoelectric conversion element; and
a control unit that executes exposure time control on a pixel-by-pixel basis,
wherein the image sensor is capable of outputting pixel information having a plurality of different exposure times under control performed by the control unit, and
wherein the sensitivity of the image data is based on a length of the exposure time controlled by the control unit.

12. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source is an image sensor including:
a pixel unit constituted by a plurality of pixels, each pixel having a photoelectric conversion element; and
an amplifying unit that amplifies signals output from the pixel unit at a plurality of different amplification rates,
wherein the image sensor is capable of outputting pixel information amplified at a plurality of different amplification rates by the amplifying unit, and
wherein the sensitivity of the image data is based on a magnitude of the amplification rate of the amplifying unit.

13. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image generation source is an image sensor, and
the sensitivity of the image data is based on an exposure amount during image capturing, the exposure amount being set for each of the image data.

14. An image encoding apparatus comprising:
at least one processor; and
a memory storing instructions which cause the at least one processor to function as:
an acquiring unit that acquires image data;
a dividing unit that divides the image data into blocks, where each block includes pixels; and
an encoding processing unit that encodes a block, generates encoded block data of which code length does not exceed a fixed length, adds a loss bit to the encoded block data for filling the fixed length, and outputs the encoded block data with the loss bit added,
wherein the encoding processing unit includes:
a variable-length encoding unit that performs quantization on each of pixels included in a block so that a code length of the block is no greater than the fixed length, and performs variable-length encoding on quantized block;
a determining unit that, on the basis of a difference between the code length of the block obtained by the variable-length encoding unit and the fixed length, determines a size of a free region for filling the fixed length;
an analyzing unit that analyzes each of the pixels of the quantized block and calculates an index value indicating an importance of each pixel; and
a multiplexing unit that, by storing more values of bits lost due to the quantization in the free region as the importance of the pixel indicated by the index value increases, multiplexes the encoded block data obtained by the variable-length encoding unit and the bits lost due to the quantization, and generates the fixed-length encoded block data,
wherein the acquiring unit acquires a plurality of pieces of image data, each having a different sensitivity, output from an image generation source,
the encoding processing unit encodes each of the plurality of pieces of image data, each having a different sensitivity, acquired by the acquiring unit, and
the analyzing unit changes a method of calculating the index value in accordance with the sensitivity of the image data to which a pixel belongs and a brightness of the pixel based on quantized data of the pixel,
wherein the image encoding apparatus is implemented in an image capturing apparatus having an image capturing unit,
the acquiring unit acquires the plurality of pieces of image data, each having a different sensitivity, output from the image capturing unit,
the encoding processing unit encodes each of the plurality of pieces of image data, each having a different sensitivity, acquired by the acquiring unit, and generates encoded image data, a plurality of pieces of decoded image data, each having a different sensitivity, is generated by decoding each of the encoded image data, the decoded image data is added on a pixel-by-pixel basis, and the analyzing unit changes the method of calculating the index value in accordance with a compositing ratio of the pixel in the decoded image data which has been added.

15. The apparatus according to claim 14, wherein the analyzing unit calculates the index value having a higher value as the compositing ratio of the pixel increases.

16. The apparatus according to claim 14, wherein the image capturing apparatus is an image sensor including:

a pixel unit constituted by a plurality of pixels, each pixel having a photoelectric conversion element; and a control unit that executes exposure time control on a pixel-by-pixel basis, wherein the image sensor is capable of outputting pixel information having a plurality of different exposure times under control performed by the control unit, and wherein the sensitivity of the image data is based on a length of the exposure time controlled by the control unit.

17. The apparatus according to claim 14, wherein the image capturing apparatus is an image sensor including:

a pixel unit constituted by a plurality of pixels, each pixel having a photoelectric conversion element; and an amplifying unit that amplifies signals output from the pixel unit at a plurality of different amplification rates, wherein the image sensor is capable of outputting pixel information amplified at a plurality of different amplification rates by the amplifying unit, and wherein the sensitivity of the image data is based on a magnitude of the amplification rate of the amplifying unit.

18. The apparatus according to claim 14, wherein the image capturing apparatus is an image sensor, and the sensitivity of the image data is based on an exposure amount when the image data is captured.

19. An image decoding apparatus that decodes encoded data generated by the image encoding apparatus according to claim 1, the image decoding apparatus comprising:

an acquiring unit that acquires encoded data, having a fixed length, of a block constituted by a predetermined number of pixels; and a decoding processing unit that generates and outputs an image of the block by decoding the encoded data acquired by the acquiring unit, wherein the decoding processing unit includes:

a decoding unit that, by decoding code data of quantized data in encoded data of a block, generates quantized data of each of pixels included in the block;

an inverse quantizing unit that generates inverse-quantized data by inverse-quantizing the quantized data of the block obtained by the decoding unit;

a determining unit that, on the basis of a result of the decoding by the decoding unit, determines a storage position of a loss bit in the encoded data of the block;

an analyzing unit that analyzes the inverse-quantized data of each of the pixels in the block and calculates an index value indicating an importance of each pixel; and a loss bit adding unit that adds the loss bit based on an index value of each of the pixels to the inverse-quantized data of each of the pixels of the block on the basis of the storage position determined by the determining unit, and outputs the inverse-quantized data after the adding as pixel data.

20. A method of controlling an image encoding apparatus, the method comprising:

(a) acquiring image data;

(b) dividing the image data into blocks, where each block includes pixels; and (c) encoding a block, generating encoded block data of which code length does not exceed a fixed length, adding a loss bit to the encoded block data for filling the fixed length, and outputting the encoded block data with the loss bit added, wherein the encoding (c) includes:

(c1) performing quantization on each of pixels included in a block so that a code length of the block is no greater than the fixed length, and performing variable-length encoding on quantized block;

(c2) on the basis of a difference between the code length of the block obtained by the variable-length encoding and the fixed length, determining a size of a free region for filling the fixed length;

(c3) analyzing each of the pixels of the quantized block and calculating an index value indicating an importance of each pixel; and (c4) by storing more values of bits lost due to the quantization in the free region as the importance of the pixel indicated by the index value increases, multiplexing the encoded block data obtained in the variable-length encoding (c1) and the bits lost due to the quantization, and generating the fixed-length encoded block data, wherein in the acquiring (a) a plurality of pieces of image data are acquired, each having a different sensitivity, output from an image generation source, in the encoding (c) each of the plurality of pieces of image data is encoded, each having a different sensitivity, acquired in the acquiring (a), and in the analyzing (c3) a method of calculating the index value is changed in accordance with the sensitivity of the image data to which a pixel belongs and a brightness of the pixel based on quantized data of the pixel, wherein the image generation source outputs first image data having a correct exposure, and second image data having a lower sensitivity or a higher sensitivity than the first image data, wherein when the second image data has the lower sensitivity, in the analyzing (c3), the index value having a higher value is calculated as a brightness of the pixel increases in an analysis of the second image data.

21. A non-transitory computer-readable storage medium storing a program which, when read and executed by a computer, causes the computer to executes the steps of a method of controlling an image encoding apparatus, the method comprising:

(a) acquiring image data;

(b) dividing the image data into blocks, where each block includes pixels; and (c) encoding a block, generating encoded block data of which code length does not exceed a fixed length, adding a loss bit to the encoded block data for filling the fixed length, and outputting the encoded block data with the loss bit added, wherein the encoding (c) includes:

(c1) performing quantization on each of pixels included in a block so that a code length of the block is no greater than the fixed length, and performing variable-length encoding on quantized block;

(c2) on the basis of a difference between the code length of the block obtained by the variable-length encoding and the fixed length, determining a size of a free region for filling the fixed length;

(c3) analyzing each of the pixels of the quantized block and calculating an index value indicating an importance of each pixel; and (c4) by storing more values of bits lost due to the quantization in the free region as the importance of the pixel indicated by the index value increases, multiplexing the encoded block data obtained in the variable-length encoding (c1) and the bits lost due to the quantization, and generating the fixed-length encoded block data, wherein in the acquiring (a) a plurality of pieces of image data are acquired, each having a different sensitivity, output from an image generation source, in the encoding (c) each of the plurality of pieces of image data is encoded, each having a different sensitivity, acquired in the acquiring (a), and in the analyzing (c3) a method of calculating the index value is changed in accordance with the sensitivity of the image data to which a pixel belongs and a brightness of the pixel based on quantized data of the pixel, wherein the image generation source outputs first image data having a correct exposure, and second image data having a lower sensitivity or a higher sensitivity than the first image data, wherein when the second image data has the lower sensitivity, in the analyzing (c3), the index value having a higher value is calculated as a brightness of the pixel increases in an analysis of the second image data.

* * * * *